United States Patent [19]

Waller

[11] Patent Number: 4,528,642
[45] Date of Patent: Jul. 9, 1985

[54] COMPLETING A FILL PATTERN INSIDE A REDRAWN PANEL OUTLINE

[75] Inventor: William G. Waller, Portland, Oreg.

[73] Assignee: Tektronix, Inc., Beaverton, Oreg.

[21] Appl. No.: 367,709

[22] Filed: Apr. 12, 1982

[51] Int. Cl.³ ......................... G06F 3/00; G06F 15/00
[52] U.S. Cl. .................................. 364/900; 364/300; 340/731
[58] Field of Search ............... 340/731, 734, 721, 741; 358/183, 22; 364/200 MS File, 900 MS File, 521, 522, 300 MS, 514, 518

[56] References Cited

U.S. PATENT DOCUMENTS

| Re. 31,200 | 4/1983 | Sukonick et al. | 364/900 |
|---|---|---|---|
| 3,976,982 | 8/1976 | Eiselen | 364/900 |
| 4,197,590 | 4/1980 | Sukonick et al. | 364/900 |
| 4,354,184 | 10/1982 | Woborschil | 340/731 |
| 4,366,475 | 12/1982 | Kishi et al. | 340/731 |
| 4,420,770 | 12/1983 | Rahman | 358/183 |

Primary Examiner—Harvey E. Springborn
Assistant Examiner—William G. Niessen
Attorney, Agent, or Firm—John H. Bouchard; Allston L. Jones; Robert S. Hulse

[57] ABSTRACT

A method and apparatus is disclosed for independently displaying one of a plurality of images on a display and for superimposing the plurality of images onto one another to produce a composite image. One or more bit planes are selected to constitute a group (defined to be a "surface"), and one or more additional bit planes are selected to constitute another group. The number of groups corresponds to the number of images to be independently displayed. The priority of one group over the other is selected. This ensures that the image from the one group (surface) appears to be "in front of" the images from the other group (surface) on the display. In the case of a color terminal, the colors associated with each group are selected. A color map memory contains a plurality of brightness indices which determines image brightness. Associated with each index is one or more color indices. The bits associated with each pixel are used as an index to the color map memory by locating the corresponding color (or gray) indices. The associated brightness index is noted, and converted to an analog voltage for determination of image brightness. In response to the selection of the groups mentioned hereinabove, and the designation of priority among groups, the firmware recomputes the color map in the color map memory, that is, the color indices are set based upon the number of selected groups and the number of bit planes per group, and selected ones of the brightness indices are recomputed based on the designated priority among groups. Due to the ability of the present invention to select one or more bit planes to constitute a group, and due to the firmware's ability to recompute the color map, one or more images can be displayed on the CRT, either independently of one another, or superimposed upon one another to produce a composite image.

5 Claims, 17 Drawing Figures

FIG. 8.

PE : 1 -> END OF PANEL
YBEGI : Y VALUE OF BOTTOM OF SIDING + 1
XBEG : X VALUE OF BOTTOM OF SIDING
D : 1 SIDING GOES DOWNWARD - > EDGE LIST IS TRAVERSED BACKWARDS
    0 SIDING GOES UPWARDS - > EDGE LIST IS TRAVERSED FORWARDS
IN : 1 LOWER LEFT HAND PIXEL IN VIEWPORT IS INSIDE THE PANEL
    0 -> PIXEL IS OUTSIDE THE PANEL
SEP : 1 - > THIS SIDING SHOULD NOT BE MERGED WITH A SIDING WHOSE END
        POINT IS THE SAME AS THE BEGINNING POINT OF THIS SIDING. (USED
        FOR FLAT PANELS)
CONT : 1 - > THIS SIDING IS TO BE CONTINUED WITH ANOTHER SIDING POINTED
        TO BY THE JUMP OPCODE IN THE EDGE LIST
BACK : 1 - > DIRECTION OF THIS FLAT SIDING SHOULD HAVE BEEN REVERSED
        SO THE F FLAG IS THE END-OF-EDGE-LIST INDICATOR.
FLAT : 1 - > THIS SIDING IS FLAT
START : 1 - > THIS SIDING IS THE FIRST SIDING IN A SIMPLE PANEL
END : 1 - > THIS SIDING IS THE LAST SIDING IN A SIMPLE PANEL

L : 1 -> LAST EDGE IN SIDING
F : 1 -> FIRST EDGE IN SIDING
IF L IS 1 AND J IS 1 -> JUMP OPCODE

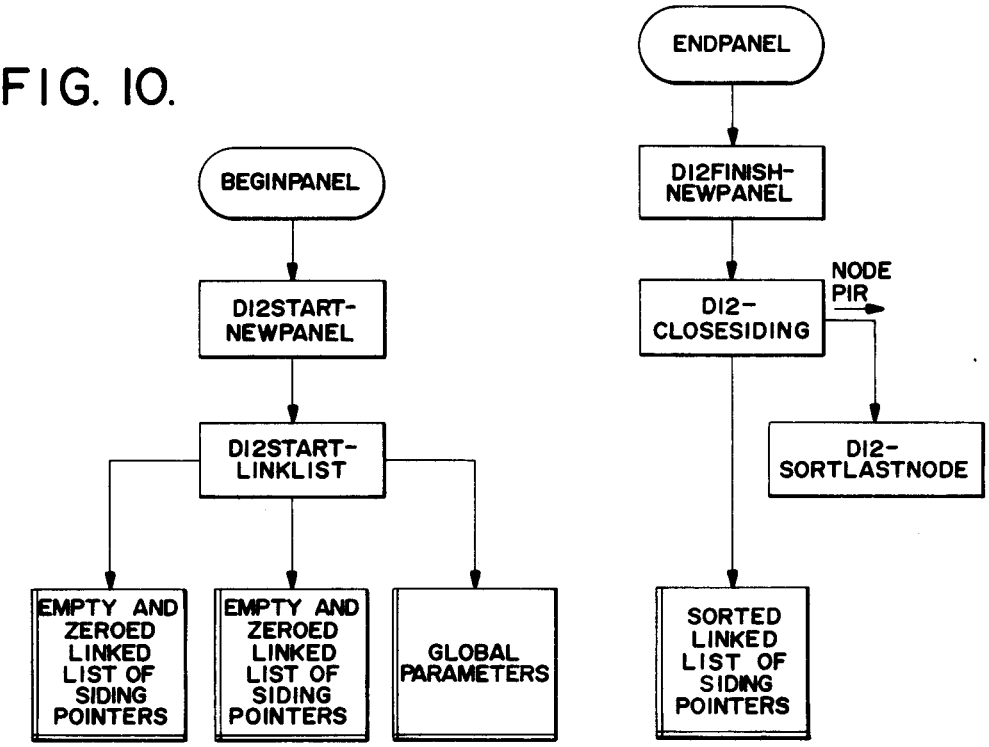

FIG. 10.

CONNECTION OF TWO SIDINGS TO FORM A SUPER SIDING

THIS CAN OCCUR WHEN THE END SIDING (o—E→) ENDS

AT THE SAME POINT THAT THE START SIDING (o—S→) STARTS.

| WHEN NEITHER SIDING IS FLAT | WHEN ONE OR TWO SIDINGS ARE FLAT FORM THE CONNECTION WITH THE FOLLOWING ADJUSTMENTS | ADJUSTMENT |
|---|---|---|
| FORM CONNECTION  | 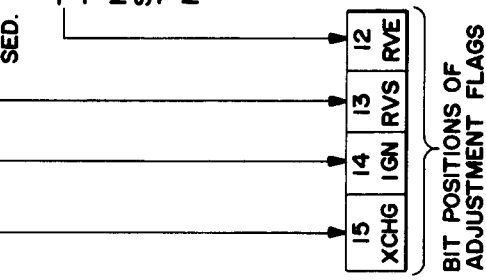 THE SET OF SORTED SIDINGS HAVE THE START-SIDINGS AND END-SIDING OUT OF ORDER. THEY MUST BE EXCHANGED. | XCHG |
| FORM CONNECTION | THE NULL-SIDING ADDED TO THE FLAT START-SIDING IS NOW ASSOCIATED WITH A NONFLAT SUPER-SIDING. THIS IS INCORRECT SO THAT THE NULL-SIDING MUST BE IGNORED. | XCHG |
| NO CONNECTION 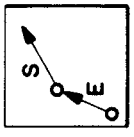 | THE FLAT START-SIDING IS ASSUMED TO BE AN UPWARD-POINTING SIDING. HOWEVER, THE RESULTANT SUPER-SIDING IS DOWNWARD-POINTING SO THE DIRECTION OF THE START-SIDING MUST BE REVERSED. | RVE |
| NO CONNECTION 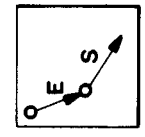 | THE FLAT END-SIDING IS ASSUMED TO BE AN UPWARD-POINTING SIDING. HOWEVER, THE RESULTANT SUPER-SIDING IS DOWNWARD-POINTING SO THE DIRECTION OF THE END-SIDING MUST BE REVERSED. | IGN |
|  | 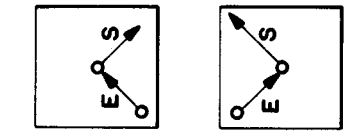 | RVS, IGN |

BIT POSITIONS OF ADJUSTMENT FLAGS

| 15 | 14 | 13 | 12 |
|---|---|---|---|
| XCHG | IGN | RVS | RVE |

FIG. 9.

COMPLETING A FILL PATTERN INSIDE A REDRAWN PANEL OUTLINE

BACKGROUND OF THE INVENTION

1. Field of the Invention

The present invention relates to a graphics display terminal's capability to provide a fill-pattern inside a redrawn panel outline to produce a redrawn panel image, the redrawn panel outline being generated on a display subsequent to generation of an original panel image having said fill pattern present therein.

2. Description of the Prior Art

Some of the graphics display terminals of the prior art possessed a panel-fill capability, wherein a fill-pattern was designated and a closed-boundary image, or panel, was drawn on the display of the terminal, the fill-pattern filling the space inside the panel. However, these graphics display terminals of the prior art did not possess a zoom capability, wherein a portion of the displayed panel image is magnified in order that the fine details of the displayed panel image may be studied and/or modified as desired. With the advent of the zoom capability for graphics display terminals, the user could, for example, zoom in on a portion of a displayed panel image including the fill-pattern filling the space inside the panel. When this zoom operation is performed on the displayed panel image, the displayed panel image is erased, and it is redrawn on the screen as a redrawn panel image. The zoom capability of the terminal redraws the zoomed outline of the panel image on the terminal display, resulting in a magnified panel outline. The panel fill capability of the terminal should determine which area, on both sides of the magnified panel outline, represents the area inside the panel outline, and which area represents the area outside the panel outline. However, the panel fill capability of the prior art graphics display terminals could not determine which area, on both sides of a magnified panel outline, represented the area inside the panel, and which area represented the area outside the panel. Consequently, since it was not known which area represented the area inside the panel, it was not possible to fill the zoomed panel outline with the predesignated fill pattern.

In addition, the graphics display terminals of the prior art did not possess a capability whereby a multiple number of viewports could be displayed on the terminal display, portions of the originally displayed panel image being displayed inside each of the viewports. The portions of the originally displayed image were sometimes subjected to a zoom operation, the zoomed portions of the originally displayed panel image being displayed in their corresponding viewports. However, again, with the advent of the ability to display these multiple viewports, if the multiple viewport capability was used in conjunction with a filled panel representing the originally displayed image, the terminal was capable of redrawing the outline of the panel in the viewport, but, in the case of an expanded panel outline, the terminal's original panel-fill feature was not capable of determining which area represented the area inside the panel, and which area represented the area outside the panel.

SUMMARY OF THE INVENTION

It is therefore a primary object of the present invention to provide a panel-fill capability for a graphics display terminal which is capable of determining which area, on both sides of a magnified panel outline, represents the area inside the panel, and which area represents the area outside the panel.

It is another object of the present invention to provide a panel fill capability for a graphics display terminal wherein a panel, having a fill-pattern drawn therein, may undergo a zoom operation, the zoomed outline of the panel being redrawn on the terminal display as a result of the zoom capability of the terminal, the panel fill capability determining which area on both sides of the zoomed outline represents the area inside the panel and which area represents the area outside the panel, the panel fill capability filling the area inside the panel with the predesignated fill-pattern.

These and other objects of the present invention are accomplished by providing a system including a processor connected to a keyboard and a host computer for performing a zoom operation on the original panel image, inclusive of its fill pattern, resulting in a zoomed panel image. The zoom operation magnifies the outline of the original panel image only. Therefore, there is an area inside the magnified boundary which does not contain the designated fill pattern. The processor also performs a panel fill operation wherein the area inside the magnified outline of the original panel image is determined, the fill-pattern being supplied to said area inside the magnified outline of the original panel image to complete the fill-pattern of the zoomed panel image. In response to the completion of the performance of these two operations, the processor supplies instructions to a vector generator, the instructions including CRT-vector generating information related to the zoom function and to the panel-fill function performed by the processor. The vector generator, in response to the instructions from the processor, generates binary data for each pixel of the terminal display, the binary data being representative of the zoomed panel image completely filled with the designated fill pattern. The binary data is stored in a memory, and is sequentially read out from the memory, pixel by pixel, until an entire corresponding terminal display area is encompassed. The binary data for each pixel thus read out from memory is converted to an analog voltage for determination of the image brightness for each pixel on the terminal display.

Further scope of applicability of the present invention will become apparent from the description given hereinafter. However, it should be understood that the details of the description of the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A full understanding of the present invention will be obtained from the detailed description given hereinbelow and the accompanying drawings, which are given by way of illustration only, and thus are not limitative of the present invention, and wherein:

FIG. 8 is a panel data structure I glossary.

FIG. 9 illustrates the various combinations of panel edges which may be encountered and the way the algorithms deal with them.

FIG. 10 is a pair of flow diagrams which show the interaction between several of the firmware modules of the present invention.

DETAILED DESCRIPTION OF THE INVENTION

Figure 1:
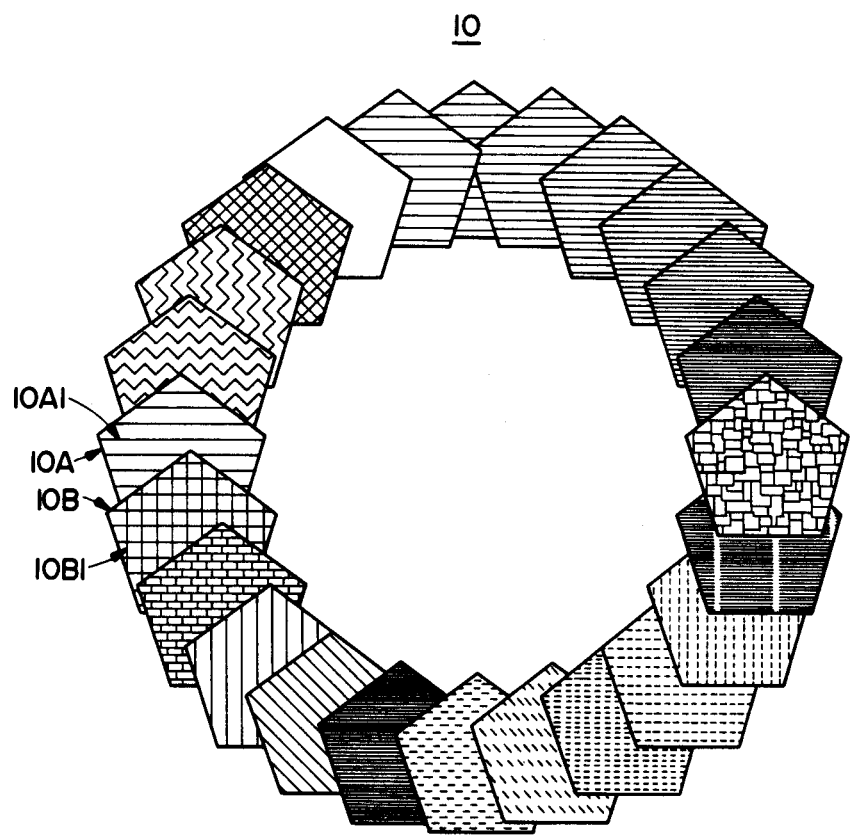
FIG. 1 illustrates a plurality of panels, each panel having a different fill pattern therein.
Figure 2A:
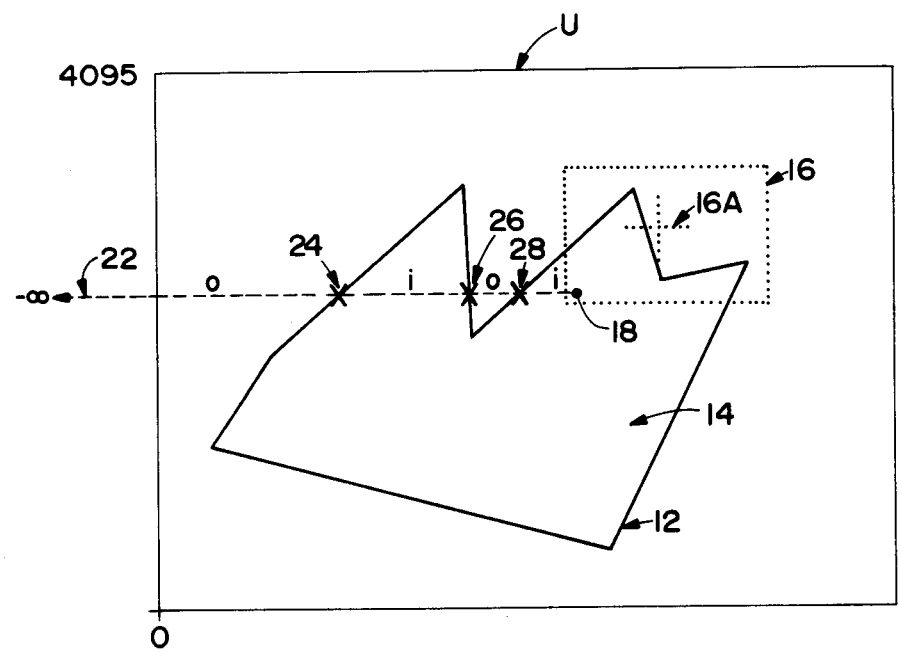
FIG. 2a represents a panel having a fill pattern disposed therein before the panel has undergone a zoom operation, the panel and the fill pattern being stored in a memory in the form of a series of instructions.
Figure 2B:
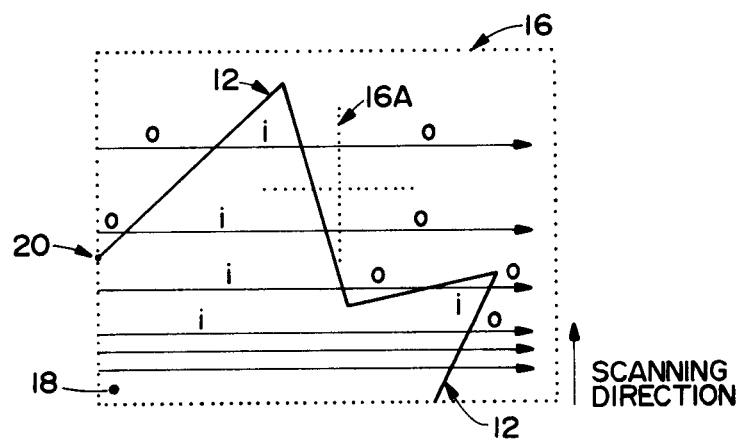
FIG. 2b represents a portion of the panel shown in FIG. 2a after undergoing a zoom operation, this figure illustrating the manner by which the present invention determines which area, on both sides of the magnified panel outline, is inside the panel and which area is outside the panel.

A full appreciation of the present invention will be obtained by reference to FIGS. 1, 2a, and 2b of the drawings. Referring to FIG. 1, a plurality of panels 10 are shown. For example, a typical panel would be panel 10a shown in FIG. 1. Panel 10b is still another panel. A "panel" is defined as being a closed-boundaried image. In the example shown in FIG. 1, each of the panels are defined by an outline which represents a pentagon figure. Note that each of the panels shown in FIG. 1 encompasses a different fill pattern. For example, panel 10a encompasses a cross-hatching fill pattern 10a1. The panel 10b encompasses a double cross-hatch fill pattern 10b1.

Some of the graphics display terminals of the prior art were capable of predesignating a fill pattern, and of drawing a closed boundary on the CRT (cathode ray tube) display, the predesignated fill pattern being drawn or written within the closed boundaried image. However, with the advent of a zoom capability for graphics display terminals, a problem arose during the zoom function when performing a zoom operation on a closed panel having a fill pattern encompassed therein. When the zoom operation was performed on said panel, a magnified panel outline would appear on the CRT screen. The panel-fill capability of the prior art terminals could not determine which area, on both sides of the magnified panel outline, represented the area inside the panel and which area represented the area outside the panel.

Referring to FIGS. 2a and 2b, the method of the present invention for determining which area is inside the magnified panel outline and which area is outside the magnified panel outline is illustrated. Referring to FIG. 2a, a panel outline 12 is shown having a fill pattern 14 disposed inside the panel. A frame box 16 is shown encompassing a portion of the panel 12, for the purpose of subjecting said portion of said panel 12 to the zoom operation. A cross-hair cursor 16A inside the frame box 16 is indicative of the center of the box 16. In FIG. 2b, said portion of said panel is shown after undergoing the zoom operation. In FIG. 2b, a lower left pixel 18 is shown in the lower left hand corner of frame box 16. If it is known, for example, that this lower left pixel 18 is inside the panel outline 12, it is possible to determine whether any other pixel in the frame box 16 is inside or outside the panel outline 12. Still referring to FIG. 2b, assuming that it is known that the lower left pixel 18 is inside the panel outline 12, if one were to scan from left to right, bottom to top, starting with the lower left pixel 18, the area between pixel 18 and outline 2 must be inside the panel outline 12. After the outline 12 is crossed during the scan, the area between the outline 12 and the lower right pixel must be outside the panel outline. On the return from right to left of the frame box 16, the outline is crossed once again, such that the area between outline 12 and the left side of frame box 12 is designated as being inside the panel outline 12. This scan technique continues from left to right, return from right to left, scanning from bottom to top of frame box 16 until the point 20 is encountered. The area between point 20 and outline 12 is still designated as being inside the panel outline 12. Continuing along this scan line, once the panel outline is crossed, the area between one portion of outline 12 and the next subsequent portion of outline 12 is designated as being outside the panel outline. When the panel outline is again crossed, along this scan line, the area between the outline 12 and the next subsequent outline portion 12 is inside the panel. When the panel outline is again crossed, along this scan line, the area between outline 12 and the right portion of frame box 16 is designated as being outside the panel. The return from right to left, along this scan line, is accomplished in the same manner as hereinbefore described, until point 20 is again encountered.

The scan moves up one pixel width to the next pixel above point 20. When this occurs, the area between the left side of frame box 16 and the outline 12 is designated as being outside, not inside, the panel. Once point 20, on the left side of frame box 16, is encountered, and passed, during the scan from bottom to top of frame box 16, the inside-outside status of the panel changes, in this case, from an "inside the panel" status, to an "outside the panel" status. The scan from left to right and return, is accomplished, and the inside-outside status of the pixels along the scan line is determined in exactly the same manner as hereinbefore described, only the starting status at the left portion of frame box 16 is an "outside the panel" status. Scan lines appear in FIG. 2b, and above each of the scan lines, an "i" or an "o" appears, indicating whether the pixels along the scan line are "inside the panel" or "outside the panel", respectively.

The text presented hereinabove assumed that the status of the lower left pixel 18 was known to be "inside the panel". How this fact was initially determined is presented in the paragraphs to follow.

Referring to FIG. 2a, a filled panel is shown, having outline 12, and a fill pattern 14 disposed therein, the panel being disposed in a universal space U. A horizontal line 22 connects the lower left pixel 18, within frame box 16, to a left-most point outside the universal space U, such as —∞. Starting from the left most outline of the universal space U, and proceeding from left to right along the line 22, the area between the left-most outline of the universal space U and the outline 12 of the panel is considered to be outside the panel. When the outline 12 is first encountered and crossed, along line 22, the area between the first crossing 24 and the second crossing 26 of outline 12 is considered to be inside the panel. The area between the second 26 and a third 28 crossing is considered to be outside the panel. Therefore, the area between the third crossing 28 and pixel 18 is considered to be inside the panel outline 12. Consequently, pixel 18 must be inside the panel outline 12.

The above paragraphs have described, with reference to FIGS. 2a and 2b, that it is possible to perform a zoom operation on a filled panel image and to determine which area, on both sides of the panel outline, is considered to be inside the panel outline, and which area is considered to be outside the panel outline.

When the panel image undergoes the zoom operation, the outline of the panel is magnified by a certain factor. At this point, the areas inside the panel outline are determined. Then, the fill pattern is supplied to those areas which were designated as being inside the magnified panel outline.

A detailed description of the zoom capability mentioned hereinabove for the graphics display terminal of the present invention is provided in a co-pending application entitled "True Zoom of a Displayed Image" filed on Apr. 12, 1982, by the same inventor as the present application and was assigned a Ser. No. of 367,829 is hereby incorporated by reference.

Figure 3:
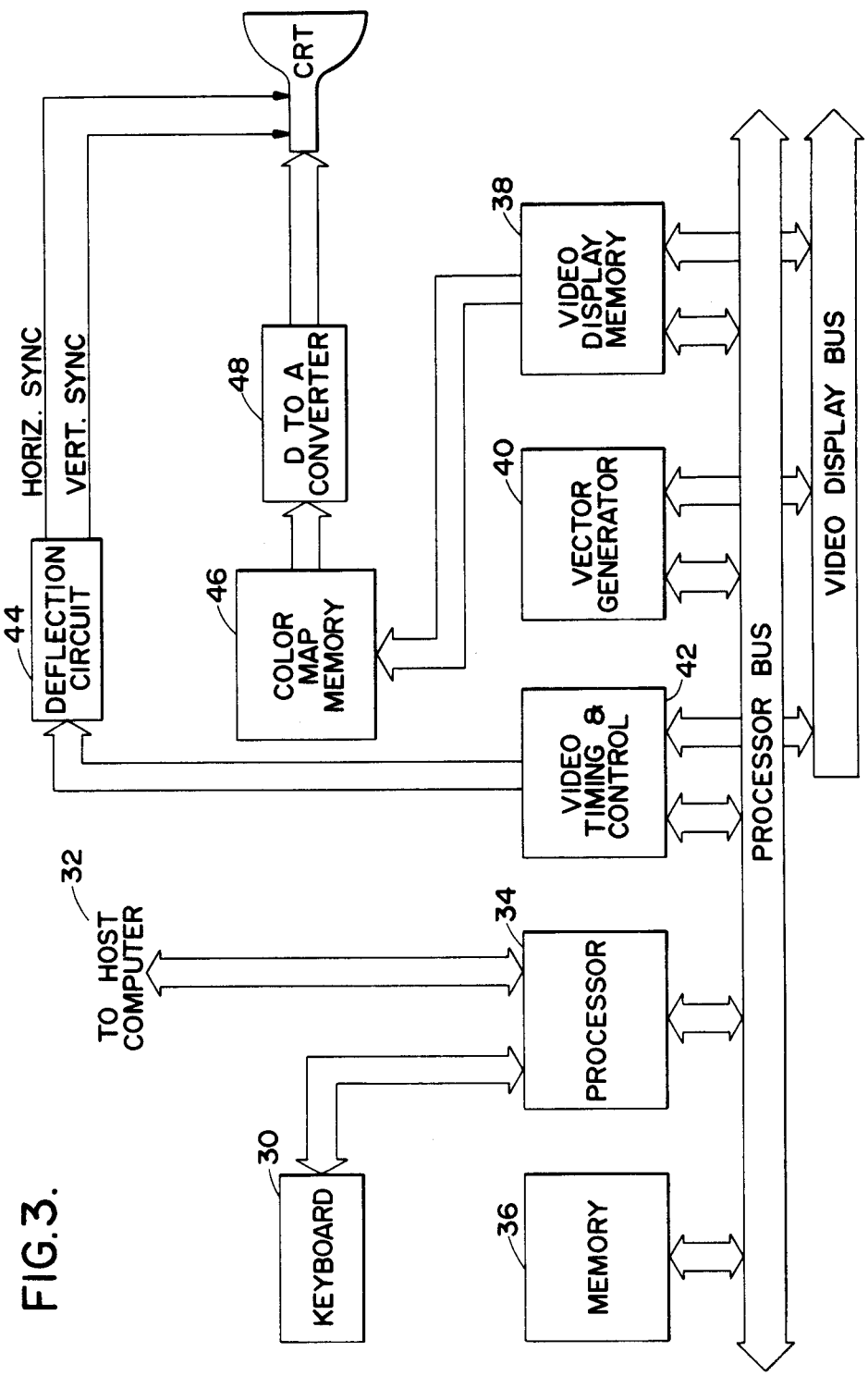
FIG. 3 represents a system block diagram of the graphics display terminal of the present invention.

Referring to FIG. 3, a system block diagram of the graphics display terminal of the present invention is illustrated. The keyboard 30, and the host computer 32 are connected to a processor 34. The processor 34 includes a microprocessor and a ROM connected thereto. The keyboard 30 and the host computer 32 are connected to the microprocessor. An Intel 8086 can be used to perform the function of the microprocessor. The firmware is stored in the ROM. The microprocessor is connected to a processor bus. A memory 36 is also connected to the processor bus and stores a series of bits therein, referred to as a surface information index, associated with another capability of the graphics display terminal of the present invention. This other capability of the graphics display terminal of the present invention, inclusive of the concept behind the surface information index, is discussed in another co-pending application entitled "Method and Apparatus for Displaying Images", assigned to the same assignee as the present invention, this co-pending application having been filed in the name of Paula Mossaides on Apr. 12, 1982, and assigned a Ser. No. of 367,659, the disclosure of which is hereby incorporated by reference.

A video display memory 38 is connected to the processor bus and stores therein the pixel data which is ultimately used for controlling the image brightness during the raster scan. A vector generator 40 is connected to the processor bus and generates the pixel data in response to instructions from the microprocessor in the processor 34, the pixel data being stored in the video display memory 38. A video timing and control circuit 42 is also connected to the processor bus and coordinates the readout of the pixel data stored in the video display memory 38 with the generation of the horizontal and vertical sync signals, generated by a deflection circuit 44. The video display memory 38 is also connected to a color map memory 46, the color map memory 46 being connected to the CRT via a D-A converter 48. When the pixel data, for each pixel on the CRT, is read out from the video display memory 38 by the video timing and control circuit 42, it is used as an index (or address) to a table stored in the color map memory 46. A corresponding brightness index is located in the table, corresponding to the pixel data, for each pixel, located therein, and is converted to an analog voltage in the D-A converter 48. The analog voltage drives an electron gun and determines the brightness of the image displayed at that particular pixel. The detailed concepts behind the construction of the color map memory, and the associated brightness indices stored therein, are discussed in the copending application entitled "Method and Apparatus for Displaying Images", filed on Apr. 12, 1982, and assigned a Ser. No. of 367,659, the disclosure of which has already been incorporated by reference hereinabove.

Figure 4:
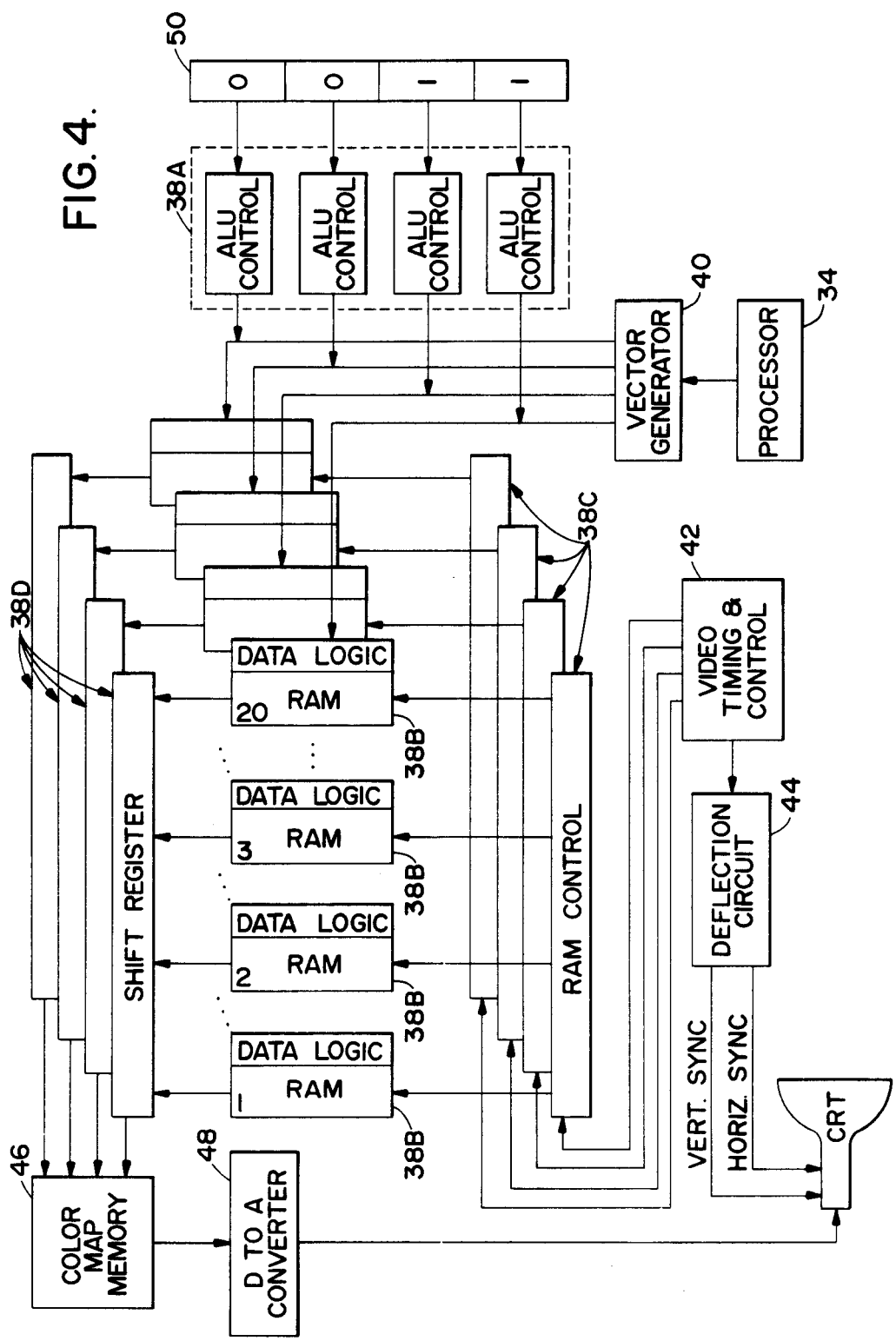
FIG. 4 represents a further detail of the video display memory shown in FIG. 3.
Figure 5:
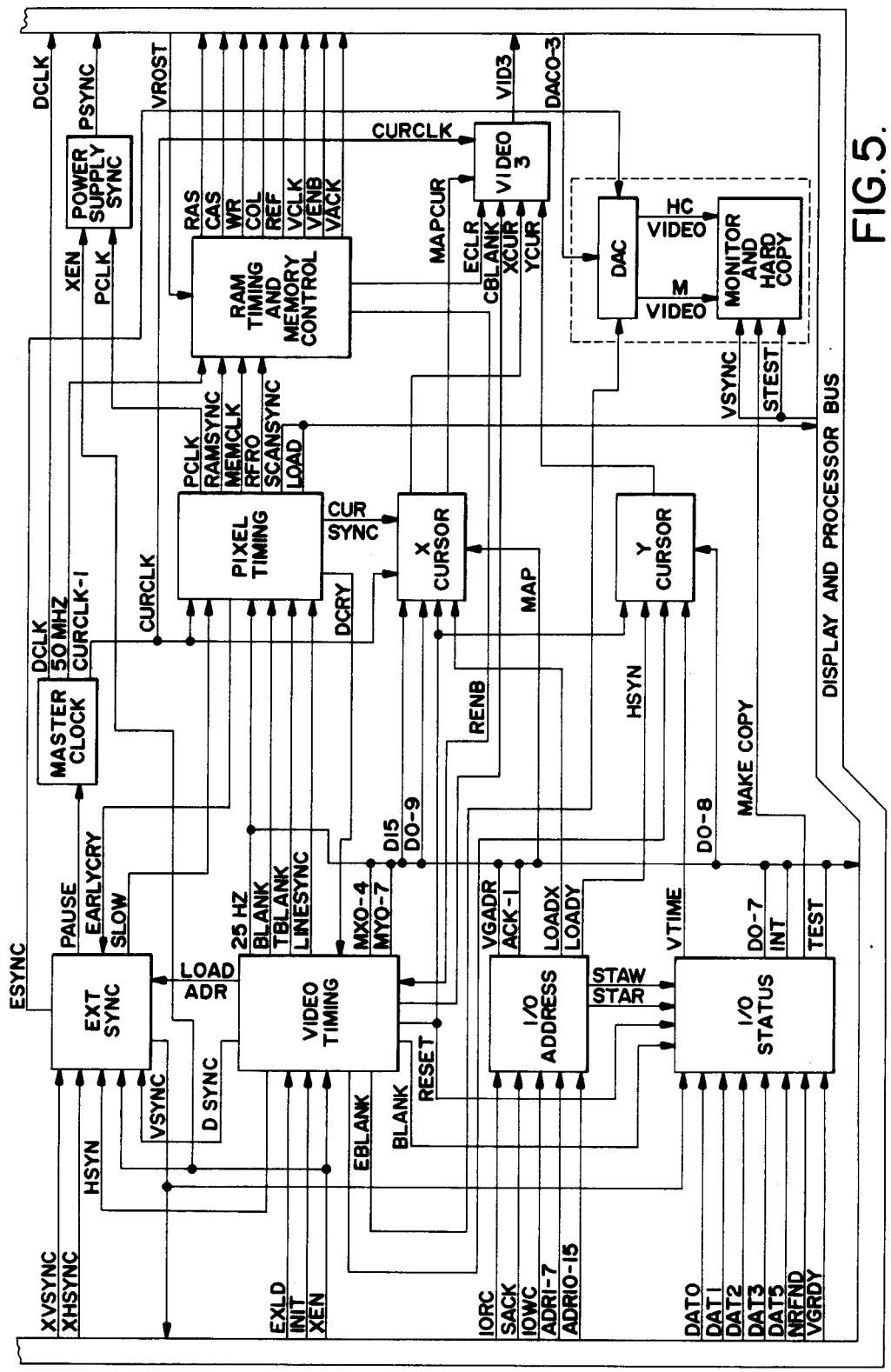
FIG. 5 represents a further detail of the video timing and control circuit shown in FIG. 3.
Figure 6A:
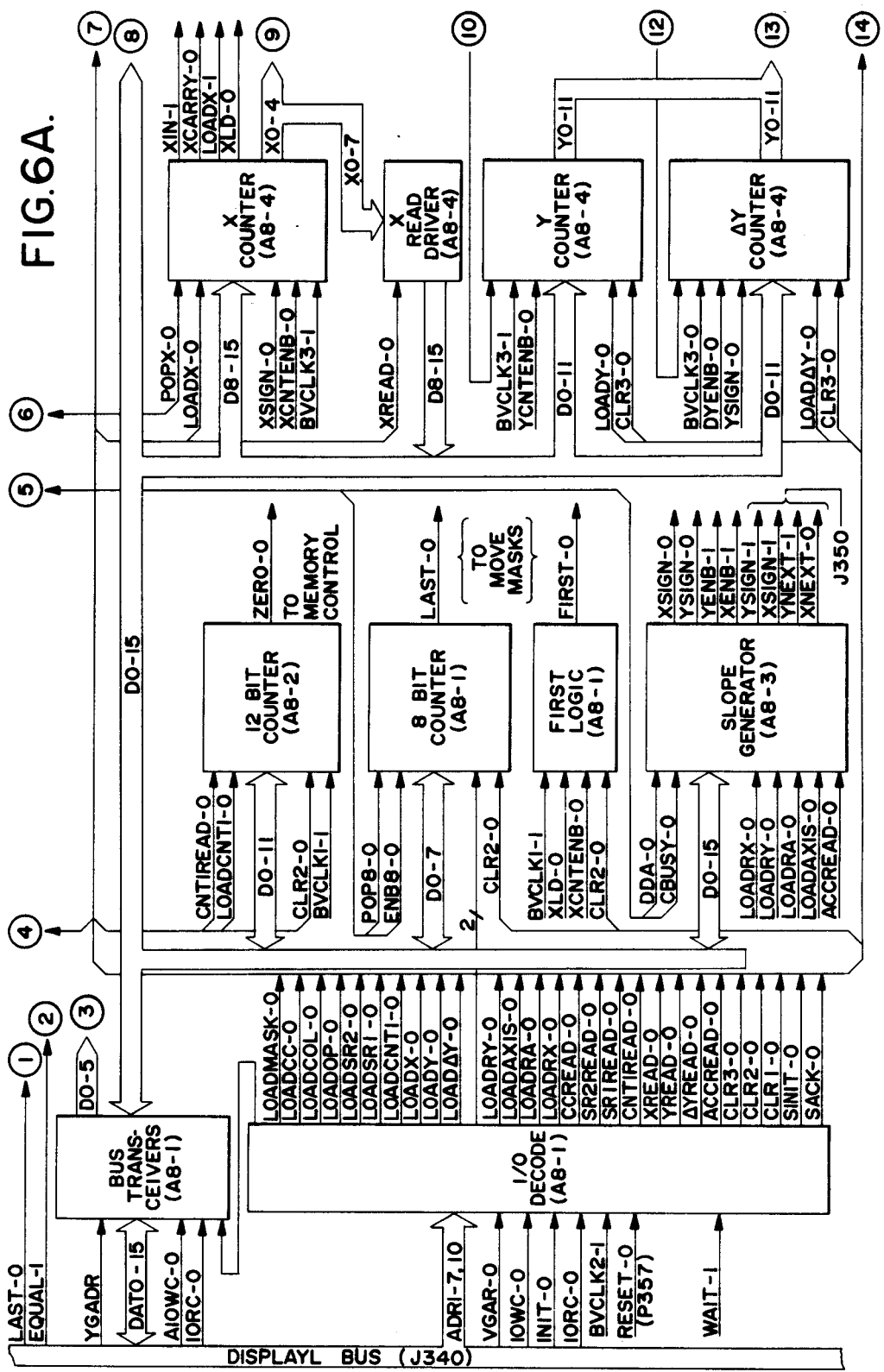
FIGS. 6A, 6B, and 6C represent a further detail of the vector generator shown in FIG. 3.
Figure 6B:
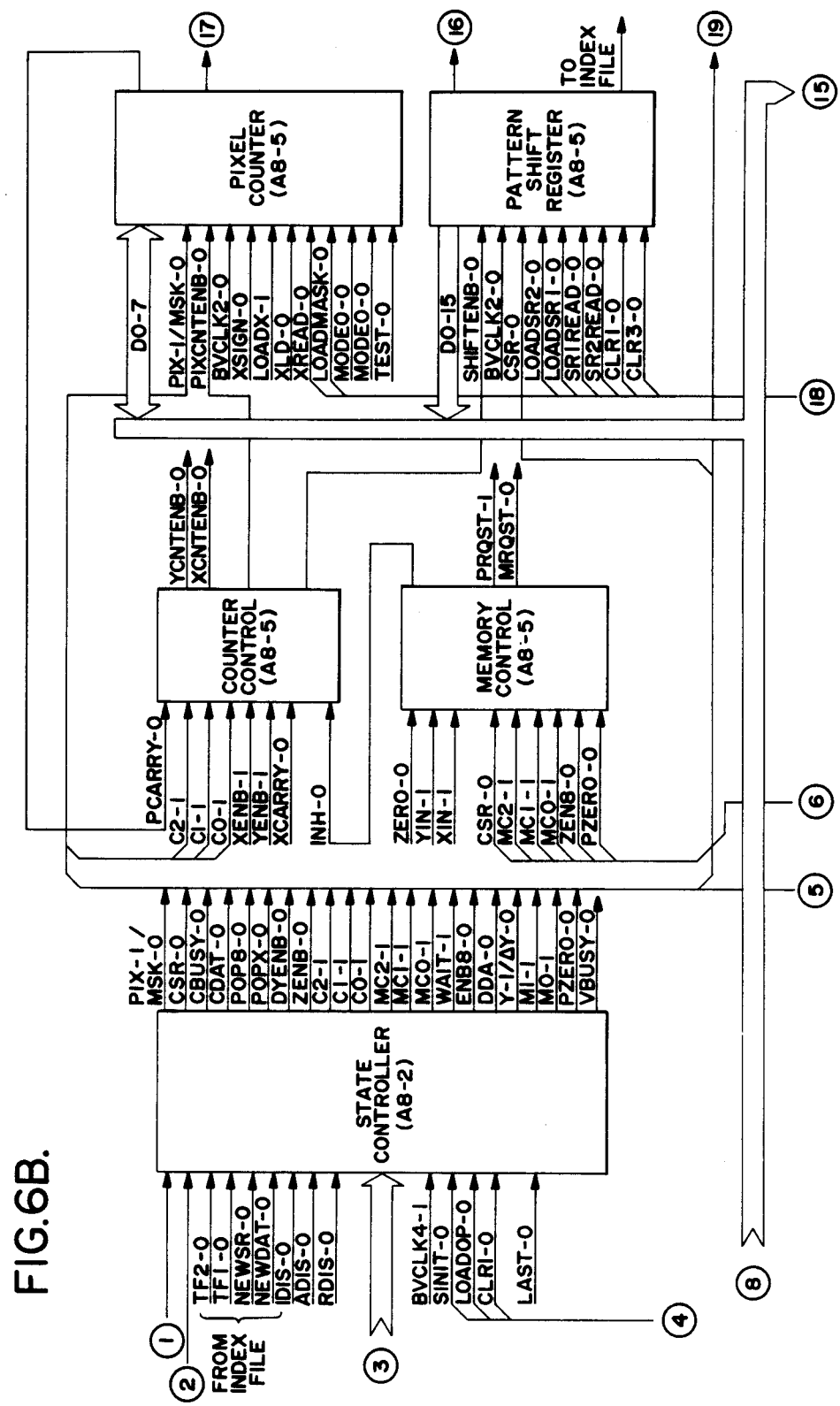
Figure 6C:
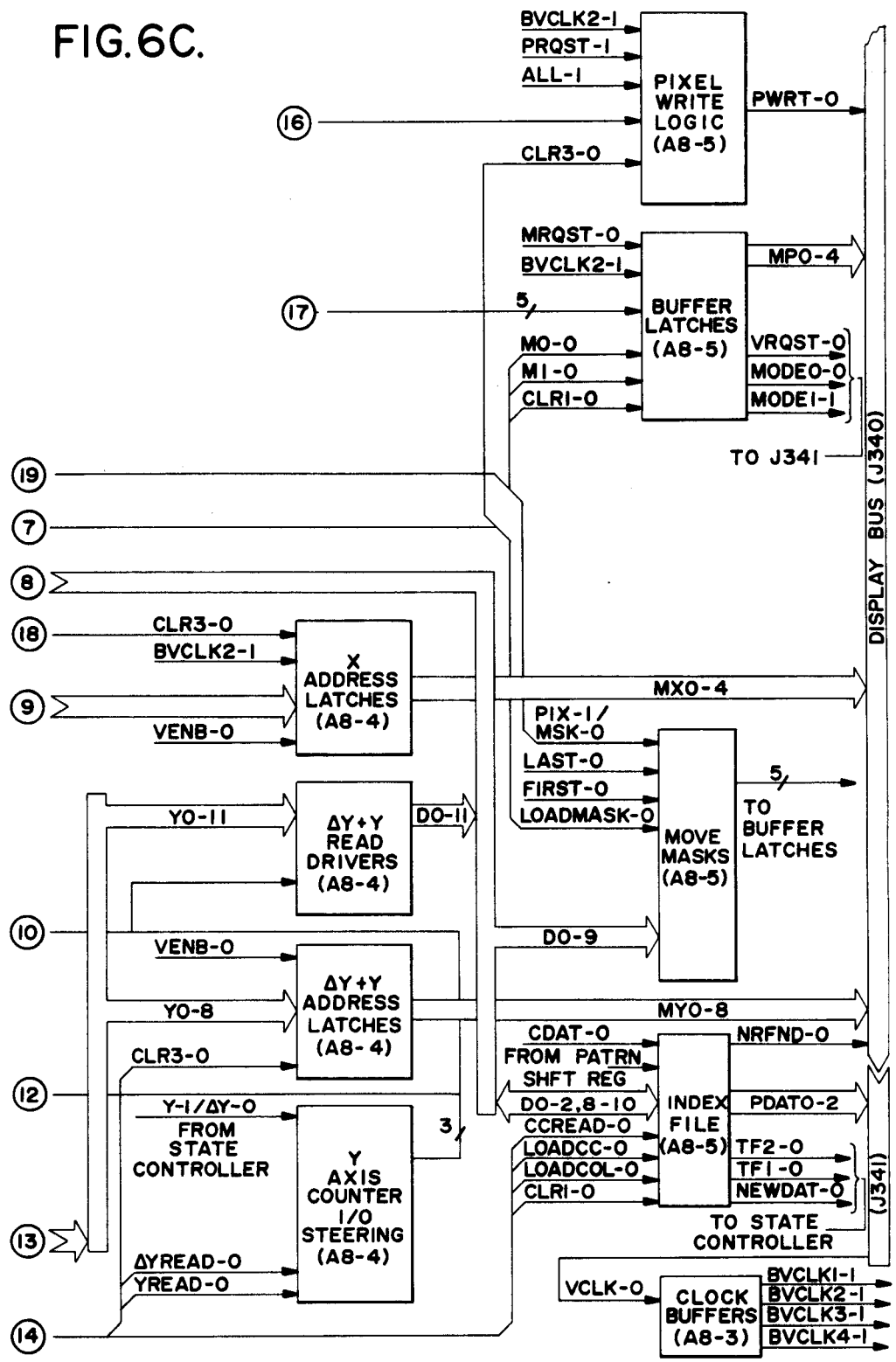
Figure 7:
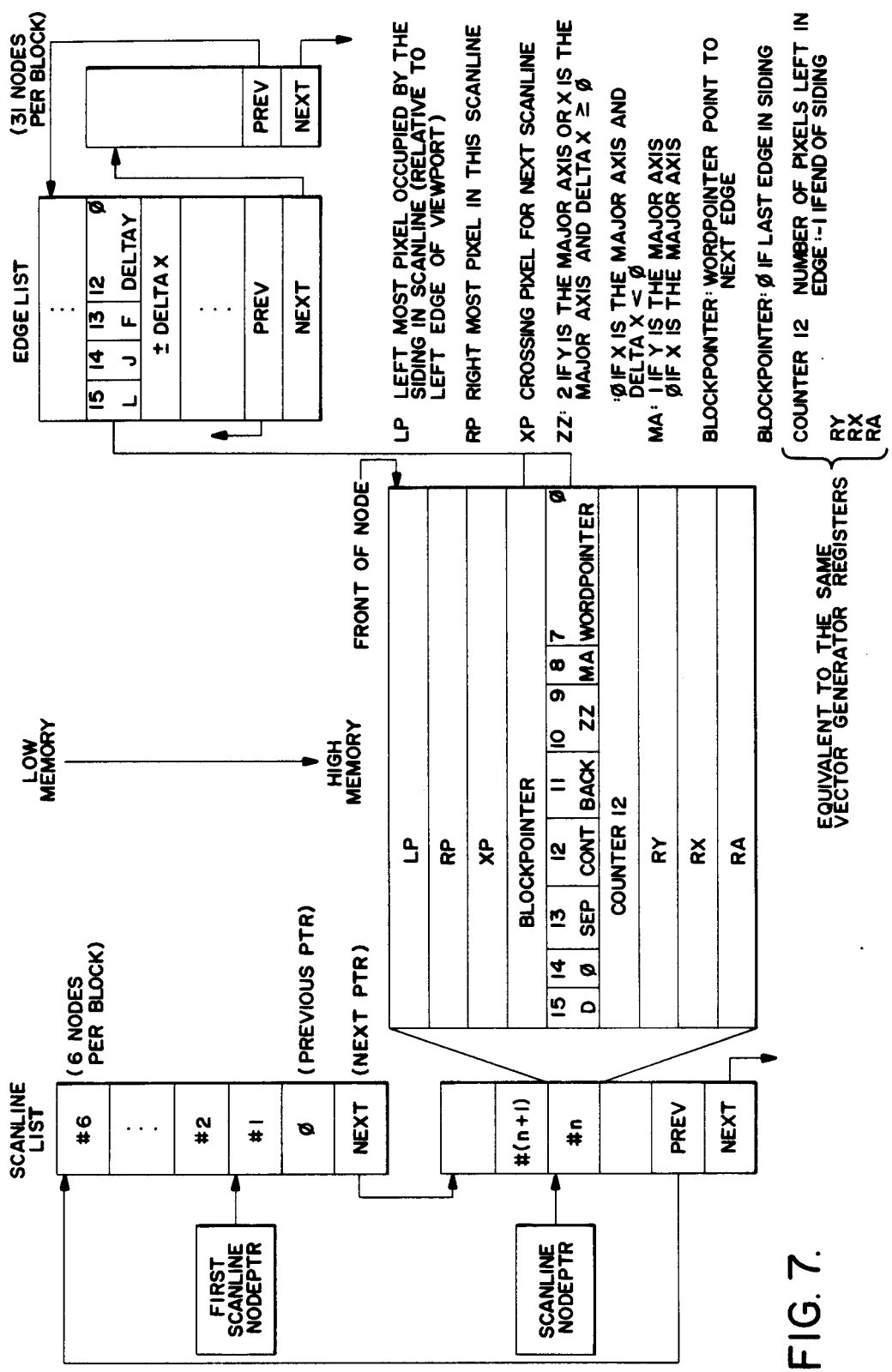
FIG. 7 is a data structure diagram of the scanline and edge lists.
Figure 11:
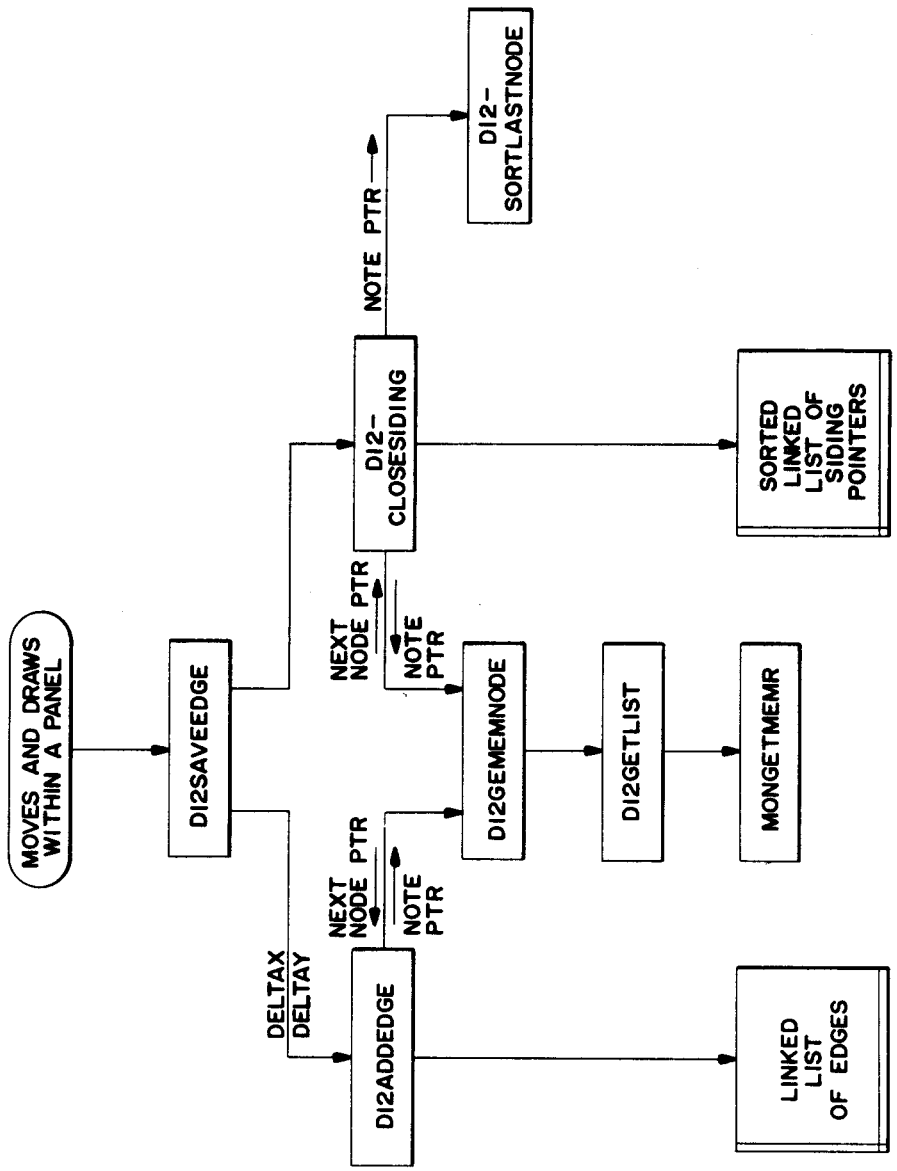
FIG. 11 is a flow diagram which shows the interaction between others of the firmware modules of the present invention.
Figure 12:
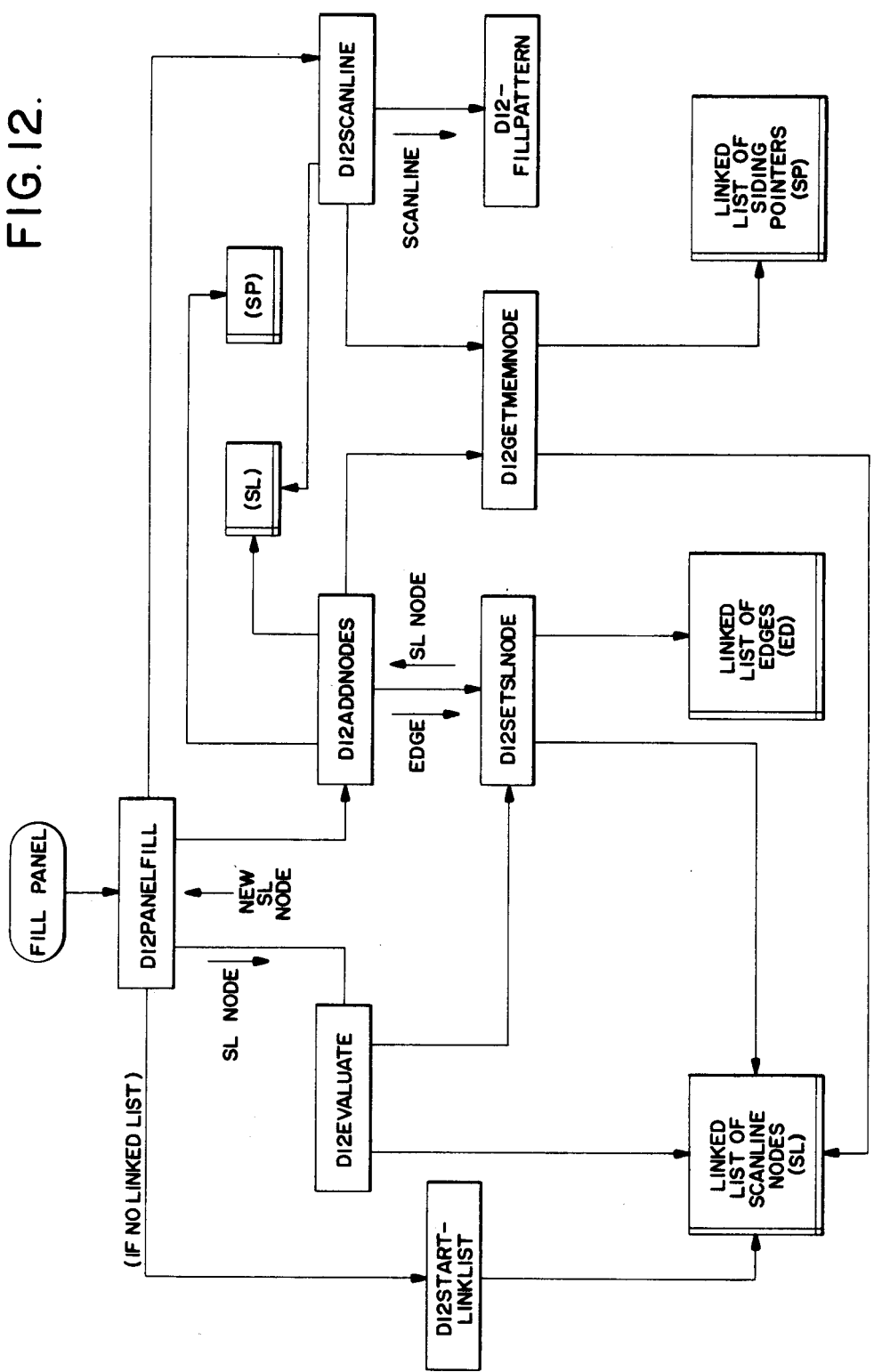
FIG. 12 is a flow diagram which shows the interaction between others of the firmware modules of the present invention.
Figure 13:
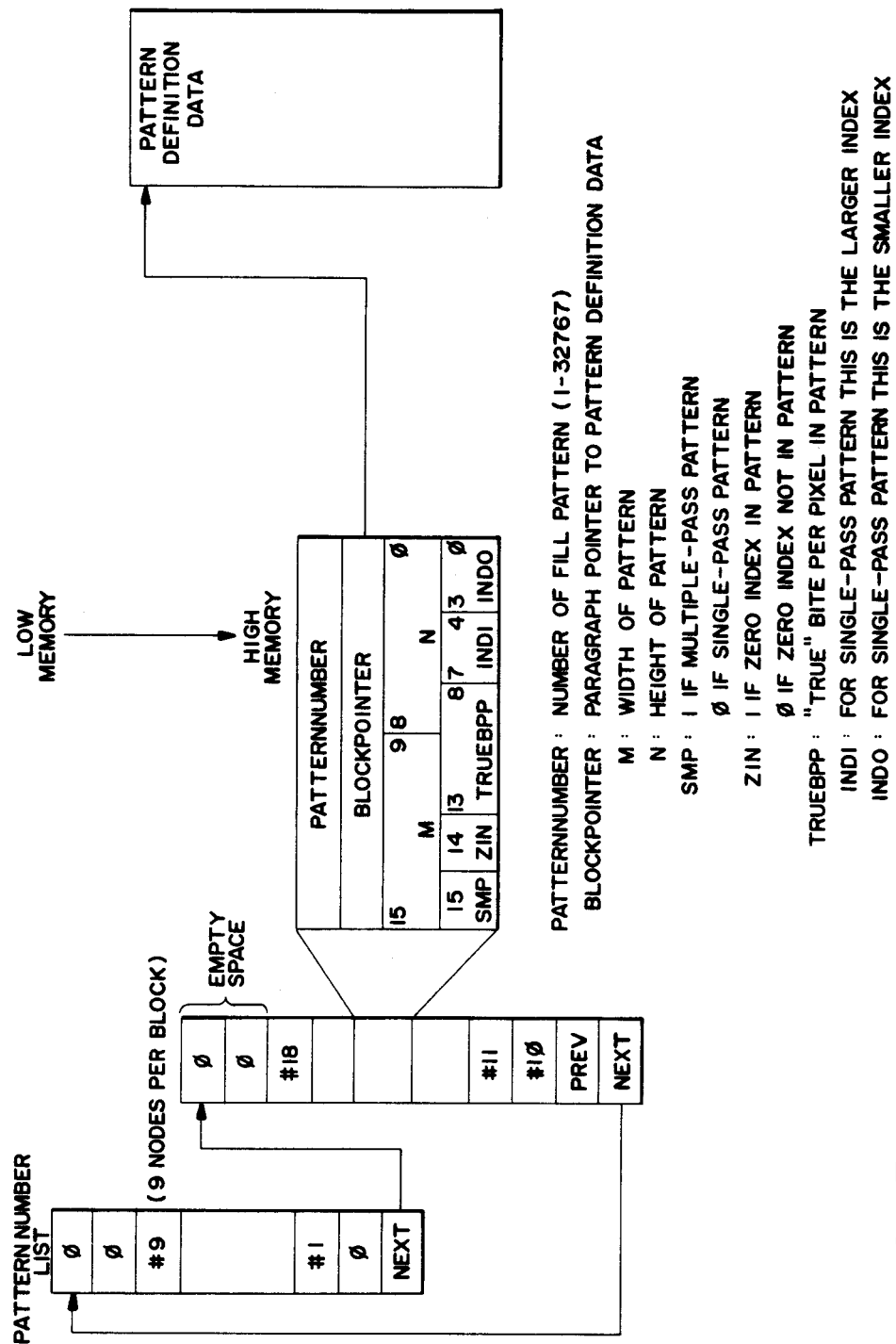
FIG. 13 is a data structure diagram which illustrates the structure of the pattern number list.
Figure 14:
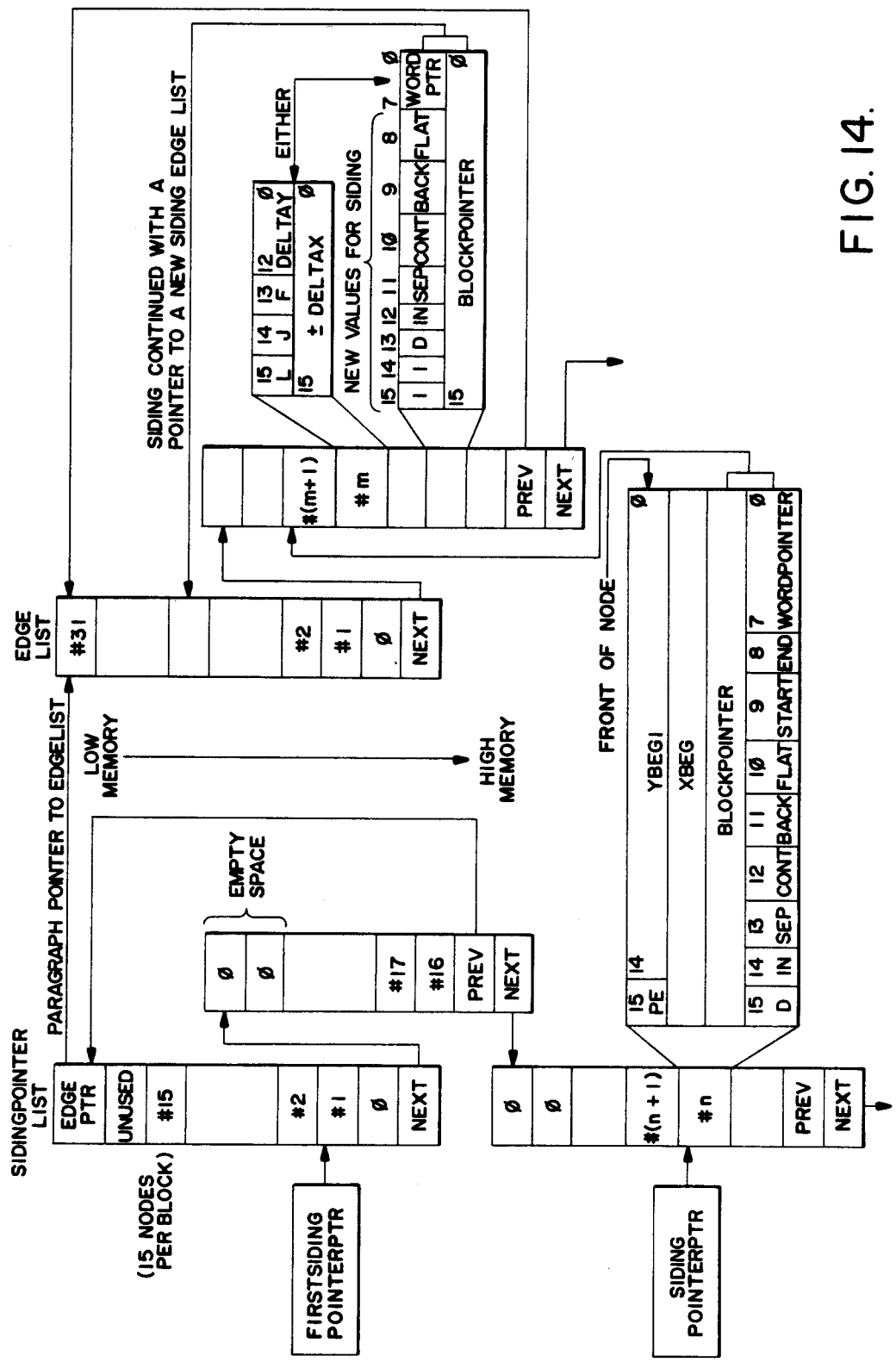
FIG. 14 is another data structure diagram showing the relationship between the siding pointer list and the edge list.

A further detail of the video display memory 38 is shown in FIG. 4 of the drawings of the present application. In FIG. 4, the video display memory 38 comprises a plurality of ALU control circuits 38a and a plurality of bit planes connected thereto. Each of the ALU control circuits are nothing more than a register capable of being set to a 1 or a 0 in response to a high or a low input signal, respectively. If a bit in an ALU register is set to 1, an output signal is developed therefrom.

The output terminals of the ALU control circuit 38a are connected to a corresponding plurality of bit planes. Each of the bit planes comprise a certain number of RAM/data logic circuits 38b, a RAM control circuit 38c, and a shift register 38d. In the example shown in FIG. 4, there are twenty (20) RAM/data logic circuits 38b in each bit plane. Each line on the CRT is subdivided into a plurality of groups of pixels, each group including twenty (20) pixels, corresponding to the twenty (20) RAM/data logic circuits 38b. Four bit planes are illustrated in the FIG. 3 circuit embodiment.

Each RAM control circuit 38c, associated with each bit plane, is connected, on one end, to a RAM/data logic circuit 38b. Each RAM control circuits 38c is connected, on the other end, to the video timing and control circuit 42 of FIG. 3 and is therefore responsive to the output signals generated therefrom. The outputs of each of the RAM/data logic circuits 38b in each bit plane are connected to a shift register 38d. In response to instructions from the video timing and control circuit 42, the RAM control circuits 38c read out the pixel data from their corresponding RAM/data logic circuits 38b, the pixel data being stored in their corresponding shift registers 38d.

Since there are four bit planes illustrated in the FIG. 3 circuit embodiment, there are four respective RAM control circuits 38c, four sets of RAM/data logic circuits 38b connected to the RAM control circuits 38c, each set including 20 RAM/data logic circuits, and four respective shift register circuits 38d connected to the output of the four respective sets of RAM/data logic circuits 38b.

The output of each of the shift registers 38d is connected to the color map memory 46 of FIG. 3. The output of the color map memory 46 is connected to a D-A converter 48, which is, in turn, connected to the electron guns of the cathode ray tube (CRT). Pixel data is supplied to each of the bit planes from the vector generator 40, of FIG. 3, which receives its information from the processor 34. Processor 34 receives its instructions from the keyboard 30 or the host computer 32.

The surface information index 50 shown in FIG. 4 is a combination of bits which are stored in memory 36 of FIG. 3. This combination of bits is created in response to actuation of certain keys on keyboard 30 wherein certain ones of the bit planes shown in FIG. 4 are selected to constitute a "surface". A bit plane is selected as part of the "surface" in response to a binary digit "1" present in the corresponding digit position of the surface information index 50. In the example shown in FIG. 4, the first two bit planes are selected to constitute a "surface", the last two bit planes not being selected to constitute the "surface". Each "surface" is responsible for generating an image on the cathode ray tube. If two "surfaces" are selected, two images will be displayed on the CRT, each image capable of being displayed independently of one another or superimposed upon one another to create a composite image. The details surrounding the selection of the appropriate "surfaces", and the generation of their images in response thereto, on the CRT, are discussed in the above-mentioned co-pending application entitled "Method and Apparatus for Displaying Images", filed on Apr. 12, 1982, and assigned a Ser. No. of 367,659, the disclosure of which has already been incorporated by reference hereinabove.

The host computer 32, in the keyboard 30, send instructions to the processor 34 which describe the original panel image, having the fill pattern disposed therein. The processor stores these instructions and thereby the original filled panel image, in memory 36. The memory 36 represents the universal space "U" shown in FIG. 2a of the drawings, and the panel outline shown in FIG. 2a represents the instructions stored in memory 36.

In operation, and referring to FIG. 3. In response to instructions from the host computer, and in accordance with the firmware stored in the ROM of the processor 34, the processor 34 retrieves the instructions from memory 36 (which describe the panel image), and issues certain commands therefrom, which are directed to the vector generator 40. The vector generator 40, in response thereto, develops certain output signals representing digital data to be stored in the video display memory 38, this digital data, stored in the video display memory 38, constituting the pixel representation of the original filled panel image. Once this digital data is stored in the video display memory 38, the video timing and control circuit 42 develops certain output signals, which are directed to the RAM control circuit 38c, in FIG. 4, for reading the pixel data from the video display memory 38. The video timing and control circuit 42 coordinates the read-out of this pixel data from the video display memory 38 with the development of the horizontal and vertical sync signals from the deflection circuit 44.

Referring to FIG. 4, a further functional description of the operation of the present invention is described, particularly with reference to the construction of the video display memory 38 of FIG. 3. The digital data developed by the vector generator 40 is stored in the RAM/data logic circuits 38b. As discussed hereinabove, if the first two bit planes are designated as being a "surface", an image is displayed on the CRT associated with these bit planes. If the last two bit planes are separately designated as constituting another "surface", two images may be independently displayed on the CRT, or superimposed upon one another to produce a composite image. The details of the generation of these multiple images are discussed in the co-pending application mentioned hereinabove entitled "Method and Apparatus for Displaying Images", filed on Apr. 12, 1982, and assigned a Ser. No. of 367,659, already incorporated by reference.

The video timing and control circuit 42 of FIG. 3 directs the RAM control circuit 38c to read the digital data (i.e., the pixel data) out from the corresponding RAM/data logic circuits 38b. The digital data from each bit plane is read therefrom, simultaneously, in parallel fashion and stored in its corresponding shift register 38d. In the example of FIG. 4, the digital data stored in the first two bit planes is read from the corresponding two sets of RAM/data logic circuits 38b, the digital data being stored in the corresponding two shift registers 38d. The digital data in the shift registers 38d is sequentially shifted out therefrom in serial fashion, and located as an index (i.e., an address) to a table stored in the color map memory 46. A brightness index is located in the color map memory 46, corresponding to the digital data shifted out from the corresponding two shift registers 38d, the brightness index determining the brightness of the image displayed on the CRT. The brightness index is converted into an analog voltage via the D-A converter 48, the analog voltage energizing electron guns for determining the brightness of the image displayed on the CRT at the particular pixel point.

The resultant image displayed on the CRT is the original filled panel image, for example, the picture of the panels shown in FIG. 1 of the drawings.

If, in response to an actuation of a "zoom" key on the keyboard 30, the operator desires to perform the zoom operation, a frame box (not shown in the drawings) will appear on the CRT screen. The frame box will be stored in memory 36 in the form of further instructions stored therein. These instructions originated from the keyboard 30 where the operator actuated the "zoom" key. The processor 34, in response to actuation of the "zoom" key on the keyboard 30, will retrieve the further instructions from memory 36, and, in response thereto, will instruct the vector generator 40 to generate the appropriate digital data for storage in the video display memory 38, for further generation of the frame box on the CRT. By operating the thumb wheels on the keyboard 30, the length and width dimensions of the frame box can be altered accordingly. By operating the thumb wheels to shorten the dimensions of the frame box, the processor 34, instructs the vector generator 40 to supply the appropriate digital data to the video display memory 38 for storage therein. This appropriate digital data now reflects the shortened frame box, along its length and width dimension thereof.

The digital data stored in the video display memory 38, which reflects the shortened frame box, along the length and width dimension thereof, is used as an index to a table stored in the color map memory 46. The table in the color map memory 46 includes a plurality of brightness indices which determine the brightness of the display on the CRT. The digital data from the video display memory 38 is used as the index to the table in the color map memory 46 to locate the corresponding brightness index. The brightness index is converted to an analog voltage via a D-A converter 48, the analog voltage determining the brightness of the displayed image on the CRT. The frame box will then appear on the CRT as part of the "displayed image", in addition to the original filled panel image.

When the operator actuates the "pan" key on the keyboard 30, the length and width dimensions of the frame box are set. The frame box 16 shown in FIG. 2a will appear on the CRT screen. Actuation of the "pan" key on the keyboard will also position a cross-hair cursor 16a in the center of the frame box 16, thus resulting in the frame box 16 shown in FIG. 2a. The generation of the frame box 16 shown in FIG. 2a, along with its cross-hair cursor 16a, is accomplished in the same manner as described hereinbefore. The memory 36 stores the frame box 16 therein, in the universal space "U" (of FIG. 2a), in the form of instructions stored therein. The processor 34, in response to actuations of the keys on the keyboard 30, will retrieve these instructions from the memory 36, and will instruct the vector generator 40 to generate the appropriate digital data for storage in the video display memory 38 in response thereto. The digital data stored in the video display memory 38 is used as an index to a table in the color map memory 46, for further determination of the brightness indices corresponding thereto. As mentioned hereinbefore, the brightness indices determine the brightness of the image displayed on the CRT. The located brightness indices are converted to an analog voltage via a D-A converter 48, the analog voltage energizing one or more electron guns to generate the image on the CRT and to determine the brightness of said image.

In response to actuation of the "view" key on the keyboard 30, the filled panel image shown in the frame box 16 of FIG. 2a undergoes a zoom operation. The image is magnified by a particular factor, the magnified image being shown in FIG. 2b. Referring to FIG. 3 of the drawings, when the "view" key on the keyboard 30 is actuated, the firmware stored in the ROM of processor 34, associated with the terminals zoom capability, accomplishes the magnification of the image being input thereto from the host computer. The processor 34 instructs the vector generator 40 to develop the appropriate digital data for storage in the video display memory 38, this appropriate digital data stored therein representing the expanded outline 12 of the filled panel shown in FIG. 2a. Since the firmware accomplishes the magnification of the image prior to instructing the vector generator to develop the appropriate digital data for storage in the video display memory 38, the width of the lines, which comprise the expanded outline 12 is approximately equal to the width of the lines which comprise the outline of the filled panel image. FIG. 2b illustrates the expanded outline 12, which is represented by the digital data stored in the video display memory 38. As mentioned hereinabove, the panel outline 12 of FIG. 2a is expanded by virtue of the firmware stored in the processor 34, associated with the terminals zoom capability. This digital data, stored in the video display memory 38, is again used as an index to the table in the color map memory 46 for further determination of their associated brightness indices. These associated brightness indices are converted into an analog voltage via the D-A converter 48, the analog voltage determining the brightness of the image displayed on the CRT.

However, in addition, when the "view" key is actuated, the firmware stored in the processor 34, associated with the terminals "panel-fill" capability, is responsible for determining which areas, on both sides of the panel outline, are inside the panel, and for completing the fill-pattern in those areas which are inside the panel outline. The filled zoomed panel image shown in FIG. 2b of the drawings, is the result. Note that all of the internal areas are completely filled with their corresponding fill-patterns. This function is accomplished by the firmware in the ROM of processor 34, in conjunction with the circuitry shown in FIGS. 3 and 4 of the drawings, in the manner hereinbefore described in the above paragraphs with reference to FIGS. 2a and 2b, wherein the lower left pixel 18 in the frame box 16 of FIG. 2a is determined to be inside or outside the panel outline 12, and, knowing the status of this pixel, the zoomed outline in the frame box 16 in FIG. 2b is scanned by the firmware in the ROM of processor 34 from left to right, bottom to top, the inside/outside status changing when the image outline 12 is crossed during the scan.

Referring to FIG. 4, a further functional description of the operation of the video display memory 38 in the circuitry of FIG. 3 will be provided hereinbelow.

As stated in the above paragraphs, the processor 34 performs the function of expanding the outline of the panel image, determining which areas on both sides of the outline are inside or outside the outline, and completing the fill-pattern in those areas which are inside the panel outline prior to generation of instructions therefrom which are directed to the vector generator 40. The vector generator 40 generates the binary, digital data, the pixel data, for storage in the video display memory 38.

In FIG. 4, the video display memory 38 includes the RAM control circuits 38c, their associated RAM/data logic circuits 38b, and their corresponding shift registers 38d. The ALU control circuits 38a, shown in FIG. 4, energize one or more of the bit planes shown in FIG. 4, each bit plane comprising one shift register 38d, one set of twenty (20) RAM/data logic circuits 20b, and one RAM control circuit 38c. As shown in FIG. 4, the first two bit planes are enabled in response to the energization thereof by their corresponding ALU control circuits 38a. An ALU control circuit energizes its corresponding bit plane in response to a binary digit "1" present in the surface information index 50. This surface information index is discussed in the pending application entitled "Method and Apparatus for Displaying Images," already incorporated by reference hereinabove.

If the first two bit planes shown in FIG. 4 are enabled, the vector generator 40 will store binary data in each of these first two bit planes representative of the zoomed, filled panel image of FIG. 2b. Since the last two bit planes shown in FIG. 4 are not enabled, binary data will not be stored in these bit planes. The binary data, stored in the first two bit planes of FIG. 4, is stored in the corresponding sets of RAM/data logic circuits 38b. Once the binary data is stored therein, the video timing and control circuit 42 causes the RAM control circuit 38c, associated with these bit planes, to read the corresponding binary data therefrom in parallel fashion, for storage in their corresponding two shift registers 38d. The corresponding shift registers 38d, sequentially in serial fashion, shift the binary data out therefrom, the shifted data being used as an index to a table stored in the color map memory 46. For each shifted piece of binary data, shifted out from the shift register 38d, a corresponding brightness index is associated therewith. The corresponding brightness index is converted to an analog voltage via the D-A converter 48, the analog voltage energizing one or more electron guns and is responsible for generation of the brightness of the image at the pixel point on the CRT. A further detailed discussion of the construction and operation of the RAM/data logic circuits 38b is presented in the copending application mentioned hereinabove, entitled "Method and Apparatus for Displaying Images", filed on Apr. 12, 1982, and assigned a Ser. No. of 367,659, already incorporated by reference.

The firmware, stored in the ROM of processor 34, is characterized by an algorithm. The algorithm includes two parts: the first part represents the zoom algorithm and the panel fill algorithm; the second part represents definitions of the undefined terms present in the algorithm of the first part.

Appendix A, attached hereto, provides the definitions of the undefined terms present in the algorithm of the first part.

Appendix B1 provides the zoom algorithm.
Appendix B2 provides the panel-fill algorithm.

APPENDIX A

9.3.1 CONTEXT RESERVATION SUBSYSTEM

FUNCTION:

This system keeps the various asynchronous processes in the display system from colliding with each other. It does this through a hierarchy of special monitors which prevent the execution of critical sections of code while another process is relying on the values of selected global variables. There is also a context saving section which will save the current state of these variables when a higher priority process must use them.

DATA AND CONTROL FLOW:

???

DATA REFERENCES:

???

MODULES REFERENCED:

???

DATA DEFINITIONS:

???

PROCEDURES:

| | | |
|---|---|---|
| D12NewAction | D2NWAC | Called to request a new context in the hardware registers |
| D12NoAction | D2NOAC | Called to indicate current hardware register context is invalid |
| D12PushBeamContext | D2PSBM | Saves the state of global variables used by several systems to control the graphics environment |
| D12PopBeamContext | D2PPBM | Restores the graphics context |
| D12ReserveScroll | D2LOCK | Requests ownership of the scroll system |
| D12ReleaseScroll | D2LOCK | Releases ownership of the scroll system |
| D12ReserveDA | D2LOCK | Requests ownership of the dialog area |
| D12ReleaseDA | D2LOCK | Releases ownership of the dialog area |
| D12ReserveDADis | D2LOCK | Requests ownership of both the dialog area and the display system |
| D12ReleaseDisDA | D2LOCK | Releases the ownership of both |
| D12ReserveDisplay | D2LOCK | Requests ownership of the display system |
| D12ReleaseDisplay | D2LOCK | Releases ownership of the display system |
| D12ReserveHW | D2LOCK | Requests ownership of the display hardware |
| D12ReleaseHW | D2LOCK | Releases ownership of the display hardware |
| D12EnterSemaphore | D2LOCK | Requests ownership of the display hardware in a state where the hardware is ready and no context preserved |

9.3.1.1 D12NewAction (D2NWAC) -

FUNCTION:

This routine is called to insure that specific hardware registers are set up with the context being requested. The specific hardware registers involved are:

- SR1 SR2 -- the 32 shift register used for dash patterns
- GRmode01 GRmode2 -- the ALU operation and enable registers
- ColControl -- specifies single or dual mode index writing
- ColFile -- defines gray index used for writing
- Xaxis Yaxis -- current position of the vector generator In addition, whenever the current action is for vectors, the contents of the shift register are preserved, thereby maintained the phase of dash patterns through sequences of line segments, despite whatever intervening uses the hardware is put to.

CALLING SEQUENCE:

Call D12NewAction(bx:action)

```
action: <0..3>  0 = NoAction (save dash mask)
                1 = DiaAction (set up for dialog area)
                2 = VecAction (set up for vectors)
                3 = GalfAction (set up for graphic alpha)
Near call
```

DATA REFERENCES:

???

MODULES REFERENCED:

D12XYsnove

DATA DEFINITIONS:

???

PROCEDURES:

```
Wait for the hardware to be unbusy
If (Action <> LastAction) then
    If (LastAction = VecAction) then
        Save SR1 SR2 in CrntDash1 CrntDash2
    LastAction := Action
    Case LastAction of
        NoAction
        VecAction
            SR1 SR2 := CrntDash1 CrntDash2
            ALU := GRmode01 GRmode2
            ColControl := GRindexMode
            ColFile := GPindex GPbackIndex
```

9.3.1.2 D12NoAction (D2NOAC) -

FUNCTION:

This routine saves the correct phase of the dash mask if the current context in the hardware is for vectors, and sets the current action as undefined, so that whenever any defined action occurs, the hardware will be properly initialized

CALLING SEQUENCE:

Call D12NoAction

No parameters
Near call

DATA REFERENCES:

???

MODULES REFERENCED:

MonAwaitR
MonSendR

DATA DEFINITIONS:

???

PROCEDURES:

Reserve the display hardware (MonAwaitR)
If (LastAction = VecAction) then
    Wait for the hardware to be ready
    Save SR1 SR2 in CrntDash1 CrntDash2
LastAction := 0 (NoAction)
Release the display hardware (MonSendR)

9.3.1.3  D12PushBeamContext (D2PSBM) -

FUNCTION:

This routine saves the beam context of the current task to allow a higher priority task to execute without regard to restoring the initialization of global variables used by the lower priority task. Because of the nature of the system, the beam context never needs to be saved more than once at a time, and so a static area is used to save just one image, and a counter is used to insure that only the outermost invocation of this routine actually writes over this area.

Both this routine and the corresponding pop routine use a table in ROM which indicates what variables to save and restore. In addition, after saving all the data required, this routine resets several variables to a pristine state.

CALLING SEQUENCE:

Call D12PushBeamContext

No parameters
Near call

DATA REFERENCES:

???

MODULES REFERENCED:

D12AlphaUpdate
D12Noaction
D12Gezotz?

DATA DEFINITIONS:

???

PROCEDURES:

Update the current position in case alpha has occured
    (D12AlphaUpdate)
Save current dash pattern phase (D12NoAction)
Increment ContextCount
If (ContextCount = 0) then (this is the outermost call)

```
    Save the variables defining beam context
    CrntDslBlk := 0 (stop display list construction)
    EdgeSave := 0 (stop panel edge collection)
    ViewDataPtrH := (disconnect the current panel list)
    Reconstruct the alpha mask (D12Gezotz?)
```

9.3.1.4 D12PopBeamContext (D2PPBM) -

FUNCTION:

This routine restores the beam context saved by PushBeamContext.

CALLING SEQUENCE:

Call D12PopBeamContext

No parameters
   Near call

DATA REFERENCES:

???

MODULES REFERENCED:

DspSetFillPattern
D12AlphaCharSize
D12NoAction
D12AlphaUpdate
D12Gezotz?

DATA DEFINITIONS:

???

PROCEDURES:

```
    Invalidate the contents of the hardware (D12NoAction)
    Decrement ContextCount
    If (ContextCount < 0) then (we're back out to the outermost call)
       Restore the beam context variables from the save area
    Set all the internal fill pattern variables (DspSetFillPattern)
    MoveFlag := 0 (to insure clipcodes, etc. start out right)
    Reset the alpha character size properly (D12AlphaCharSize)
    Update the current position to reflect alpha motion (D12AlphaUpdate)
    Rebuild the alpha clipping mask (D12Gezotz?)
```

9.3.1.5 Display System Semaphores (D2LOCK) -

FUNCTION:

The semaphore subsystem controls access to variables global to the entire D12 system and access to the vector generator hardware.

There are four semaphores: Scroll, DA (Dialog Area), Display, and HW ( vector generator hardware). The Scroll and DA semaphores controll access to the dialog area; they make sure that the environment assumed by one part of the dialog area implementation is not changed by another task. The Display semaphore protects the environment of the rest of the display subsystem, and the HW semaphore ensures that the state of the vector generator registers is not changed without the knowledge of the current task.

Semaphores must be reserved and released in a strict nesting order. The order is 1.DA, 2.Display, 3.HW when reserving, and the reverse when releasing. If the order is not preserved, the display system will go to sleep forever.

The semaphores for Dialog Area, Scroll buffer and Hardware are all straightforward and identical. Each semaphore is associated with an exchange. The semaphore is incremented, and if it then equals 0, the resource is available and automatically reserved. If it is greater than zero then the caller must wait for the resource to be freed. A call to MonAwaitR is made to wait on the corresponding exchange (DA, Scroll or HW), until the resource has been freed. A corresponding action occurs to release the resource, decrementing then sending a message if necessary.

D12EnterSemaphore is a little trickier. After having reserved the hardware, it additionally waits for the hardware to be ready and also saves the current dash mask phase (through a call to D12NewAction).

Trickiest of all are the routines for the display. The call structure of the display system is such that in order to provide adequate protection, routines which must reserve the display must call routines which also reserve the display. The display must be reserved only once per task, otherwise the system will come to a grinding halt.

In order to assure this, if the calling procedure fails to get the display resource, the task it belongs to checked. If it happens to be the current owner of the display resource, the request is granted, and an internal display depth counter is incremented. If the calling procedure acquires the display resource, either immediately or after waiting on the exchange, its task becomes the new owner and the display depth is reset to 0. A similar process happens to release the display.

DATA AND CONTROL FLOW:

???

```
       Xaxis Yaxis := Xview+XviewCorner Yview+YviewCorner
           (D12XYshove)
   DiaAction
     ALU := DiaMode01 DiaMode2
     ColControl := OverstrikeReplace
     ColFile := LogCharIndex LogBackIndex
     Xaxis Yaxis := AlBeamX AlBeamY (D12XYshove)
   GalfAction
     ALU := GRmode01 GRmode2
     ColControl := GraphicMode
     ColFile := GTIndex GRbackIndex
     Xaxis Yaxis := Xview+XviewCorner Yview+YviewCorner-4
         (D12XYshove)
```

-27-

DATA REFERENCES:

???

MODULES REFERENCED:

D12NewAction
MonIsendR

DATA DEFINITIONS:

???

PROCEDURES:
???

APPENDIX B1

9.2.3.2.6.1 DspRenew (D2RNEW) -

FUNCTION:

This routine is the external interface for renewing one or multiple views.

CALLING SEQUENCE:

Call DspRenew(ViewNumber)

ViewNumber: <integer>  Specifies the view to be renewed.
                                  1 - 64 specifies a view of the
                                       same number, if it exists
                              0     Renew the current view
                              -1    Renew all views PLM compatible

DATA REFERENCES:

???

MODULES REFERENCED:

```
D12Page
DspViewCycle
D12Rectangler
DspSelectView
DspReserveDaDis
DspReleaseDaDis
D12reserveDA
D12releaseDA
D12WriteDA
MonErrorLogR2
DspSuspendFrame
DspRestoreFrame
D12EnterSemaphore
D12releaseHW
D12UnGezotz
```

DATA DEFINITIONS:

???

PROCEDURES:

```
Reserve dialog area and display systems (DspReserveDaDis)
Suspend all framing operations (DspSuspendFrame)
Case of viewnumber
   <0
      Reserve display hardware and wait until ready
         (D12enterSemaphore)
      Disable alpha cursor momentarily (D12ungezotz)
      Erase the whole screen (D12rectangler)
      Release the display hardware (D12releaseHW)
      Cycle through each view, redisplaying segments
         (DspViewCycle)
   =0
      Redisplay the current view (D12page)
   >0
      If the view number is above 64 then
         Set it to 64
      If the view exists then
         Select that view (DspSelectView)
         Redisplay it (D12page)
         Select the current view (DspSelectView)
      Else
```

Log an error (MonErrorLogR2)
Restore any framing operations (DspRestoreFrame)
Release the dialog area and display systems (DspReleaseDaDis)
If the dialog area is visible then
   Initiate a rewrite of the dialog area (D12writeDA)
   Wait until the dialog area is rewritten (D12reserveDA, D12releaseDA)

9.2.3.2.6.2 D12Page (D2PAGE) -

FUNCTION:

This routine erases the current view and handles other housekeeping associated with redisplay the segments within it.

CALLING SEQUENCE:

Call D12Page

No arguments
   Near call

DATA REFERENCES:

???

MODULES REFERENCED:

D12SetWipeParameters
   D12Rectangler
   DspRenewView
   DspSetBorder
   DspSegXY
   D12UnGezotz
   D12EnterSemaphore
   D12releaseHW

DATA DEFINITIONS:

???

PROCEDURES:

Preserve the display hardware and wait until ready
      (D12enterSemaphore)
   Disable the alpha cursor for a moment (D12ungezotz)
   Set up the wipe parameters for erasing the current view
      (D12setWipeParameters)
   Erase the current view (D12rectangler)
   Release the display hardware (D12releaseHW)
   Flag the view border as down
   Flag the rubberband line as not visible
   Flag vectors as visible
   Redisplay segments in the current view (DspRenewView)
   Save the vector visibility state
   Flag vectors as visible
   If the border is to be visible then
      Redisplay the border (DspSetBorder)
   If the standard cursor is visible then
      Redisplay it in its proper position (DspSegXY)
   Restore the vector visibility state
   If fixup level is lower than 2 then
      Turn vector visibility off Flag display not full (for auto-page/copy)

9.2.3.2.6.3 DspRenewView (D2REVW) -

FUNCTION:

This routine traverses the segment list of the current view, activating the redisplay of each segment in turn.

CALLING SEQUENCE:

Call DspRenewView

No arguments
    PLM compatible

DATA REFERENCES:

???

MODULES REFERENCED:

DspDisplaySeg
    D12FreeAuxData
    D12pushBeamContext
    D12popBeamContext
    D12SetSegTransform

DATA DEFINITIONS:

???

PROCEDURES:

Save command code for future errors
    If a segment is currently open then
        Throw away its partial panel edge list (D12freeAuxData)
        Turn off edge saving
    Save the current beam context (D12pushBeamContext)
    Initialize the visible segment list block pointer
    Enable display traversal cancelation
    While there is still a valid visible segment list block do
        Initialize the visible segment list offset pointer
        While there are still entries in the current block do
            Extract pointers to the segment header and to the
                panel edge list
            If panel lists are to be reconstructed then
                Throw away the panel edge list (recover memory)
                    (D12freeAuxData)
            Display the current segment in the list (DspDisplaySeg)
            If the panel edge list building was aborted then
                Throw away any remains of the edge list (D12freeAuxData)
            If a display cancel has been requested then
                Throw away the edge list and mark appropriately
                    in the edge list pointer for this entry
                    (D12freeAuxData)
                Goto 1
            Else
                Save the edge list pointer in the current entry
            Advance to the next entry in this block
        Advance to the next block in the list
        If a panel edge list construction was aborted then
            Flag all panel edge list must be reconstructed
        Else
            Flag all panel edge lists as reconstructed
    1:Disable segment traversal cancellation
        Flag blink list reset
        Restore beam context (D12popBeamContext)
        If a segment is currently open then
            Disconnect the display list from display list building
            Flag no segment open Redisplay the open segment (DspDisplaySeg)
Restore display list building
Flag segment currently open
Establish the image transform of the open segment
     (D12SetSegTransform)

9.2.4.1 VIEWS SUBSYSTEM -

FUNCTION:

Handles the modification of view parameters and the definition of new and current views. This system also handles the operator interface to views, including the view keys and the framing system.

DATA AND CONTROL FLOW:

???

DATA REFERENCES:

???

MODULES REFERENCED:

???

DATA DEFINITIONS:

???

PROCEDURES:

This system is itself composed of several subsystems.

| | |
|---|---|
| VIEW FRAMING | This system provides the user interface for defining the extent of windows and viewports, either explicitly, or through the use of a framing box, which provides a stepwise zoom and pan capability |
| VIEWS MAINTENANCE | This system maintains the descriptions of multiple views, and allows the user to peruse through them |

9.2.4.1.1 VIEW FRAMING SUBSYSTEM -

FUNCTION:

This system provides the user interface for defining the extent of windows and viewports, either explicitly, or through the use of a framing box, which provides a stepwise zoom and pan capability.

DATA AND CONTROL FLOW:

???

DATA REFERENCES:

???

MODULES REFERENCED:

???

DATA DEFINITIONS:

???

PROCEDURES:

| | | |
|---|---|---|
| DspSetWindow | D2SWIN | External interface for changing the window of the current view. |
| DspSetViewport | D2SVEW | External interface for changing the current viewport. |
| Dl2WindoViewScale | D2WVSC | Computes the transformation which corresponds to the current window viewport mapping. |
| Dl2MapWindoView | D2WVMP | Performs a simple 5/32's (640/4096) multiply for converting viewport coordinates. |
| DspView | D2VIEW | Dummy routine for the common VIEW function. |
| DspZoomKey | D2FKEY | Handles the framing key strokes and framing thumbwheel movement by calling the appropriate routines. |
| DspPan | D2PANZ | External interface for entering or leaving PAN mode. |
| DspZoom | D2PANZ | External interface for entering or leaving ZOOM mode. |
| DspFrameView | D2FVW | Redefines the current window to match the frame and renews the viewport. |
| DspSetBorder | D2BORD | Manages display of the viewport border. |
| DspOverView | D2OVEP | Adjusts the window for a temporary view of the entire display space. |
| DspNormal | D2NOPM | Adjusts the frame to preserve the aspect ratio of the viewport. |
| DspFrame | D2FUPD | Manages display of the frame. |
| DspSuspendFrame | D2FUPD | Removes the frame temporarily. |
| DspRestoreFrame | D2FUPD | Restores the frame. |
| DspModifyFrame | D2FMOD | Modifies the frame size and position. |
| DspFramePosCheck | D2FPCH | Constrains the position of the framing box to the viewport. |
| DspFrameStack | D2FSTK | Stores the current window and frame definition on the framing stack. |
| DspFrameRestore | D2FRES | Restores the window and frame definition from the framing stack. |
| DspLockViewKeys | D2LKVW | Disables the framing keys. |

9.2.4.1.1.1 DspSetWindow (D2SWIN) -

FUNCTION:

This routine is the external interface for defining the current window for the current view. A pair of coordinates is passed which defines the opposite corners of the window in 4K space. If either the X window size or the Y window size is specified as 0, then it will be calculated so that the window will have the same aspect ratio as the viewport. If both are 0, then the window is set to its default (power up) state.

CALLING SEQUENCE:

Call DspSetWindow(Xmin,Ymin,Xmax,Ymax)

Xmin,Ymin: <0..4095>  Lower left corner of the new window
Xmax,Ymax: <0..4095>  Upper right corner of the new window
                     (Actually, these pairs only need to
                     be opposite corners, since this
                     routine will swap them if necessary)

PLM compatible

DATA REFERENCES:

???

MODULES REFERENCED:

D12WindowViewScale
   MonErrorLogR2
   D12SetSegTransform
   D12MoveDirect
   D12ReserveDisplay
   D12ReleaseDisplay

DATA DEFINITIONS:

???

PROCEDURES:

9.2.4.1.1.2 DspSetViewport (D2SVEW) -

FUNCTION:

This routine is the external interface for defining the current viewport of the current view. Although the actual limits of the screen are 640 by 480, the viewport is expressed in a normalized device coordinate space of 4095 by 4095.

CALLING SEQUENCE:

Call DspSetViewport(Xmin,Ymin,Xmax,Ymax)

Xmin,Xmax: <0..4095>   Minimum and maximum X values for
                          the viewport
   Ymin,Ymax: <0..3071>   Minimum and maximum Y values for
                          the viewport
                          (These pairs can be entered as
                          any opposite corners of the
                          viewport)

PLM compatible

DATA REFERENCES:

???

MODULES REFERENCED:

D12WindoViewScale
   D12MapWindoView
   MonErrorLogR2
   D12MoveDirect
   D12SetSegTransform
   D12ReserveDisplay
   D12ReleaseDisplay
   DspSetBorder

DATA DEFINITIONS:

???

PROCEDURES:

???

9.2.4.1.1.3 D12WindoViewScale (D2WVSC) -

FUNCTION:

This routine is used to compute the window/viewport transformation and to detect overflow of the limits of the transformation. The actual transformation matrix is maintained as a set of 32 bit fixed point numbers, and it is possible to define window/viewport transformations which will not fit in this range.

This routine will only update the current window/viewport transformation if it is valid; otherwise, it returns an error.

CALLING SEQUENCE:

Call D12WindoViewScale-> ax:Overflow

Overflow: <0..1>        0 = valid transformation
                                  1 = overflow Near call

DATA REFERENCES:

???

MODULES REFERENCED:

D12MultFixFix
D12SetWVtransform

DATA DEFINITIONS:

???

PROCEDURES:

???

9.2.4.1.1.4 D12MapWindoView (D2WVMP) -

FUNCTION:

This routine is used to map coordinates from 4K space to 640 space. It does a quick false multiply using shifts and adds to compute the ratio 5/32.

CALLING SEQUENCE:

Call D12MapWindoView(ax:value)-> ax:result value: <integer>      Value to be transformed
    result: <integer>     Result := Value*5 DIV 32
    Near call

DATA REFERENCES:

???

MODULES REFERENCED:

none

DATA DEFINITIONS:

???

PROCEDURES:

???

9.2.4.1.1.5 DspView -

FUNCTION:

For the common 4110 series terminal, there is a common function which is to be invoked when the shift key is pressed, to bring a DVST out of view-hold. Since this terminal is raster based and has no such function, this routine does nothing, simply returning to its caller.

CALLING SEQUENCE:

Call DspView

No parameters
        PLM compatible

DATA REFERENCES:

???

MODULES REFERENCED:

none

DATA DEFINITIONS:

???

PROCEDURES:

Return 9.2.4.1.1.6  DspZoomKey (D2FKEY) -

FUNCTION:

This routine accepts framing key strokes and thumbwheel reports at the KbdZoomOX exchange and transfers control to the appropriate routine.

CALLING SEQUENCE:

Message sent to KbdZoomOX exchange with KeyStroke at byte 10, HorizontalThumb at byte 11 and VerticalThumb at byte 13

KeyStroke: <byte>           A key stroke number or a value
                                    indicating that a thumbwheel
                                    was turned
        HorizontalThumb: <byte>     Amount of horizontal-thumbwheel
                                    movement
        VerticalThumb: <byte>       Amount of vertical-thumbwheel
                                    movement Far call

DATA REFERENCES:

???

MODULES REFERENCED:

DspPan
    DspZoom
    DspFrameView
    DspNormal
    DspOverView
    DspSetBorder
    DspModifyFrame
    DspFrameRestore
    DspSelectView
    DspZoomKey
    DspReserveDaDis
    DspReleaseDisDa
    DspSuspendFrame
    DspRestoreFrame
    MonAwaitR
    MonGDisposR
    KbdLON
    KbdLOF
    KbdBel

DATA DEFINITIONS:

???

PROCEDURES:

```
Repeat Forever
  MonAwaitR(ax:-1,si:KbdZoomOX)
      (Wait forever at the KbdZoomOX exchange for a message)
  KeyStroke = 10th byte of message
  HorizontalThumb = 11th byte of message
  VerticalThumb = 13th byte of message
  MonQDisposR(si:KbdZoomOX)
      (Dispose the Q block message)
  KeyStroke = KeyStroke-FF9CH
  If ((The framing keys are locked) or (KeyStroke does not represent
        an Immediate Action Key and we are in Setup)) then
      (The framing keys are locked with the <Lock-Viewing-Keys> command
       (<esc>RJ). The Immediate Action Keys are: <NEXTVIEW>,<BORDER>,
       (<ctrl> <NEXTVIEW>),(<ctrl> <PAN>) and (<ctrl><BORDER>))
      If KeyStroke does not indicate a thumbwheel movement then
          Turn the KYBD LOCK light on for .075 seconds
          Turn the KYBD LOCK light off
          Sound the bell
              (We do not sound this warning for thumbwheel movement
               because of the constant ringing effect that can occur which
               is annoying)
  Else    (we execute the keystroke or thumbwheel movement)
      DspReserveDaDis  (Reserve the dialog and display semaphores)
      If KeyStroke indicates thumbwheel movement then
          If the <ctrl> key is depressed then
              KeyStroke = KeyStroke+8
          DspModifyFrame(bx:KeyStroke)
      Else        (KeyStroke represents an actually key depression)
          Case of
              (Jump thru a table indexed by KeyStroke to the appropriate
               section of code)
              <RESTORE> or <ctrl> <RESTORE> key:
                  (Shift <VIEW> or <ctrl> Shift <VIEW>)
                  DspFrameRestore(BX:KeyStroke)
              <OVERVIEW> or <ctrl> <OVERVIEW> key:
                  (Shift <PAN> or <ctrl> Shift <PAN>)
                  DspOverView(bx:KeyStroke)
              <BORDER> or <ctrl> <BORDER> key:
                  (Shift <NEXTVIEW> or <ctrl> Shift <NEXTVIEW>)
                  DspBorder(2)  (To toggle the border)
                      (DspBorder ignores the <ctrl> key)
              <NORMAL> or <ctrl> <NORMAL> key:
                  (Shift <ZOOM> or <ctrl> Shift <ZOOM>)
                  DspNormal(bx:KeyStoke)
              <OTHERVIEW> operation (<ctrl> <VIEW>):
                  DspSuspendFrame
                  DspSelectView(0)
                  DspFrameView
                  DspSelectView(-1)
                  DspRestoreFrame
                      (Take the frame down, select the next higher-numbered
                       view, renew that view using the window defined by the
                       frame in the original view, return to that original view by selecting the next lower-numbered view, and put
                       the original frame back up.)
              <VIEW> key:
                  DspFrameView
              <PAN> key:
                  DspPan
              <PREVIOUSVIEW> operation (<ctrl> <NEXTVIEW>):
                  Save CurrentView
                  DspSelectView(-1)   (select next lower-numbered view)
                  If new-CurrentView <> Old-CurrentView then
```

```
                    (There is at least 2 views so we blink the border on
                    the new view in XOR mode to avoid wiping out the border
                    pixels in the new viewport.)
                    BupDown.HighByte = FFH    (set XORflag True)
                    DspSetBorder(2)           (toggle border)
                    MonAwaitR(10)             (wait 1/4 second)
                    DspSetBorder(2)           (toggle border)
                    BupDown.HighByte = 0      (set XORflag False)
                <NEXTVIEW> key:
                    Save CurrentView
                    DspSelectView(0)   (select next higher-numbered view)
                    If new-CurrentView <> Old-CurrentView then
                        (There is at least 2 views so we blink the border on
                        the new view in XOR mode to avoid wiping out the border
                        pixels in the new viewport.)
                    BupDown.HighByte = FFH    (set XORflag True)
                    DspSetBorder(2)           (toggle border)
                    MonAwaitR(10)             (wait 1/4 second)
                    DspSetBorder(2)           (toggle border)
                    BupDown.HighByte = 0      (set XORflag False)
                <ctrl> <ZOOM> key:
                    DspModifyFrame(si:-192,di:-192)
                <ZOOM> key:
                    DspModifyFrame(si:KeyStroke)
                <ctrl> <PAN> key:
                    (No action is taken)
            End-Case
        End-Repeat
        End
```

9.2.4.1.1.7 DspSetBorder (D2BORD) -

FUNCTION:

This routine draws or undraws the border.

CALLING SEQUENCE:

Call DspBorder(ActionCode)

ActionCode: <integer>        0: Turn border off
                                                1: Turn border on
                                                2: Toggle border Far call

DATA REFERENCES:

???

MODULES REFERENCED:

DspLineIndex
Dsp4014Line
D12MoveDirect
DspDrawDirect
DspSegMode
DspNearCaller
DspReserveDaDis
DspReleaseDisDa
DspSetBorder
DspSelectView
DspSuspendFrame
DspRestoreFrame
DspXORLineEnter
DspXORLineExit
MonErrorLogR2

DATA DEFINITIONS:

???

PROCEDURES:

```
        If (ActionCode < 0 or Action > 2) then
          MonErrorLogR2('RE11'-equivalent)
        Else
          (Note originally BorderOn represented "The desired status of
           border" and BupDown represented "The current actual status of
           border." There is some redundancy in the use of these variables.
           BupDown.HighByte is used as XORflag, a byte flag (0 or FFH)
           indicating whether or not the border is to be written in XOR mode,
           a mode used to blink the border off and on without destroying the
           pixels under the border.)
          If ActionCode = 2 then
            ActionCode = XOR(BorderOn,1H)
                (BorderOn = 0 if the border is not on
                 BorderOn = 1 if the border is on
                 To toggle, we force Actioncode to be the opposite of
                 BorderOn.)
          original-BorderOn = borderOn
          BorderOn = ActionCode
          BupDown.LowByte = ActionCode
                (Set BorderOn and BupDown to the value of the border's presence
                 after this routine is executed.)
          BupDown.LowByte = ActionCode
          If ActionCode <> original-BorderOn then
               (The border must be drawn to turn it on or off.)
            If NOT TourViews then
              DspSuspendFrame
                  (If TourViews True, then we do not want to blink the border
                   because we are traversing all of the viewports and blinking
                   all the borders is distracting (besides slowing the
                   process))
            DspXORLineEnter
                (Save the beam context. Also the writing mode is changed to
                 XOR)
            Dsp4014Line(60H)   (Request a solid line)
            Save DefSegStatus
                (Save the default writing mode for nonretained segments in
                 order to draw the border in the mode that we choose (SET or
                 XOR).)
            If BupDown.HighByte = 0 then   (XORflag False)
                (For XORflag True, the call: DspLineIndex(BorderIndex)
                 should be made. This is missing and is a bug.)
              If BupDown = 1 then     (bring border up)
                DrawIndex = BorderIndex
              Else                    (bring the border down)
                DrawIndex = GrBackIndex
                    (we erase the border by drawing with the viewport wipe
                     index)
              DspLineIndex(GrBackIndex)
              DspSegMode(-2,1)
                  (Set the default writing mode to SET)
            Move(ax:XWindoCorner,dx:YWindoCorner)
                (Move to lower left corner)
            Draw(ax:XWindoCorner,dx:YWindoCorner+YWindoSize)
                (Draw to upper left corner)
            Draw(ax:XWindoCorner+XWindoSize,dx:YWindoCorner+YWindoSize)
                (Draw to upper right corner)
            Draw(ax:XWindoCorner+XWindoSize,dx:YWindoCorner)
                (Draw to lower right corner)
            Draw(ax:XWindoCorner,dx:YWindoCorner)
                (Draw to lower left corner)
            Restore DsfSegStatus
                (Reset the default writing mode)
            DspXORLineExit    (Restore the beam context)
        Exit
         Local Procedure Move(ax:X,dx:Y)
          D12MoveDirect(X,Y)
          Return
```

```
Local Procedure Draw(ax:X,dx:Y)
    D12DrawDirect(X,Y)
    Return
End
```

9.2.4.1.1.8  DspPan,DspZoom (D2PANZ) -

FUNCTION:

This DspPan routine executes the PAN key function of entering the PAN submode of Framing Mode or exiting Framing Mode. This DspZoom routine executes the ZOOM key function of entering ZOOM submode of Framing Mode or exiting Framing Mode.

CALLING SEQUENCE:

Call DspPan
    Call DspZoom

No Parameters
        Far calls

DATA REFERENCES:

???

MODULES REFERENCED:

DspFrame

DATA DEFINITIONS:

???

PROCEDURES:

```
DspPan:
  Case of
    DspFmode = 0:
        (Originally not in framing mode so we enter pan submode)
        FrameInit
        DspFmode = 2   (signify Pan submode)
        DspFrame(nonzero value)   (put frame up)
    DspFmode = 1:
        (Originally in Zoom submode so we enter pan submode)
        DspFrame(0)   (take frame down)
        DspFmode = 2   (signify Pan submode)
        DspFrame(nonzero value)   (put new frame up)
    DspFmode = 2
        (Originally in pan submode so we exit framing mode)
        DspFrame(0)   (take frame down)
        DspFmode = 0   (signify not in framing mode)
DspZoom:
  Case of
    DspFmode = 0:
        (Originally not in framing mode so we enter Zoom submode)
        FrameInit
        DspFmode = 1   (signify Zoom submode)
        DspFrame(nonzero value)   (put frame up)
    DspFmode = 1:
        (Originally in Zoom submode so we exit framing mode)
        DspFrame(0)   (take frame down)
        DspFmode = 0   (signify not in framing mode)
    DspFmode = 2:
        (Originally in pan submode so we enter Zoom submode)
        TakeFrameDown
        DspFmode = 1
        DspFrame(nonzero value)   (put frame up
Exit
```

```
FrameInit
    FWidth = XWindoSize
    FWidthOriginal = XWindoSize
    FXcent = 2*(XWindoCorner+(XWindoSize/2))
        (FXcent has a 1 bit fraction and represents the X center point
        of the frame in units of one-half Tek points)
    FHeight = YWindoSize
    FHeightOriginal = YWindoSize
    FYcent = 2*(YWindoCorner+(YWindoSize/2))
        (FYcent has a 1 bit fraction and represents the Y center point
        of the frame in units of one-half Tek points)
End
```

9.2.4.1.1.9 DspModifyFrame (D2FMOD) -

FUNCTION:

This routine modifies the size and/or position of the framing box taking into account the limits on its position and size. It also renews the frame.

CALLING SEQUENCE:

```
Call DspModifyFrame(bx:CtrlKeyStroke,si:HorizontalThumb,
                    di:VerticalThumb)

CtrlKeyStroke: <byte>   CtrlKeyStroke < ThumbwheelCtrlValue:
                                <ctrl> key not pressed
                            CtrlKeyStroke >= ThumbwheelCtrlValue:
                                <ctrl> key pressed
    HorizontalThumb: <integer>      Horizontal thumbwheel movement
    VerticalThumb:   <integer>      Vertical thumbwheel movement
    Far call
```

DATA REFERENCES:

???

MODULES REFERENCED:

DspFrame

DATA DEFINITIONS:

???

PROCEDURES:

```
DspSuspendFrame    (bring the frame down)
If DspFmode = 0 then   (Pan submode)
    HorizontalMovement = (HorizontalThumb*XWindoSize)/3000
        (Note that as the framing box gets wider, it moves faster
        horizontally)
    If HorizontalThumb <> 0 then
        If HorizontalThumb > 0 then
            Increment HorizontalMovement
        Else
            Decrement HorizontalMovement
            (We guarantee at least one Tek point horizontal movement if
            the horizontal thumbwheel is moved)
    FXcent = FXcent+HorizontalMovement
    VerticalMovement = (VerticalThumb*XWindoSize)/3000
        (Note that as the framing box gets taller, it moves faster
        vertically)
    If VerticalMovement <> 0 then
        If VerticalMovement > 0 then
            Increment VerticalMovement
        Else
            Decrement VerticalMovement
```

```
            {We guarantee at least one Tek point vertical movement if the
            vertical thumbwheel is moved}
     FYcent = FYcent+VerticalMovement
  Else                      {Zoom submode}
    HorizontalThumb = Maximum(HorizontalThumb,-256)
    VerticalThumb = Maximum(VerticalThumb,-256)
    If <ctrl> key was not pressed then
       If HorizontalThumb = 0 then
          HorizontalThumb = VerticalThumb
             {If the <ctrl> key was not pressed then we use the
             horizontal thumbwheel's movement unless only the vertical
             thumbwheel was moved in which case we use that movement}
    new-Fwidth = (Fwidth*(HorizontalThumb+512))/512
    If HorizontalThumb <> 0 then
       If HorizontalThumb > 0 then
          Increment new-Fwidth
       Else
          Decrement new-Fwidth
             {We guarantee that the width of the framing box will increase
             by at least one Tek point if the horizontal thumbwheel is
             moved or the vertical thumbwheel was moved and the <ctrl> key
             was not pressed}
    new-Fheight = (new-Fwidth*FheightOriginal)/FwidthOriginal
       {We adjust the height so that the aspect ratio
       (new-Fheight/new-Fwidth) = (FheightOriginal/FwidthOriginal)}
    If <ctrl> key was pressed then
       new-Fheight = (Fheight*(VerticalThumb+512))/512
       If VerticalThumb <> 0 then
          If VerticalThumb > 0 then
             Increment new-Fheight
          Else
             Decrement new-Fheight {We guarantee that the height of the framing box will
             increase by at least one Tek point if the <ctrl> key was
             pressed and the vertical thumbwheel was moved}
    FrameSizeCheck(ax:XwindoSize,si:new-Fwidth,di:new-Fheight)->
       si:(adjusted)new-Fwidth , di:new-Fheight
    FrameSizeCheck(ax:YwindoSize,si:new-Fheight,
       di:(adjusted)new-Fwidth)-> si:(adjusted)new-Fheight,
       di:(adjusted)new-Fwidth
          {The framing box's width and height are adjusted so that they
          are not too large. We now drop the prefix "adjusted"}
    If (new-Fwidth <= Fwidth or new-Fheight <= Fheight) then
          {If the frame has shrunk then we test for minimum size limits}
       If (Fwidth >= XwindoSize/16 and Fheight >= YwindoSize/16 and
          Fwidth >= 8 and Fheight >= 8) then
          If (XviewSize/Fwidth <= 8 and YviewSize/Fheight <=8) then
             {This restriction is imposed by limits on the elements of
             the window-viewport transformation matrix}
          Fwidth = new-Fwidth
          Fheight = new-Fheight
          If <ctrl> key was pressed then
             FwidthOriginal = Fwidth
             FheightOriginal = Fheight
                {We reset the "original" definitions so that the new
                aspect ratio will be preserved}
          DspFramePosCheck
             {Given that the size of the framing box is adjusted, the
             routine DspFramePosCheck will move it as necessary to
             stay within the 4K by 4K space and to require at least
             1/8 of the framing box to be in the viewport}
    DspRestoreFrame    {bring the frame up}
Exit
FrameSizeCheck(ax:OriginalSize1,si:Size1,di:Size2)->
si:(adjusted)Size1
   Size1Limit = Minimum(4*OriginalSize1,4095)
   (adjusted)Size1 = Size1
If Size1 > Size1Limit then
   (adjusted)Size1 = Size1Limit
   If <ctrl> key was not pressed then
``` size2 = (size2*((adjusted)size1/size1)
        (preserve the aspect ratio)
End

PROCEDURES:

Increment Fcurrent
   If Fcurrent > 4 then
       (If we store a frame into a full stack then we first push down
       the top 3 items on the stack and leave the first item
       representing the "original" window-and-frame-definitioin alone)
       Move item 2 onto item 1
       Move item 3 onto item 2
       Decrement Fcurrent
   FNStacked = Fcurrent
       (Set the top of stack)
   Store the following 11 words in order into the Fcurrent place in the
       Fstack array: XwindoCorner,YwindoCorner,XwindoSize,YwindoSize,
       DspFmode,FXcent,FYcent,Fwidth,Fheight,FwidthOriginal and
       FheightOriginal
   End

9.2.4.1.1.10 DspFrameStack (D2FSTK) -

FUNCTION:

This routine pushes the current window and frame definition (11
   words) on a stack-like data structure with 4 entires. The first entry
   contains the "original" window and frame definition which can be
   retrieved by pressing <ctrl> RESTOFE. The other 3 entries form a
   stack.

CALLING SEQUENCE:

Call DspFrameStack

No Parameters
       Far call

DATA REFERENCES:

???

MODULES REFERENCED:

DATA DEFINITIONS:

???

9.2.4.1.1.11 DspFramePosCheck (D2FPCH) -

FUNCTION:

This routine modifies the position of the framing box if
   necessary in order to keep it within the 4K by 4K space and to allow
   no more than 7/8 of the framing box to be outside of the viewport.

CALLING SEQUENCE:

Call DspFramePosCheck

No Parameters
       Far call

DATA REFERENCES:

???

MODULES REFERENCED:

DATA DEFINITIONS:

???

PROCEDURES:

```
LowerLimitX = 2 * (Maximum(XwindoCorner-(7/8)*Fwidth),0)
    {1 bit of fraction is provided by shifting left one place}
UpperLimitX = 2 * (Minimum(XwindoCorner+(7/8)*Fwidth),4095)
LowerX = FXcent-Fwidth     {1 bit of fraction}
DifX = LowerX-LowerLimitX
If DifX < 0 then
  FXcent = FXcent-DifX
       {If the framing box is too far to the left, then we move it to
       the right by the excess distance (with 1 bit of fraction)}
UpperX = FXcent+DifX     {1 bit of fraction}
DifX = UpperX-UpperLimitX
If DifX > 0 then
  FXcent = FXcent-DifX
       {If the framing box is too far to the right, then we move it to
       the left by the excess distance (with 1 bit of fraction)}
LowerLimitY = 2 * (Maximum(YwindoCorner-(7/8)*Fheight),0)
    {1 bit of fraction is provided by shifting left one place}
UpperLimitY = 2 * (Minimum(YwindoCorner+(7/8)*Fheight),4095)
LowerY = FYcent-Fheight    {1 bit of fraction}
DifY = LowerY-LowerLimitY
If DifY < 0 then
  FYcent = FYcent-DifY
       {If the framing box is too far to down, then we move it up
       by the excess distance (with 1 bit of fraction)}
UpperY = FYcent+DifY     {1 bit of fraction}
DifY = UpperY-UpperLimitY
If DifY > 0 then
  FYcent = FYcent-DifY
       {If the framing box is too far up, then we move it down
       by the excess distance (with 1 bit of fraction)}
End
```

9.2.4.1.1.12 DspFrameRestore (D2FUPD) -

FUNCTION:

This routine retrieves from the frame stack a previous window-and- frame-definiton.

CALLING SEQUENCE:

Call DspFrameRestore(bx:CtrlKeyStroke)

CtrlKeyStroke: <byte>    CtrlKeyStroke < ThumbwheelCtrlValue:
                                      <ctrl> key not pressed
                                      CtrlKeyStroke >= ThumbwheelCtrlValue:
                                      <ctrl> key pressed Far call

DATA REFERENCES:

???

MODULES REFERENCED:

DspFrame
DspSetWindow
DspRenew
DspReserveDaDis
DspReleaseDisDa

DATA DEFINITIONS:

???

PROCEDURES:

```
    If FNStacked <> 0 then
        (If FNStacked = 0 then no window-and-frame-definitions have been
        stored so we merely exit)
    If <ctrl> key pressed then
        Fcurrent = 1
    original-Fcurrent = Fcurrent
    Fcurrent = Fcurrent-1
    If Fcurrent = 0 then
        Fcurrent = FNStacked
    ImplicitCallFlag = 1
        (This prevents the re-definition of the "original" window)
    DspFrame(0)      (take frame down)
    Restore the first 4 values from the original-Fcurrent window-and-
        frame-definition in Fstack
        (Restore XwindoCorner,YwindoCorner,XwindoSize,YwindoSize)
    DspSetWindow(XwindoCorner,YwindoCorner,XwindoCorner+XwindoSize,
        YwindoCorner+YwindoSize)
        (Reset the window-viewport scale factors)
    Restore the last 7 values from the original-Fcurrent window-and-
        frame-definition in Fstack
        (Restore DspFmode,FXcent,FYcent,Fwidth,Fheight,FwidthOriginal,
        FheightOriginal)
    DspFrame(nonzero)     (put up frame)
    DspReleaseDisDa
    DspRenew              (Renew only outside semaphores)
    DspReserveDaDis
    End
```

9.2.4.1.1.13 DspLockViewKeys (D2LKVW) -

FUNCTION:

This routine prevents or allows the use of the framing keys and the thumbwheels for framing box manipulation.

CALLING SEQUENCE:

```
    Call DspLockViewKeys(Lock)

Lock: <integer>        1: Lock the framing keys
                               0: Unlock the framing keys Far call
```

DATA REFERENCES:

???

MODULES REFERENCED:

DspFrame
MonErrorLogR2
DspReserveDaDis
DspReleaseDisDa

DATA DEFINITIONS:

???

PROCEDURES:

```
    If (Lock < 0 or Lock > 1) then
        MonErrorLogR2(ax:'RJ11'-equivalent)
    Else
        If Lock = 0 then    (unlock the framing keys)
            LockKeys = 0    (signal the unlocked state)
        Else                (lock the framing keys)
            DspReserveDaDis (get Dialog and display semaphores)
            DspFrame(0)     (bring down frame)
```

```
            LockKeys = 3        (signal the locked state)
            DspFmode = 0        (exit framing mode)
            DspReleaseDis       (release semaphores)
        End
```

9.2.4.1.2 VIEW MAINTENANCE SUBSYSTEM -

FUNCTION:

This system maintains the descriptions of multiple views, allowing the user to create new views and peruse through them.

DATA AND CONTROL FLOW:

???

DATA REFERENCES:

???

MODULES REFERENCED:

???

DATA DEFINITIONS:

???

PROCEDURES:

| | | |
|---|---|---|
| DspViewAttributes | D2VWAT | Defines the viewport's surface, wipe index and border index. |
| DspSelectView | D2SELV | Selects a view and if it is new then it is initialized with the previous viewport's attributes (surface number, location and size, viewport wipe index, and border index). |
| DspSaveView | D2SAVV | Saves the current view context in a block of memory. |
| DspRestoreView | D2RESV | Restores the current view context from a block of memory. |
| DspViewCycle | D2VWCY | Used to invoke a routine in each of the defined viewports ending with the current one. |
| DspDeleteView | D2DELV | External interface for deleting one view or all views. |
| DspDeleteView1 | D2DEL1 | Deletes a specific view. |
| D12FreePanelLists | D2FFPL | Frees all the panel lists associated with the current view. |

9.2.4.1.2.1 DspSelectView (D2SELV) -

FUNCTION:

This routine selects a view.

CALLING SEQUENCE:

Call DspSelectView(ViewNumber)

ViewNumber: <integer>   The number of the view to select
Far call

DATA REFERENCES:

???

MODULES REFERENCED:

```
    DspRestoreView
    DspSaveView
    DspFrame
    D12EnterSemaphore
    D12ExitSemaphore
    D12UnGezotz
    DspNearCaller
    MonErrorLogR2
    GinResume
    GinSuspend
    GinViewEnd
    GinViewBegin
    DspGinsegXY
    D12FreePanelLists

DATA DEFINITIONS:

???

PROCEDURES:

If (ViewNumber < -1 or ViewNumber > 64) then
        MonErrorLogR2(ax;'RC'-equivalent)
    Else
    If ViewNumber <> CurrentView then
        (We do nothing if we select the current view)
        If ViewNumber = -1 or 0 then
                (Select the next lower numbered view (-1) or next higher
                numbered View (0))
            Direction = ViewNumber
            ViewNumber = CurrentView
            For I = 1 to 64 do
                If Direction = -1 then    (cycle backwards thru the views)
                    Decrement ViewNumber
                    If ViewNumber = 0 then
                        ViewNumber = 64
                Else                      (cycle forwards thru the views)
                    Increment ViewNumber
                    If ViewNumber = 65 then
                        ViewNumber = 1
                If Views[ViewNumber] <> 0 then
                    Go To ViewFound
            End-For
                (The current view is not stored so that Views[CurrentView]
                = 0. If no view is stored then we will exhaust the For-Loop
                and end up with the current view.)
            If DeleteFlag = 0 then
                (If DeleteFlag is not set then we exit since we are in the
                only view that exists)
                Go To Exit
            Else
                (If DeleteFlag is set then all views have been deleted,
                in which case we restore the default view on surface one
                after incrementing the surface one usage count)
                CurrentView = 1
                SurfaceUsageTab[1] = 1
                Go To CallRestore
        ViewFound:
            If ViewNumber <> CurrentView then
                D12EnterSemaphore    (Get hardware semaphore)
                D12Ungezotz          (So we can remove the cursor)
                D12ExitSemaphore     (And release the semaphore)
                If NOT TourViews then
                    DspFrame(0)      (take frame down in this view)
                        (If TourViews True, then we have already brought the frame
                        down before touring the views)
                If InSetUp then      (If in setup mode)
                    GinResume
                GinViewEnd
                D12FreePanelLists
```

```
        DspSaveView(CurrentView) -> MemoryError
        If NOT MemoryError then
            CurrentView = ViewNumber
    CallRestore:
        DspRestoreView(ViewNumber)
        GinViewBegin
        If InSetUp then     (If in setup mode)
            GinSuspend
        Else
            DspGinSegXY
    Exit:
    End
```

9.2.4.1.2.2  DspSaveView (D2SAVV) -

FUNCTION:

This routine saves the current view context in a block of memory obtained for that purpose.

CALLING SEQUENCE:

Call DspSaveView(ViewNumber)

ViewNumber: <Integer>   Number of view context to save
    Far call

DATA REFERENCES:

???

MODULES REFERENCED:

D12AlphaUpdate
DspNearCaller
MonGetMemR
MonErrorLogR3

DATA DEFINITIONS:

???

PROCEDURES:

```
    MonGetMemR(ax:ViewParagraphs)-> MemoryPtrH , MemoryError
        (ViewParagraphs is the number of paragraphs needed to store
        the view context)
    If MemoryError then
        If DeleteFlag then
            (We were called as a result of a Delete-View command)
            MonErrorLogR3('RK11'-equivalent)
        Else
            MonErrorLogR3('RC11'-equivalent)
    Else
        Views[ViewNumber] = MemoryPtrH
        Store ViewWords words from the global parameters starting at
            ViewContext into the memory pointed to by MemoryPtrH
        ViewSglBlk = 0
        ViewSglEndBlk = 0
            (Detach the visible list)
    End
```

9.2.4.1.2.3  DspRestoreView (D2RESV) -

FUNCTION:

This routine restores the current view context from a block of memory obtained pointed to by Views[ViewNumber].

CALLING SEQUENCE:

Call DspRestoreView(ViewNumber)

ViewNumber: <integer>   Number of view context to restore
      Far call

DATA REFERENCES:

???

MODULES REFERENCED:

DspFrame
   DspViewAttributes
   MonFreeMemR
   DspSetWindow

DATA DEFINITIONS:

???

PROCEDURES:

If Views[ViewNumber] = 0 then
      Increment SurfaceUsageTab[VptSurfaceNumber]
         (If there is no view saved, then we are adding a new viewport
         on the same surface as the original viewport, wo we increment
         the usage count for lthe surface that the viewport is on.)
   Else
      Move ViewWords from the memory pointed to by Views[ViewNumber] to
         the global variables located at ViewContext and above
      MonFreeMemR(bx:Views[ViewNumber],ViewParagraphs)
      Views[ViewNumber] = 0
         (Free that block of memory and zero the pointer to that memory
         in the Views array)
      ImplicitCallFlag = True
      DspSetWindow(XwindoCorner,YwindoCorner,XwindoCorner+XwindoSize,
         YwindoCorner+YwindoSize)
         (Reset the window-viewport scale factors with ImplicitCallFlag
         True to prevent the "original"-window definition in the frame
         stack to be rewritten)
      DspViewAttributes(VptSurfaceNumber,GrBackIndex,BorderIndex)
         (Reset the global parameters depending on the viewport
         attributes)
      If (NOT TourViews and DspFmode > 0) then
         DspFrame(nonzero)
            (If we are touring the views, then the frame is not to be
            put up. Otherwise, if the frame originally was up then we
            redraw it.)
   End 9.2.4.1.2.4   DspDeleteView (D2DELV) -

FUNCTION:

This routine deletes the specified view, the current view or all
      views.

CALLING SEQUENCE:

Call DspDeleteView(ViewNumber)

ViewNumber: <integer>   Number of view to delete
         Far call

DATA REFERENCES:

???

MODULES REFERENCED:

DspReserveDaDis
DspViewCycle
DspDeleteView1
MonErrorLogR2
DspSuspendFrame
DspRestoreFrame
DspReleaseDisDa

DATA DEFINITIONS:

???

PROCEDURES:

```
DspReserveDaDis
    (Reserve the Dialog and Display semaphores)
DeleteFlag = True
    (This flag is used to determine an error message in
    DspSaveView)
If ViewNumber = 0 then
  ViewNumber = CurrentView
If ViewNumber <> CurrentView then
  If ViewNumber < -1 then
    MonErrorLogR2(ax:'RK11'-equivalent)
  Else
    If ViewNumber = -1 then    (Delete all views)
      DspSuspendFrame  (suspend the frame)
      For I = 1 to 64 do
        If ((I = CurrentView) or (I <> CurrentView and Views[I] <> 0)
          then
            DspDelete1(si:I)
              (Views[CurrentView] = 0 since the current view is not
              saved until a new view is selected, in which case the
              original current view is no longer current)
      End-For
      Go To ExitRestore
    Else       (Delete a specific view which is not the current one)
      If ViewNumber > 64 then
        MonErrorLogR2(ax:'RK11'-equivalent)
      Else
        If Views[ViewNumber] = 0 then     (view does not exist)
          MonErrorLogR2(ax:'RK10'-equivalent)
        Else
          DspDeleteView1(si:ViewNumber)
Else    (Delete the current view)
  DspSuspendFrame  (Suspend the frame)
  DspDeleteView1(si:ViewNumber)
ExitRestore:
  DspRestoreFrame  (Restore the frame in another viewport)
  DspReleaseDisDa
    (Release the display and dialog semaphores)
  DeleteFlag = False
End
```

9.2.4.1.2.5 DspDeleteView1 (D2DEL1) -

FUNCTION:

This routine deletes the specified view and frees memory.

CALLING SEQUENCE:

Call DspDeleteView1(si:ViewNumber)

```
            ViewNumber: <integer>   Number of view to delete
            Far call

DATA REFERENCES:

???

MODULES REFERENCED:

DspSelectView
    DspSegVis
    MonFreeMemR

DATA DEFINITIONS:

???

PROCEDURES:

Save Fixup
    Fixup = 0
        (We set Fixup to 0 to prevent the undrawing of segments in the
        view that is to be deleted when we make all segments invisible.
        We need to make them invisible in order to throw away the segment
        visibility list associated with the viewport.)
    old-ViewNumber = CurrentView
        (We need to know which view to return to)
    If ViewNumber = CurrentView then
        ViewNumber = 0
    TourViews = True
        (The border and framing box will be untouched by stating that
        we are touring the views)
    DspSelectView(ViewNumber)   (enter the view to be deleted)
    DspSegVis(-1,0)             (throw away the segment visibility list)
    Decrement SurfaceUsageTab[VptSurfaceNumber]
        (Indicate that one less viewport is on the surface)
    If ViewSglBlk <> 0 then
        MonFreeMemR(ax:ViewSglChunkSize,bx:ViewSglBlk)
        ViewSglBlk = 0
        (Throw away the segment visibility list header)
    DspSelectView(old-ViewNumber)       (return to former view)
    MonFreeMemR(ViewParagraphs,bx:Views[ViewNumber])
    Views[ViewNumber] = 0
        (Throw away the view's saved context)
    Restore Fixup
    TourViews = False
    End
```

9.2.4.1.2.6 DspViewCycle (D2VWCY) -

FUNCTION:

This routine will cycle through all views calling any given routine (near or far) with any set of parameters. The last view traversed is the original view.

CALLING SEQUENCE:

```
    Call DspViewCycle(Par1,...,ParN,RoutineAddress,N,NearFar)

Par1: <integer>         1st parameter to pass when calling
                                the routine in each view
           . . . . . . .
        ParN: <integer>         Nth parameter to pass when calling
                                the routine in each view
        RoutineAddress: <near address> or <far address>
                                The address of the routine to be
                                called in each view
        N: <integer>            The number of parameters to pass
```

```
                    NearFar: <integer>      when calling the routine in each view
                                            Flag to indicate whether the called
                                            routine is near or far
                    Far call

DATA REFERENCES:

???

MODULES REFERENCED:

DspSelectView

DATA DEFINITIONS:

???

PROCEDURES:

oldCurrentView = CurrentView
        TourViews = True
            {Indicate that we are touring the views}
        Repeat
          DspSelectView(0)        {Select next view}
          Copy the N parameters from the stack onto the bottom of the stack
          If NearFar = 0 then    {Near routine}
            Make a near call to RoutineAddress with the N parameters given
          Else       {Far routine}
            Make a far call to RoutineAddress with the N parameters given
        Until CurrentView = oldCurrentView
        TourViews = False
        End
```

-75-

9.2.4.1.2.7  D12FreePanelLists (D2FRPL) -

FUNCTION:

This routine cycles through all the entries in the visible
    segment list, checking each one for a non-nil panel list pointer, and
    freeing any memory used for holding panel lists.

CALLING SEQUENCE:

Call D12FreePanelLists

DATA REFERENCES:

???

MODULES REFERENCED:

D12FreeAuxData

DATA DEFINITIONS:

???

PROCEDURES:

For each block in the visible segment list do
      For each entry in the current block do
        ViewDataPtrH := the panel list pointer for the current entry
        Discard any allocated memory (D12FreeAuxData)

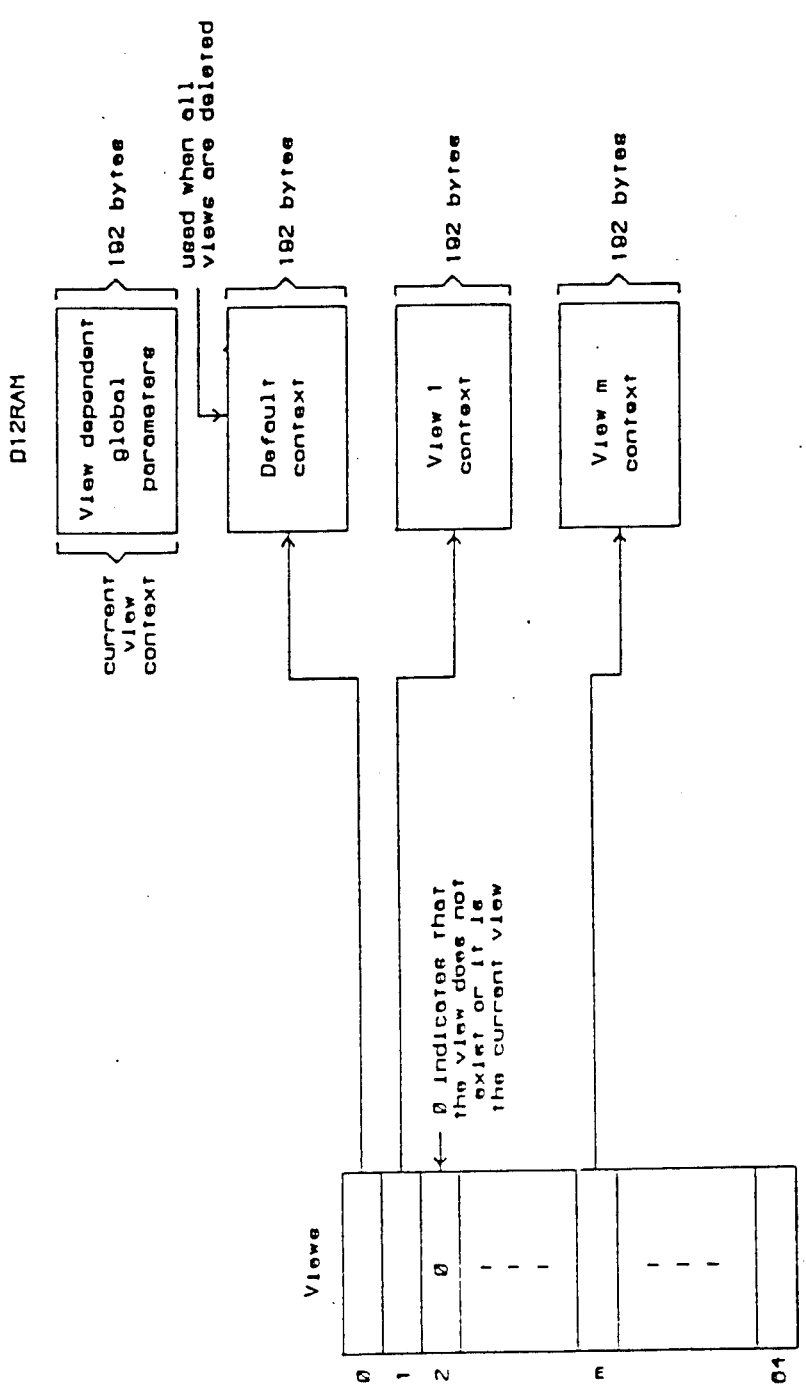

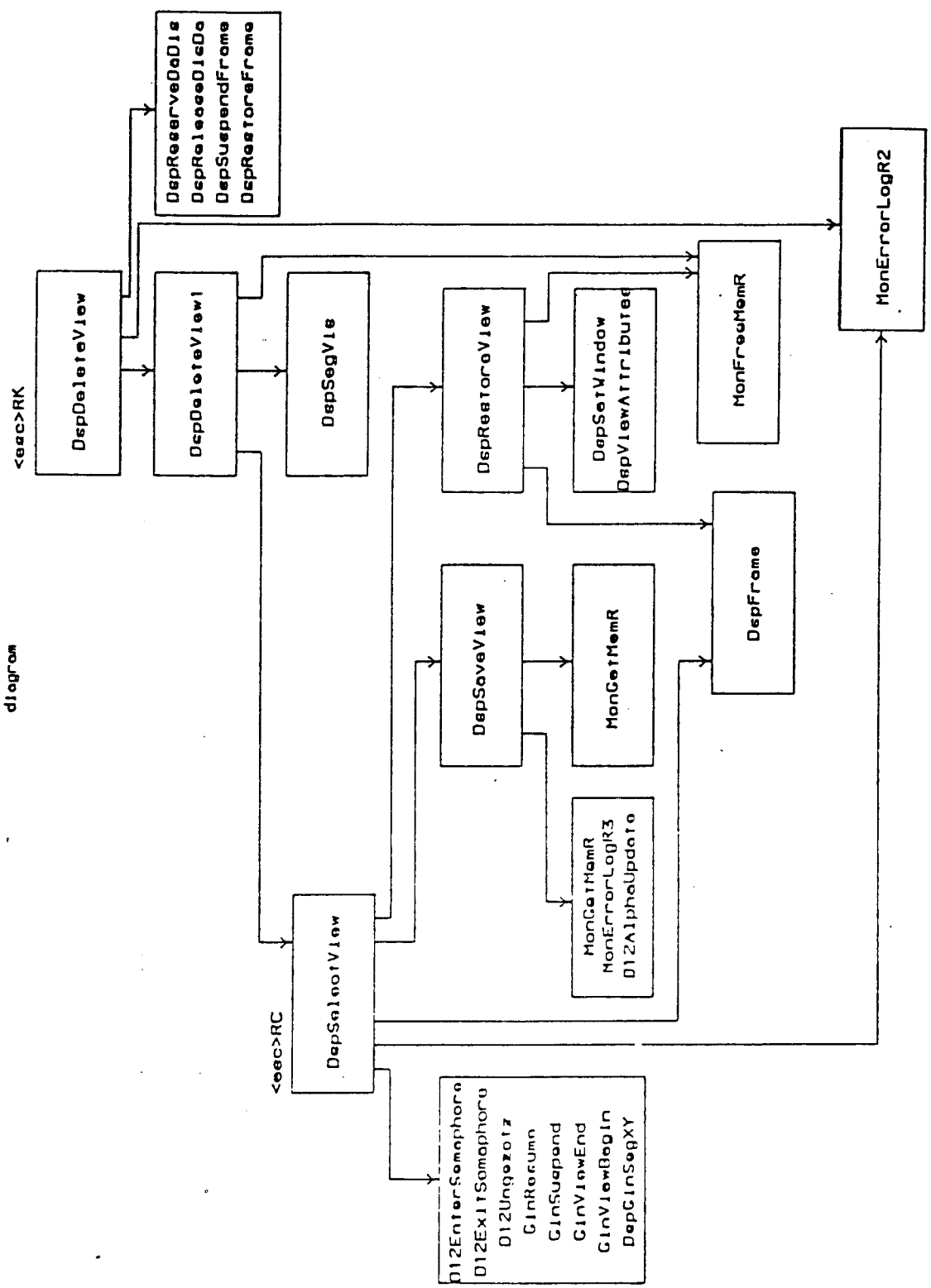

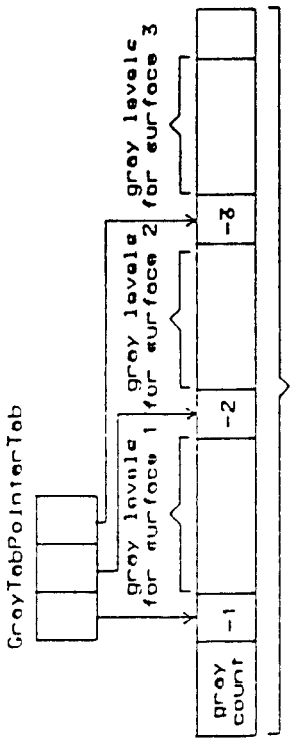
DATA STRUCTURE diagram

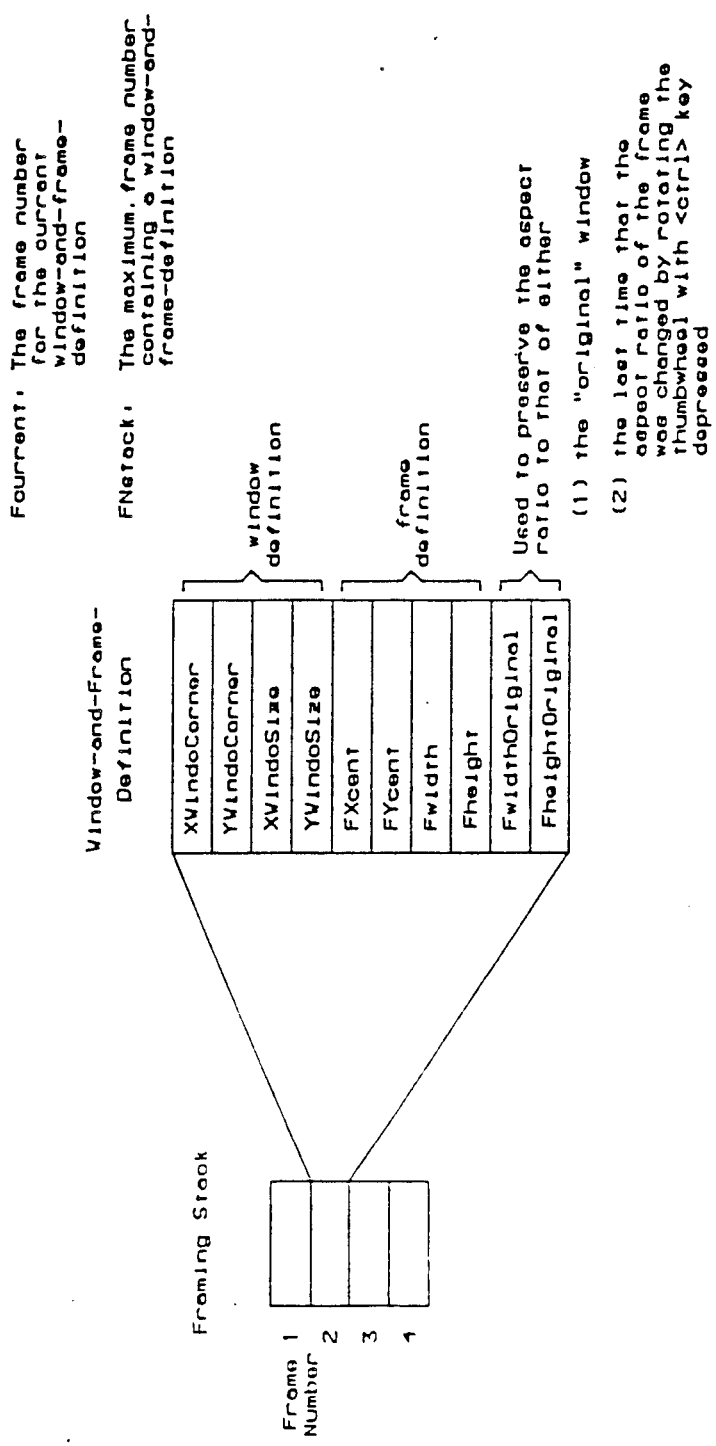

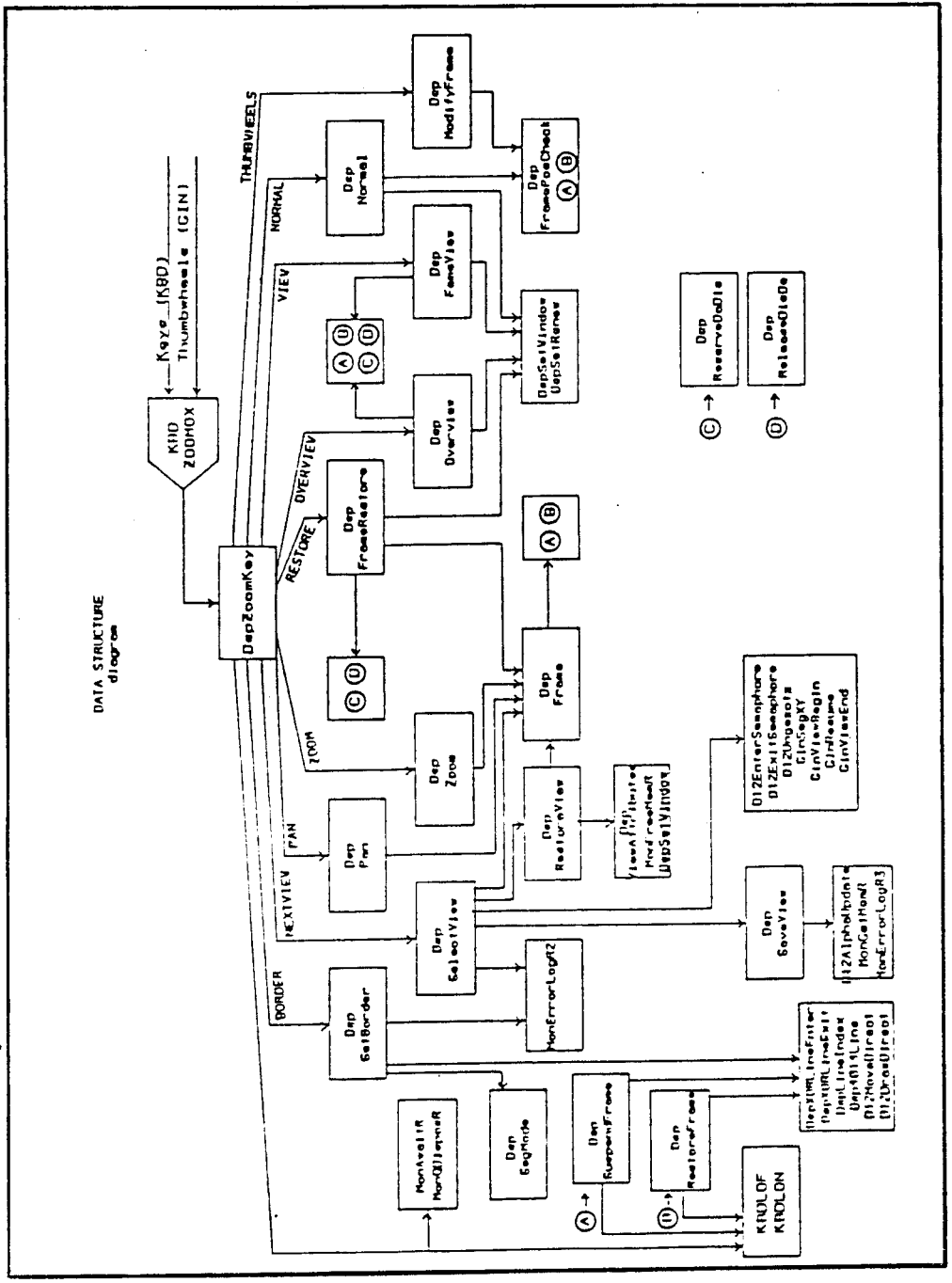

APPENDIX B2

9.2.2.1.3.1 D12Clip (D2CLIP) -

FUNCTION:

This is the main entry point for the vector clipping system. It also performs some of the initial vector classification to break the clipping process into reasonable pieces. The routine does some gross checking to see if the vector can be trivially rejected using a conventional tiling algorithm. If the vector might be visible, then the end point is reexamined for presence with the viewport. Depending on the outcome of this test, either ClipIn or ClipOut is called. D12Clip also does some of the work of tracking vector crossings of the lower left horizontal viewport extension. In panel definitions, the crossing of this imaginary line is used to determine the panel interior.

CALLING SEQUENCE:

Call D12Clip(X,Y)

X,Y <integer>    End point of the new vector to be clipped.
                           The start point of this vector is already
                           assumed to be in Xview,Yview, as is assured
                           by using one of the move routines.

Near call

DATA REFERENCES:

???

MODULES REFERENCED:

D12Coder
D12MoveCP
D12ClipIn
D12ClipOut
D12Clipper
D12NewAction
D12Ungezotz
D12AlphaUpdate

DATA DEFINITIONS:

???

PROCEDURES:

```
Compute the clip code of this new endpoint {D12coder}
If this code and the startpoint code overlap then
    this vector does not cross the viewport
    If the only thing these points have in common is that they
        both are in the left tiles and one or the other is in
        the bottom left tile then the vector crosses the left
    extension
        Invert the panel interior flag {Inside}
    Indicate that in the next vector the first pixel must be turned on
Else
    Reserve display hardware
    Turn off the alpha cursor for a moment {D12ungezotz}
    Insure that the alpha system has updated globals {D12alphaUpdate}
    Copy the current screen position to the clip point
    Mark the current display action as vectors {D12newAction}
    If the startpoint is inside the viewport then
        Copy the current pick ID into the last one (in case of
            picking)
```

```
            If the endpoint is inside the viewport then
                Clip the vector as if the endpoint is inside {D12clipIn}
            Else
                Clip the vector as if the endpoint is outside {D12clipOut}
        Else
            Clip the startpoint of the vector {D12clipper}
            If the vector is visible then
                Copy the current pick ID into the last pick ID
                Insure the hardware is at the initial vector clip point
                    {D12moveCP}
                If the endpoint is inside the viewport then
                    Clip the vector as if the endpoint is inside {D12clipIn}
                Else
                    Clip the vector as if the endpoint is outside {D12clipOut}
        Release display hardware
        Update the current view position and startpoint clip code
```

9.2.2.1.3.2  D12ClipIn (D2CLPI) -

FUNCTION:

This routine handles vector output and panel edge saving in the case where the endpoint is within the viewport.

CALLING SEQUENCE:

Call D12ClipIn(ax:X,bx:Y)

X,Y: <integer>  These are the coordinates of points in
                            view space (based at the viewport corner)
    Near call

DATA REFERENCES:

???

MODULES REFERENCED:

D12SaveEdge
D12DrawLine

DATA DEFINITIONS:

???

PROCEDURES:

```
        Compute the relative difference between this point and the clip
            point
        If panel edges are being saved then
            If the startpoint is outside the viewport then
                Save the clip point as an initial edge {D12SaveEdge}
            Save the relative change as a following edge {D12SaveEdge}
        Draw a vector whose displacement is the relative change
            {D12DrawLine}
```

9.2.2.1.3.3  D12ClipOut (D2CLPO) -

FUNCTION:

This routine handles the vector output and panel edge saving task when the endpoint of the vector is outside the viewport.

CALLING SEQUENCE:

Call D12ClipOut(ax:X,bx:Y,cx:NextCode)

X,Y: <integer>          Coordinates in view space of the

|  |  |
|---|---|
| NextCode: <integer><br>Near call | endpoint (based at the viewport corner)<br>Clipcode of the endpoint |

DATA REFERENCES:

???

MODULES REFERENCED:

D12Clipper
D12SaveEdge
D12DrawLine

DATA DEFINITIONS:

???

PROCEDURES:

```
Save the current clip point (clipped startpoint (possibly))
Clip the endpoint {D12clipper}
If the vector is visible then
   Compute relative vector between clipped startpoint and clipped
      endpoint
   If saving edges for panels then
      If the startpoint was outside the viewport then
         Save the clipped startpoint as an initial edge {D12SaveEdge}
      Save the relative vector as a following edge {D12SaveEdge}
   Draw a line whose displacement is the relative vector
      {D12DrawLine}
The next vector will require its first pixel turned on {DrawOpCode}
```

9.2.2.1.3.4 D12Clipper (D2CLPP) -

FUNCTION:

This routine does the actual vector clipping, by using slope computations to determine the intersection of the vector with the viewport edge. It also handles some of the overhead required to determine the interior of clipped panels.

CALLING SEQUENCE:

Call D12Clipper(Clipcode,X,Y)

|  |  |
|---|---|
| Clipcode: <integer> | Clip code of the end of the vector which is to be clipped off. This can be either the conventional startpoint or endpoint |
| X,Y: <integer> | Position of the endpoint in view space (based at the viewport corner) |

Near call

DATA REFERENCES:

???

MODULES REFERENCED:

none

DATA DEFINITIONS:

???

PROCEDURES:

```
     Compute the delta of this vector, using the startpoint
     If either difference generates an overflow then
        Compute the deltas, using half of each of the X and Y
           values of the startpoint and endpoint
     Preset visibility flag true
     If the clipped end is above the viewport then
        Compute and round X clip (the value of the intersection with
           the top of the viewport)
        Save this X clip for later
        If the point is left of the viewport then goto 3
        If the point is right of the viewport then goto 1
        Set Y clip to the top of the viewport
     Else
  1: If the clipped end is to the right of the viewport then
        Compute and round Y clip (the value of the intersection
           with the right edge of the viewport)
        If the point is below the viewport then goto 2
        If the point is above the viewport then
           The vector is not visible
        Else
           Set X clip to the right edge of the viewport
     Else
  2: If the clipped end is below the viewport then
        Compute and round X clip (the value of the intersection
           with the bottom of the viewport)
        If the point is left of the viewport then
           Panel interior reverses
           Vector is not visible
        Else If the point is right of the viewport then
           The vector is not visible
        Else
           Set Y clip to the bottom of the viewport
     Else
  3: If the clipped end is left of the viewport then
        Compute and round Y clip (the value of the
           intersection with the bottom of the viewport)
        If the point is below the viewport then
           Panel interior reverses
           Vector is not visible
        Else If the point is above the viewport then
           Vector is not visible
        Else
           Set X clip to the left of the viewport
     Else
        If the clipped end was above but not to the left
           of the viewport and the initialial saved X clip
           was to the left of the viewport then
           Panel interior reverses
        Vector is not visible
```

9.?.?.?.5 D12Coder (D2CODE) -

FUNCTION:

This routine computes the clipcode which is used for determining vector visibility and for vector clipping.

CALLING SEQUENCE:

Call D12Coder(ax:X,bx:Y,cx:Code)

X,Y: <integer> Position of a point in view space (based at the corner of the viewport)
    Code: <integer> Clip code returned by the routine
    Near call

DATA REFERENCES:

???

MODULES REFERENCED:

none

DATA DEFINITIONS:

???

PROCEDURES:

```
Reset code
If below the viewport then set bottom bit
Else If above the viewport then set top bit
If left of the viewport then set left bit
Else If right of the viewport then set right bit
```

9.2.2.2 PANEL SUBSYSTEM -

FUNCTION:

The three functions performed by this system are panel display, display list building, and pattern definition.

Panel Filling Algorithms

Two different algorithms for filling panels were considered: the trapozoidal method and the scanline method. The trapezoidal procedure involves dividing a panel into a set of trapezoids and triangles, then filling each of these separately. The scanline method involves calculating for each raster scan line the pixels to be filled. This second method was chosen.

Types of Panels

The simplest type of panel is a simple convex panel shown in Fig. 9.2.1.2(a), where every line connecting two interior points is completely in the interior. A simple concave panel is shown in Fig. 9.2.1.2(b). A self-intersecting panel has edges which intersect one another. The 4112 panels can be compound intersecting panels (Fig. 9.2.1.2(c)).

The rule for determining if a point is in the interior of the panel is to start from any point outside the panel (such as at X = -infinity , Y = 0) and draw any line to the point of interest. If an odd number of boundary lines were crossed, then the point is in the interior, else it is in the exterior.

Consider the application of this rule for scanline s3 in Fig. 9.2.1.2(c). Given that the left most pixel is outside the panel, we can see that after crossing the (ab) edge, pixels t through u are filled and after crossing the second boundary the remaining pixels on the scan line are outside and thus not filled. For scanline s4, however we cross two line segments (ab) and (bc) since pixel b is the last pixel of the (ab) line and the first pixel of the (bc) line. If we interpret the boundary crossing rule as refering to the crossing of line segments, then we get the (incorrect) result that two boundaries are crossed when going from pixel v to pixel w.

We could treat the lines (ab) and (bc) as being 2 parts of one "siding", so that only one boundary is crossed in going from v to w. At scanline s1 we see that pixel f should then be associated with 2 sidings so that pixel x is considered outside the panel. Likewise at scanline s2, we consider pixel h to be associated with 2 sidings.

A siding could then be defined as a connecting sequence of line segments, all of which go upwards or all of which go downwards. In Fig. 9.2.1.2(d), line segment (ae) is horizontal so that it could be associated with the (ab,bc) siding or the (de) siding. We can broaden the definition of a siding to be a connecting sequence of line segments all of which do not go downwards or all of which do not go upwards (i.e. a monotonically nondecreasing or monotonically nonincreasing sequence of delta-Y values).

The information needed to fill the diamond shaped panel in Fig. 9.2.1.2(d) would be the move to pixel f, followed by the delta-X and delta-Y values for line segments (fg),(gh),(hi) and (if). Two sidings should be constructed from these 4 lines, namely (fg,gh) and (hi,if). Our scanline algorithm fills from bottom up and follows the rule of filling between pairs of sidings for each scanline. For this example, there are no sidings until scanline s1 is reached, at which point there are 2 sidings which persist up to and including scanline s2. The filling procedure should thus know which sidings begin at which scanlines.

To do this efficiently, we sort the sidings according to the value of the lowest scanline of the siding (i.e. lowest Y value). The other basic piece of information needed to fill panels is whether the lower left pixel is inside or outside the panel. In general, the sorted list of sidings and the Inside/ Outside flag is the only information used to fill panels.

DATA AND CONTROL FLOW:

???

DATA REFERENCES:

???

MODULES REFERENCED:

???

DATA DEFINITIONS:

???

PROCEDURES:

This system is divided into several subsystems

| | |
|---|---|
| CREATION | This system builds segment display list data for panels, and also accumulates a panel list which is used for deriving the scanlines required to fill a panel. |
| GENERATION | This system uses the edge list data to actually generate the panel fill. |
| PATTERN DEFINITION | This system is used to store user defined patterns for use in panel filling. |

9.2.2.2.1 PANEL CREATION SUBSYSTEM -

FUNCTION:

This system sets up all the requirements for generating panel edge lists and also, when appropriate, generates segment display list entries for panels. Defining the current panel fill number is also a function of this system.

DATA AND CONTROL FLOW:

???

DATA REFERENCES:

???

MODULES REFERENCED:

???

DATA DEFINITIONS:

???

PROCEDURES:

| | | |
|---|---|---|
| DspBeginPolygon | D2BPOL | Interface to begin a panel |
| DspEndPolygon | D2EPOL | Interface to finish a panel |
| DspSetPanelFill | D2SFPA | Interface for changing panel fill |
| D12StartNewPolygon | D2SNPO | Initializes data structures for panels |
| D12SaveEdge | D2SVED | Interface for accumulating panel edges |
| D12AddEdge | D2ADED | Adds edges to the siding list |
| D12CloseSiding | D2CLSD | Completes siding lists and starts new lists |
| D12FinishNewPolygon | D2FNPO | Completes panel data structures |
| D12FreeAuxData | D2FRAD | Frees the memory occupied by the panel data structures |
| D12FreeLinkList | D2FRLL | Frees the memory occupied by a doubly linked list |
| D12PanelMemoryError | D2PNME | Frees the memory occupied by the panel data structures and issues an error message |
| DspPanelFillingMode | D2PMOD | Interface to set the mode of panel fill |

9.2.2.2.1.1 DspBeginPolygon (D2BPOL) -

FUNCTION:

This routine is the interface for starting a panel definition. It performs the necessary initialization, handles the case of multiple panel opens, and builds a segment display list entry if necessary.

CALLING SEQUENCE:

Call DspBeginPolygon(X,Y,Boundary)

X,Y: <integer>   4K space coordinates of the first node of the panel. This is where the last edge will be connected when the panel is closed Boundary: <boolean>   1= draw the boundary of the panel using the current line index. 0= do not draw the boundary PLM compatible

DATA REFERENCES:

???

MODULES REFERENCED:

DspDraw
DspAddDslEntry
D12StartNewPolygon
DspMove
D12FinishNewPolygon
D12reserveDisplay
D12releaseDisplay

DATA DEFINITIONS:

???

PROCEDURES:

Reserve the display system
If there is already an open panel then
    Draw an edge to the current panel closure point

```
        Flag no panel open (so the subsequent MOVE to the new
            panel closure point will not be turned into a DRAW)
        Restore vector visibility to what it was before the first
            begin panel
        If vectors are visible then
            Tell the panel generator this panel is partially finished
        Else
          Save the current vector visibility
          If vectors are visible then
            Tell the panel generator that a new panel is starting
        Save the command code for future errors
        Restrict the boundary parameter to either 0 or 1
        Build a begin panel display list entry
        Flag edge saving to the same state as vector visibility (so
            that if vectors aren't visible, edges won't be saved)
        Flag the next vector as direct (so that the move will not be
            optimized out of the list if it is zero length)
        Move to the new panel closure point passed as parameters
        Flag the panel as open
        Flag vector visibility on only if currently on and the
            boundary is to be visible
        Save the new panel closure point
        Release the display system
```

9.2.2.2.1.2 DspEndPolygon (D2EPOL) -

FUNCTION:

This routine is the interface for closing a panel. It does the housekeeping necessary for finishing the edge list and causes the panel to be filled if required. It also builds a segment display list entry marking the end.

CALLING SEQUENCE:

Call DspEndPolygon

No parameters
    PLM compatible

DATA REFERENCES:

???

MODULES REFERENCED:

D12reserveDisplay
    D12releaseDisplay
    MonErrorLogR1
    DspDraw
    DspAddDslEntry
    D12FreeAuxData
    D12FinishPoly

DATA DEFINITIONS:

???

PROCEDURES:

Reserve the display system
        If no panel is currently open then
          Issue an error
        Else
          Draw the final edge to the panel closure point
          Save the command code for future errors
          Build a display list entry for end of panel Use a traversal routine to do the rest of the panel finish
    housekeeping
If there is no segment open then
  Discard the panel edge list
Release the display system

9.2.2.2.1.3 DspSetPanelFill (D2SFPA) -

FUNCTION:

This routine is the interface for changing the current panel fill number. In addition to passing the information along to the panel generation system, this routine builds a segment display list entry defining all the panel filling mode parameters.

CALLING SEQUENCE:

Call DspSetPanelFill(Pattern)

Pattern: <integer>    Index of the pattern which will be
                                       used for filling subsequently
                                       defined panels PLM compatible

DATA REFERENCES:

???

MODULES REFERENCED:

D12reserveDisplay
D12releaseDisplay
DspSetFillPattern
DspAddDslEntry

DATA DEFINITIONS:

???

PROCEDURES:

Reserve the display system
Save the command code for future errors
If the new pattern number is different from the current one then
  Pass the pattern number to the panel generation system
  Construct a display list entry for the pattern number,
    including panel writing mode, fill origin and
    boundary cover
Release the display system

9.2.2.2.1.4 D12StartNewPolygon (D2SNPO) -

FUNCTION:

This routine initializes the global variables needed for creating the internal panel data structures. If this is the first panel in a segment then this routine also initializes the auxiliary data structure associated with the segment.

CALLING SEQUENCE:

Call D12StartNewPolygon

No Parameters
    Near call

DATA REFERENCES:

???

MODULES REFERENCED:

D12StartLinkList
   D12PanelmemoryError

DATA DEFINITIONS:

???

PROCEDURES:

If this is the first panel for this segment {ViewDataPtrH=0} then
      Initialize the first block in the auxiliary data structure for this
         segment {D12StartLinkList}
      Initialize the first block in the Edge List for this segment
         {D12StartLinkList}
      If there was a lack of memory for either list then
         Throw away the auxiliary data structure and signal the error
            {D12PanelMemoryError}
      Else
         Link the Edge list to the auxiliary data structure
         Initialize various global variables needed for panel edge
            accumulation

9.2.2.2.1.5 D12SaveEdge (D2SVED) –

FUNCTION:

This routine is passed information about every edge for a panel and every movement of the beam position that does not result in an edge. The routine makes the calls necessary to build each siding and to keep the sidings in a sorted order in the auxiliary data structure that is associated with each segment.

The beginning of a panel produces a move to a pixel in view space. If the beginning point is outside the window (so that the transformed point is outside the viewport) then an incorrect move is generated (which causes no trouble). Since edges of panels may not be visible, other incorrect moves are given to D12SaveEdge. However when an edge is clipped, then a correct move is passed to D12SaveEdge. In Fig. 3, a panel begins at point (A) outside the window. The calls to D12SaveEdge will consist of an incorrect move, a move to point (a), a draw to point (b), 2 incorrect moves, a move to point (b), a draw to point (c), etc. The two sidings that result are (ab,bc) and (de).

CALLING SEQUENCE:

Call D12SaveEdge(MoveDrawFlag,X,Y)

MoveDrawFlag: <boolean>  Indicates whether the point being passed
                               is the start of a new sequence of edges
                               or a continuation of the current sequence
                               0 => start of an edge list. 1 => next
                               point in a sequence of edges
      X,Y: <integer>           A point in view space which defines
                               one end of an edge. If this is the start
                               of an edge list, then X and Y are
                               absolute screen space positions.
                               Otherwise, they are relative changes in
                               view space from the last point passed to
                               this procedure Near call

DATA REFERENCES:

???

MODULES REFERENCED:

D12AddEdge
D12CloseSiding

DATA DEFINITIONS:

???

PROCEDURES:

If a move command is received, then the global variables Xposition and Yposition are updated to reflect the pixel beam position relative to the lower left pixel of the viewport.

If a draw command is received, then a call to D12AddEdge is made and the global variables DrawnXposition and DrawnYposition are updated to the last position drawn. The global flag NewSiding (which is initialized to TRUE in D12StartNewPolygon) is used to indicate whether or not an edge is in a siding. Before calling D12AddEdge, we call D12CloseSiding under two conditions: (1) If (Xposition,Yposition) <> (DrawnXposition,DrawnYposition) which occurs if an edge is clipped at a boundary and reenters the viewport at another location or (2) The delta-Y value for the edge goes in the opposite direction of the Delta-Y values of the previous edges in the siding. If the call to D12CloseSiding results in an out-of-error message (indicted by the carry-flag being set), then D12SaveEdge exits with the carry-flag set to signal this error. The global variable Direction (initialized to 0 in D12StartNewPolygon) is used to indicate the Delta-Y value of edges in a siding. This is done by setting Direction to the value of each Delta-Y unless it is 0. So if DeltaY <> 0 and DeltaY and Direction have opposite signs, then D12CloseSiding is called.

9.2.2.2.1.6 D12AddEdge (D2ADED) -

FUNCTION:

This routine adds an edge to the Edge List for use in panel fill.

CALLING SEQUENCE:

Call D12AddEdge(DeltaX,DeltaY)

DeltaX,DeltaY: <integer>   Change in the X and Y pixel coordinates in going from the start of the edge to the end of the edge.

Near call

DATA REFERENCES:

???

MODULES REFERENCED:

MonGetMemR
D12PanelMemoryError

DATA DEFINITIONS:

???

PROCEDURES:

The edge is saved in the Edge List, aStandard Doubly Linked Data Structure with a block length of 32 bytes and a node length of 4 bytes. There are (32-4)/4 or 7 nodes in a block with no unused space.

D12AddEdge also initializes the global variables (BeginPanelXposition, BeginPanelYposition) to the first point of the panel in the viewport. This pair of variables is used by D12FinishNewPolygon. If the edge is the first edge in a siding (i.e. NewSiding = True), then the global variables (FirstXposition,FirstYposition) are set to (Xposition,Yposition), which always point to the current pixel position of a siding. When a siding is finished, then (FirstXposition,FirstYposition) and (Xposition,Yposition) point, respectively, to the first and last pixel positions of the siding.

The first word in the 2 word Edge node contains the Delta-X value of the edge. Bits 0 thru 12 of the second word contain the absolute value of Delta-Y. Bit 13 (F bit) of the second word is set by D12AddEdge if the edge represented by the node is the first edge of a siding. Bit 14 (J bit) and bit 13 are set to represent a Jump Opcode (discussed later). Bit 15 (L bit) is set by D12CloseSiding if the edge is the last edge of a siding.

If more memory is needed for the Edge list, then D12AddEdge calls MonGetMemR and inserts the forward and backward links. If an out-of-memory error occurs, then D12AddEdge calls D12PanelMemoryError and exits. D12PanelMemoryError throws away the auxiliary data structure and sets the carry-flag to indicate the error.

After D12AddEdge adds the Edge node to the Edge list, then it sets Xposition = Xposition+DeltaX and Yposition = Yposition+DeltaY to keep these pixel positions current. Since the edge is visible in the viewport, the value of (DrawnXposition,DrawnYposition) is set equal to (Xposition,Yposition).

9.2.2.2.1.7 D12CloseSiding (D2CLSD) -

FUNCTION:

This routine closes a siding (a sequence of edges going up or going down) and adds a SidingPointer Node to point to the siding.

CALLING SEQUENCE:

Call D12CloseSiding(DeltaX,DeltaY)

DeltaX,DeltaY: <integer>  Change in the X and Y pixel coordinates in going from the start of the edge to the end of the edge.

Near call

DATA REFERENCES:

???

MODULES REFERENCED:

MonGetMemR
D12PanelMemoryError
D12SortLastNode
D12AddEdge
D12CloseSiding

DATA DEFINITIONS:

???

PROCEDURES:

The D12CloseSiding routine is called when a siding is finished. The siding is represented by a sequence of Edge nodes in the Edge List. A pointer to this sequence of Edge nodes along with other pertinent information is placed in a SidingPointer node. The corresponding SidingPointer list is a Standard Doubly Linked Data Structure with a block length of 32 bytes and a node length of 8 bytes. There are (32-4)/8 or 3 nodes in a block with 4 bytes of unused space.

The pointer to the siding is a 3 byte pointer to the bottom of the siding, that is the point with the smallest Y value. If the siding goes upwards or is flat then the SidingPointer node points to the first edge in the sequence of Edge nodes, otherwise it points to the last edge in the siding.

The first word in the SidingPointer node consists of the fields PE (bit 15) and Ybeg1 (bits 0-14). The PE bit is set by D12FinishNewPolygon to indicate the last SidingPointer node for a panel. Only one Edge list is used for all panels in a specific segment. Also only one SidingPointer list is used so that the PE bits are the only separators between different panels in a segment.

The field Ybeg1 is set to [lowest pixel Y value of the siding]+1. {Originally, the reason for adding 1 was to prevent a SidingPointer node of all 0's from being a legal node. Programming errors could cause this situation and it was designed to catch these. However, the code to check for legal nodes was removed because of space considerations and in accordance with the philosophy that we might as well assume an error free environment. There might possibly be a problem with the sorting of the nodes if the value 8000H were allowed because of the signed comparisons.}

The second word in the SidingPointer node consists of Xbeg, the pixel value of the point associated with Ybeg1. So (Xbeg,Ybeg1-1) is the bottom point of the siding.

The third word in the SidingPointer node contains BlockPointer, a paragraph pointer to the block which contains the bottom edge of the siding. The low order byte of the fourth word in the SidingPointer node contains the offset within the block of the bottom edge node. These 3 bytes point to the bottom of the siding, that is they point to the low order byte of the bottom edge node.

The fourth word in the SidingPointer node contains the fields: D (bit 15), IN (bit 14), SEP (bit 13), CONT (bit 12), BACK (bit 11), FLAT (bit 10), START (bit 9), END (bit 8) and WordPointer (bits 0-7). We have just described the siding pointer formed by the 3 byte quantity BlockPointer:WordPointer.

The D bit is set if the siding is a downwards siding, that is the edges are all flat or sloped downwards (Delta-Y <= 0). For this case, the bottom of the siding is at the last edge of the siding and D12CloseSiding will create the 3 byte BlockPointer:WordPointer from the pair of global variables (EdgePtrH,EdgePtrL). Thd D bit is cleared if the siding is an upwards siding, that is the edges are all flat or sloped upwards (Delta-Y >= 0). For this case, the bottom of the siding is at the first edge of the siding and D12CloseSiding will create BlockPointer:WordPointer from the pair of globals (FirstEdgePtrH,firstEdgePtrL).

The IN bit is set if the lower left pixel of the viewport is inside the panel, otherwise it is cleared. D12FinishNewPolygon sets this bit from the global variable Inside. This is discussed later.

The SEP bit is set if the siding is a "separated" siding, which is an added artificial siding consisting of one zero-length edge (DeltaX = DeltaY = 0). Normally a zero-length edge would be merged with other edges in a previous siding. However, the purpose of this added siding is to produce an extra siding that is needed in some cases to correctly fill a scanline but with no other effects. This is discussed later.

The CONT bit is set if the siding is to be continued by another siding. For every sub-panel, [i.e. the panel created by an <esc>LP and the next <esc>LP or <esc>LE commands] the first siding and the last siding might be two parts of a larger siding. If this occurs, then these two sidings are "connected" by storing enough information so that after the traversal of a siding with the CONT bit set, the other siding can then be traversed to produce the aggregate effect of one larger siding.

The FLAT bit is set if the siding consisits of edges that are all flat (i.e. DeltaY = 0). This information is used by D12FinishNewPolygon.

The START bit is set if the siding is the first siding in a simple panel. The END bit is set if the siding is the last siding in a simple panel. These tow bits are used by D12FinishNewPolygon.

The D12CloseSiding routine will create a SidingPointer node for the siding which was completed. The values (Xbeg,Ybeg1) are set to (FirstXposition,FirstYposition+1) if Direction is positive (implying an upward siding), otherwise they are set to (Xposition,Yposition+1) since the siding would be downward.

A Null sub-panel is a sub-panel with no edges in it, and when it occurs then D12FinishNewPolygon sets (PE,Ybeg1) to 7F00H and calls D12CloseSiding. The othere 3 words in the node are not initialized so that D12CloseSiding must at least zero the IN flag because D12FinishNewPolygon only sets this flag but does not clear it.

For non-null sub-panels, the SEP flag is set or cleared by using the global variable Inside which is temporarily modified by D12FinishNewPolygon. Also the START flag or the END flag or neither flag is set by using the global variable StartEndSidFlag which is set by D12StartNewPolygon and D12FinishNewPolygon.

D12CloseSiding sets the FLAT flag if the global variable Direction is 0. This is true because Direction is always set equal to the last nonzero DeltaY value in a siding so that a zero value implies that all of the edges in the siding were flat.

If Direction is positive, then the D flag is cleared and BlockPointer:WordPointer is set to FirstEdgePtrH:FirstEdgePtrL, otherwise the D flag is set and BlockPointer:WordPointer is set to EdgePtrH:EdgePtrL.

D12CloseSiding sets the L bit for the last Edge node in the siding.

The pointer to the current SidingPointer node is preserved in the globals SidingPointerPtrH:SidingPointerPtrL. If the SidingPointer node is the first one for the segment then (FirstSidingPointerPtrH:FirstSidingPointerPtrL) is set to (SidingPointerPtrH:SidingPointerPtrL). The pointer FirstSidingPointerPtr is used naturally to point to the auxiliary data structure associated with panels.

After adding the SidingPointer node to the SidingPointer list, D12CloseSiding keeps the list sorted,in ascending order according to the (PE,Ybeg1) key by calling D12SortLastNode. This latter routine assumes that all but the last node is sorted in ascending order using the first word in each node as the key. It assumes a Standard Doubly Linked Data Structure and is passed information concerning the block length, the node length and the amount of unused space in a block.

At this place in D12CloseSiding, another entry point D12CloseSiding1 is provided so that we can treat the rest of D12CloseSiding as the D12CloseSiding1 routine.

In order to connect the first and last sidings of a sub-panel together (in cases where one is a continuation of the other), space must be reserved in the Edge list for a possible Jump Opcode which produces the linkage. D12CloseSiding1 provides this space when the global variable StartEndSidFlag is nonzero. The START bit position (bit 9) in StartEndSidFlag is set by D12StartNewPolygon and D12FinishNewPolygon to indicate that the next siding considered by D12CloseSiding will be the first siding of a sub-panel. The END bit position (bit 8) in StartEndSidFlag is set by D12FinishNewPolygon to indicate the last siding of a sub-panel. D12CloseSiding1 provides the space by calling D12AddEdge with DeltaX = DeltaY = 0. At the time of the call, the global variable NewSiding is False since NewSiding is false when D12CloseSiding is called and is not set to True until just before D12CloseSiding returns. With NewSiding False, then D12AddEdge does not re-initialize FirstEdgePtrH:FirstEdgePtrL; however it does change EdgePtrH:EdgePtrL to point to the extra null edge. But this does not affect BlockPointer:WordPointer since the latter is calculated before D12CloseSiding1 is executed. After the extra space is acquired, then if the siding was the first in the sub-panel then the global variables StartJumpPtrH:StartJumpPtrL are set to EdgePtrH:EdgePtrL which points to the null edge. We do not need to have other globals pointing to the extra edge for the case in which the siding is the last in the sub-panel because in that case the extra edge is the last edge of the sub-panel and D12FinishNewPolygon, which produces the linkage for a continued siding for each sub-panel, uses the globals StartJumpPtrH:StartJumpPtrL and EdgePtrH:EdgePtrL as pointers to the two extra edges where Jump Opcodes may be inserted. If the siding is a START-siding, then the global variable StartLastDrawnX is set to DrawnXposition to be used possibly by D12FinishNewPolygon.

In order to correctly fill a sub-panel using the scan line algorithm, we insert a "separated" null-edged siding after the end of each flat siding that is not an END siding. The bottom point of this extra siding is the same as the last point of the flat siding preceding it. D12CloseSiding1 checks all sidings for flatness by testing the global variable Direction. If Direction is 0 and the siding is not the last one in a sub-panel, then another null edge siding is added by making a call to D12AddEdge with DeltaX = DeltaY = 0, then closing that siding by making a recursive call to D12CloseSiding. We want this null edged siding to have a cleared D flag in its SidingPointer so that it appeared to be an upward siding. (Why?). Since D12CloseSiding sets BlockPointer:WordPointer equal to FirstEdgePtrH:FirstEdgePtrL for upward sidings, we need to force FirstEdgePtrH:FirstEdgePtrL to point to the added null edge after the call to D12AddEdge. To accomplish this, we set NewSiding True before calling D12AddEdge. To avoid successive recursion in the call to D12CloseSiding, we set Direction to 1 so that the null siding does not appear flat. Also, before the call to D12CloseSiding, we set the high order bit of the variable Inside. This causes the SEP bit to be set in the SidingPointer node. This high order bit is cleared after the call to D12CloseSiding.

CloseSiding1 finally ends by clearing the variable StartEndSidFlag and setting NewSiding to True.

If an out-of-memory error occurs or if the error is indicated by any routine that D12CloseSiding calls, then this routine exits and signals the error by setting the carry-flag.

9.2.2.2.1.8 D12FinishNewPolygon (D2FNPO) -

FUNCTION:

This routine finishes the construction of the data structure for a panel or sub-panel.

CALLING SEQUENCE:

Call D12FinishNewPolygon(ContinuePolygon)

ContinuePolygon: <boolean>    nonzero = a subpanel is completed but the panel is not finished.
                                                    0 = the panel is finished.

Near call

DATA REFERENCES:

???

MODULES REFERENCED:

D12AddEdge
D12CloseSiding
D12CloseSiding1

DATA DEFINITIONS:

???

PROCEDURES:

The D12FinishNewPolygon routine is passed one parameter: ContinuePolygon, a flag that is set True if the call to D12FinishNewPolygon is the result of an <esc>LP command so that a sub-panel is finished but there is at least one more sub-panel in the panel. ContinuePolygon is set False if the call to D12FinishNewPolygon is the result of an <esc>LE command which signifies the completion of the panel.

If ContinuePolygon is False, then D12FinishNewPolygon checks for an empty panel, that is, one with no sidings in it. It does this by checking to see if the global variable FirstYposition is negative since it is initialized to -1 by D12StartNewPolygon and is reset by D12AddEdge when the first edge is placed in the first siding. Since all physical values for FirstYposition are nonnegative, the check for a negative value will determine if any edges were placed in the panel. If D12FinishNewPolygon finds an empty panel, then it sets FirstYposition to 7FFEH, sets StartEndSidFlag to 0 and calls D12CloseSiding. D12CloseSiding will detect that FirstYposition is above 7F0CH, which is not physically possible, and it will zero the fourth word in a SidingPointer node in order to zero the IN flag and it will initialize FirstSidingPointerPtrH:FirstSidingPointerPtrL if necessary. The result is a SidingPointer node where Xbeg and BlockPointer:WordPointer are junk values and Ybeg1 = 7FFEH and IN = 0. (Note, it appears that setting StartEndSidFlag to 0 is a superfluous instruction). The IN bit will be set correctly by D12FinishNewPolygon and the Y value of 7FFEH-1 will guarantee that this siding is not used in the panel filling phase except for the use of the IN flag in determining if there is to be no fill or a complete viewport fill.

D12FinishNewPolygon applies a siding connection algorithm if the panel is not empty. In general, this consists of a search of the sorted SidingPointer node list for the first and last sidings of the sub-panels. It determines if one is the continuation of the other, and if so, it forms the linkage. The first and last sidings are identified by the START and END flags, respectively, being set. This process, which is done for each sub-panel, locates and clears the START and END flags. If the flags were not cleared, then the first and last sidings of a sub-panel could not be determined because the sidings for all sub-panels are sorted together and may be completely mixed. So the process depends on the fact that at most there is one SidingPointer node with the START flag set and one with the END flag set. As will be explained below, if there is only one siding, then the SidingNode will have the END flag set. Even in this case where there cannot be any siding connection accomplished, we must still search the nodes in order to clear the START flag of the first and last SidingPointer node.

D12FinishNewPolygon sets a local variable TwoSiding = 0 (False) if there is only one siding in the sub-panel. It detects this by checking StartEndSidFlag for nonzero which implies that D12CloseSiding was not called yet for this sub-panel since D12CloseSiding clears StartEndSidFlag. D12FinishNewPolygon sets TwoSiding = 2 (True) if StartEndSidFlag was 0. It sets it to 2 since the. the test for TwoSiding being true is a decrement and this test occurs twice - once for each of the START and END flags.

D12FinishNewPolygon next checks for an empty sub-panel by testing the global NewSiding. If the variable is True, then the sub-panel must be empty. This follows from the following reasoning: NewSiding is set True by D12StartNewPolygon at the beginning of the first sub-panel and set True by D12FinishNewPolygon at the beginning of all other sub-panels. When the first edge is added to the sub-panel, then NewSiding is set False before D12SaveEdge returns. It will then be False after every call to D12SaveEdge because D12SaveEdge will only call D12CloseSiding (which sets NewSiding True) when there is an edge to add which does not belong to the siding being built. However, D12SaveEdge then calls D12AddEdge with the new edge and D12AddEdge will reset NewSiding to False. Therefore if D12FinishNewPolygon finds NewSiding True, then no edges are in the sub-panel and the siding connection algorithm is skipped. (Note that an empty sub-panel is different from an empty panel). Given that the sub-panel is not empty, D12FinishNewPolygon sets the END flag in StartEndSidFlag and calls D12CloseSiding. This will add the last SidingPointer node with the END flag set to the SidingPointer list. As mentioned above, we see that if there is only one siding, then that siding will be closed by D12FinishNewPolygon with the END flag set.

If any siding is flat, then D12CloseSiding will add an upward null siding consisting of a null edge to the SidingPointer list. The null SidingPointer node will always be just above the flat SidingPointer node in the SidingPointer list. This is true because of the following: The SidinPointer nodes are sorted in ascending order according to the {PE,Ybeg1} value. The PE flag is cleared for every SidingPointer node added (it is set only by D12FinishNewPolygon for the last node in the SidingPointer list). The null siding is added at the end of the flat siding so that the Ybeg1 value of the null SidingPointer is the same as the Ybeg1 value of the flat SidingPointer. D12SortLastNode will sort the last node in a SidingPointer list by moving it backwards through the list until it is just above a node with a {PE,Ybeg1} value that is below or equal to the {PE,Ybeg1} value of the last node (or until the front of the list is reached). Since the null SidingPointer is sorted just after the flat SidingPointer was sorted and since they have the same {PE,Ybeg1} values, then the null SidingPointer will be just above the flat SidingPointer. Since they have the same {PE,Ybeg1} values, no other node will be placed between them so that in general the null SidingPointer added after every flat SidingPointer will always remain just above the corresponding flat SidingPointer.

Several adjustments meed to be made before the siding connection algorithm can be applied. If the first and last (or START and END) sidings of the sub-panel can be combined to make a larger super-siding, the the siding connection algorithm treats the siding closer to the front of the SidingPointer list as the bottom of the super-siding and treats the other siding as the top of the super-siding. Thus the siding with the smallest Ybeg1 value is the first siding in the super-siding and the siding with the largest Ybeg1 value is the second siding in the super-siding. However, the order of the START and END sidings in the SidingPointer list may be incorrect for the connection algorithm in cases where there is a tie between the two Ybeg1 values. The values of Ybeg1 are the same when one of the two sidings is flat and the other is an upward or a flat siding. The START and END sidings are out of order when the END siding is flat and the START siding is flat or upward pointing. Under these conditions, an exchange operation is performed which is discussed below.

Another problem for the super-siding occurs when either the START or END sidings point downward (where D = 1) and the other siding is flat (where D = 0). Since the super-siding can only have one value of D, both the START and END sidings must have the same direction value D. The flat siding is "reversed" so that D = 1 for that siding. If the START siding siding is flat and the END siding points downward, then the START siding is reversed. If the END siding is flat and the START siding points downward, then the END siding is reversed.

The last adjustment that needs to be made is to remove or ignore the null sidings that were added to the flat sidings that made up the super-siding. Since D12CloseSiding does not add a null siding to a flat END siding, we need only consider the case of a flat START siding. If the START and END sidings are both flat, then the reasons for adding a null siding to a flat siding will still apply to the resultant flat super-siding (which will have exactly one null-siding added since the flat END siding does not have an appended null-siding). However if the START siding is flat and the END siding is non-flat, then the resultant non-flat super-siding has a null-siding which, in general, must be ignored. This is discussed below.

Each of the four adjustments mentioned needs to be made only when the START siding obeys one set of conditions and the END siding obeys another set. for the exchange adjustment, we set a START-XCHG flag when the conditions of the START siding are met for an exchange adjustment (namely a flat or upward pointing siding) and we set an END-XCHG flag when the conditions of the END siding are met for an exchange adjustment (namely a flat siding). Similary, we set the START-RVS and END-RVS flags for the adjustment involving the reversal of the START siding. We set the START-RVE and END-RVE flags for the adjustment involving the reversal of the END siding. Finally, we set the START-IGN and END-IGN flags for the adjustment involving the removal or ignoring of a null-siding.

D12FinishNewPolygon searches the sidings for only an END siding if the global variable TwoSidings is False, otherwise it searches for both the START and END sidings. When either siding is found, then the START or END bits are cleared and the START-XCHG, START-RVS, START-RVE, START-IGN flags or the END-XCHG, END-RVS, END-RVE, END-IGN flags as appropriate are set. These flags occupy the positions: XCHG(bit 15), IGN(bit 14), RVS(bit 13), RVE(bit 12) of a word where the low order byte is set to the high order byte of WordPointer of the SidingPointer node so that the SidingPointer flags are in the positions D(bit 7), IN(bit 6), SEP(bit 5), CON(bit 4), FLAT(bit 2), START(bit 1) and END(bit 0). The last 2 flags are stored before they are cleared in this Word containing 11 flags, which is stored on the stack.

The pointer NullSidingPtrH:NullSidingPtrL is used to point to the siding just above a flat START siding which will be a null-siding. The method used to accomplish this is to initialize NullSidingPtrL to 0 and continually update the pointer to point to the next-to-the-last siding searched when NullSidingPtrL is nonnegative. If a flat START siding is found, the we set NullSidingPtrL = NOT(NullSidingPtrL) which guarantees a negative value in NullSidingPtrL and prevents subsequent updating. Later on NullSidingPtrL is again NOT'ed to produce the required pointer.

As mentioned in the D12CloseSiding explanation, the pointer StartJumpPtrH: StartJumpPtrL points to the null-siding added to the START siding in a subpanel while EdgePtrH:EdgePtrL points to the null-siding added to the END siding (at the time that D12FinishNewPolygon searches the sidings). The pointer EdgePtr follows immediately after the pointer StartJumpPtr in D12RAM. A local offset of 0 or 4 is placed in the BX register to allow either of these pointers to be used. If the first marked siding found is the START siding, then (normally) the END siding is possibly connected to the START siding so that the pointer to the START siding is required to form the connection and we set BX=0 in this case. Otherwise the pointer to the END siding is needed and we set BX=4.

As mentioned above, D12FinishNewPolygon searches the sidings for either the END siding or the START and END sidings. In the former case, after the END siding is found and its END bit is cleared then the routine avoids the connection algorithm. Otherwise, the routine saves the pointers to the START and END sidings and makes the following tests and adjustments in order to correctly poduce a super-siding if it is required.

If both the XCHG-START and XCHG-END flags are set, then we have a flat END siding which is above a flat or upward START siding. These sidings are in the wrong order for a connection and must be reversed which is accomplished by exchanging the stored pointers to the START and END sidings and changing the Offset in BX from 0 to 4 or from 4 to 0 to effect an exchange of StartJumpPtr with EdgePtr.

A test is made to see if the last drawn edge connects with the first subpanel beginning point. If they do not match then the connection algorithm is skipped. Otherwise the CONT bit is set in the bottom siding to indicate to D12SetSLnode that a top siding is connected, and the Xbeg value of the top siding is set negative to indicate to D12AddNodes that the siding is not to be added to the list of active sidings.

If both the RVS-START and RVS-END flags are set, then we have a flat START siding with a downward END siding. The start of this super-siding is at the opposite end of the flat START siding, which is also the bottom siding. So we set Xbeg of the START siding to StartLastDrawnX, a variable set by D12CloseSiding to the end point X-value of a START siding. We should also change the START siding pointer BlockPointer:WordPointer to point to the end of the siding. However, we do not know where the end is, but we know that the 2 word space following it (containing 0,0) is reserved for a possible Jump Opcode which is pointed to by StartJumpPtr. Thus we set BlockPointer:WordPointer = StartJumpPtrH:StartJumpPtrL. Note that this requires the Jump Opcode to be treated as a pseud-edge by D12SetSLnode and ignored. Finally, we set the flags D=1,IN=0,SEP=0,CONT=1,BACK=1 and FLAT=1 to indicate a downward flat siding (which in addition must be traversed BACKwards).

If both the RVE-START and RVE-END flags are set, then we have a flat END siding with a downward START siding. If both the RVE-START and RVE-END flags are set, then we have a flat END siding with a downward START siding. The start of the super-siding is correct and we only need to reverse the direction of the flat END siding by setting its BlockPointer:WordPointer to EdgePtrH:EdgePtrL which will not contain the JumpOpcode (since it is the top siding of the super-siding) but instead will contain a (0,0) edge which is innocuous. finally we set the flags similarly to the RVS case.

If the IGN-START and IGN-END flags are set, then we have a flat START siding and a non-flat END siding. The extra null-siding added to the START siding must be removed for proper operation of the fill algorithm. However when we have a flat END siding with a non-flat START siding, then we do not need to remove the extra null-siding. (Why?) As mentioned above, we need only set NullSidingPtrL = NOT(NullSidingPtrL) to have the pointer NullSidingPtr which points to the null-siding whose Xbeg value is negated so that the siding will be ignored by D12AddNodes.

At this point we retrieve the pointer to the empty extra 2 word space (filled with 0's) where the Jump Opcode is to be placed) by retrieving either StartJumpPtr or EdgePtr (as indicated by the Offset of 0 or 4 in BX). We take BlockPointer:WordPointer from the top siding (which contains flags and a pointer to the first edge in the top siding) and form a Jump Opcode: {1st,2nd words: bits 15 14 13 12 11 10 9 8 7 ....... 0 15 ....... 0} { 1, 1, D,IN,SEP,CONT,BACK,FLAT,WordPointer , BlockPointer} which is stored in the appropriate extra 2 word space. Note that the pointer part of the opcode points directly to the edge list rather than the SidingPointer node. This needs to be done since the SidingPointer nodes will be sorted with future subpanels so that their locations may vary whereas the edge list is not changed. This finishes the connection algoritm.

If the connection algorithm was skipped then a null-siding is added by call D12CloseSiding1. (Why?)

D12FinishNewPolygon then re-initializes the variabls: StartEndSidFlag has its START bit set, Direction = 0 and BeginPanelYposition = 1. If the paramter ContinuePolygon is True, then more subpanels are needed to complete the panel so we exit. Otherwise we (1) set the PE flag in the latest SidingPointer node {SidingPointerPtr} to indicate the end of a panel, (2) set the IN bit in ;the first SidingPointer node for the panel {FirstSidingPointerPtr} according to the value of the global Inside and (3) reset SidingPointerPtr to point to the (perhaps imaginary) node just before the one pointed to by FirstSidingPointerPtr. D12FinishNewPolygon then exits.

In addition to the procedure described above, this routine will exit any time there is an out-of-memory error indicated by any of the routines it calls. This error is signaled by setting the carry-flag.

9.2.2.2.2 PANEL GENERATION SUBSYSTEM -

FUNCTION:

This system receives lists of clipped edges and from them, generates a sorted list of panel sides which it uses to fill the panel with an appropriate pattern.

DATA AND CONTROL FLOW:

???

DATA REFERENCES:

???

MODULES REFERENCED:

???

DATA DEFINITIONS:

???

PROCEDURES:

| | | |
|---|---|---|
| D12PolygonFill | D2POFI | Initializes hardware and data structures for panel fill |
| D12PolygonFill1 | D2POF1 | Repeatdly invokes the routines to fill a panel scanline by scanline |
| D12AddNodes | D2ADDN | Adds a ScanLine node to indicate an edge of a panel on the current scanline |
| D12SetSLNode | D2SSLN | Initializes the ScanLine nodes added by D12AddNodes |
| D12Evaluate | D2EVAL | Evaluates the ScanLine node to determine the position of the panel edge on the next scanline |
| D12ScanLine | D2SCAN | Fills the interior of a panel for the current scanline |
| D12FillPattern contiguous | D2FPAT | Produces the patterned fill for a set of pixels in a scanline |
| D12PatShift | D2FTSH | Rotates a 32 bit pattern for pattern fill |
| D12SortLastNode | D2SORT | Sorts a linked-list |
| D12GetMemNode | D2GMEM | Retrieves next node in a linked-list and obtains more memory if necessary |

9.2.2.2.2.1 D12SortLastNode (D2SORT) -

FUNCTION:

A doubly linked list contains nodes which are in sorted order except for the last node. This routine will produce a completed sorted list.

The node and block size can be variable, since both of these are passed as parameters. The algorithm used is a simple bubble sort, which can complete in a single pass since all but the last node are assumed to be sorted previously. Among the fields of each node is a single key field which is used to determine the order.

CALLING SEQUENCE:

Call D12SortLastNode(bx:BlockPtr,cl:NodeLen,ch:EmptySpace,
                    es:di:LastNodePtrH:LastNodePtrL)

Prev: <integer>         An offset into the last block of
                            the list which contains a pointer
                            to the previous block (this also
                            indicates the size of the block)
    NodeLen: <integer>      The length of each node in bytes.
    EmptySpace: <integer>   The amount of unused space in the front
                            of the block in bytes (since the node
                            length may not be an even multiple of
                            the block length)
    LastNodePtr: <pointer>  The pointer to the last node (which is
                            unsorted). (The high portion of this
                            pointer references the block containing
                            the last node)

Near call

DATA REFERENCES:

???

MODULES REFERENCED:

DATA DEFINITIONS:

???

PROCEDURES:

While the front of the list is not reached and the key of the
        unsorted node is below the key of the next lowest node
        Exchange positions of the nodes

9.2.2.2.2.2 D12PolygonFill (D2POFI) -

FUNCTION:

This routine initializes the hardware, the ScanLine data structure and several global variables in preparation for the panel filling operation performed in D12PolygonFill1.

CALLING SEQUENCE:

Call D12PolygonFill

No Parameters
        Near call

DATA REFERENCES:

???

MODULES REFERENCED:

D12StartLinkList
    D12PolygonFill1
    D12ReserveDisplay
    D12ReleaseDisplay
    D12EnterSemaphore D12ReleaseHW
D12PanelMemoryError

30 DATA DEFINITIONS:

???

PROCEDURES:

```
      Reserve the display system   {D12ReserveDisplay}
      Reserve the display hardware {D12EnterSemaphore}
 5    If (SegErase = 1) (the panel is to be erased) then
         Save the writing mode of panels {PLoverstrike}
         PLoverstrike := 0 (replace mode so we can erase the panel)
      If (SegErase = 1) (the panel is to be erased) OR
         (PLpatternNumber >= -7 (the panel has a fill pattern) AND
10          (PLoverstrike = 0 (the panel is in Replace mode) OR
             PLpatternNumber <> 0 (we may have nonzero indices to
                overstrike))) then
         Ensure that there is a linked list for the scan line (SL)
             nodes {D12StartLinkList}
15       If there was insufficient memory for the SL node list then
             Throw away the panel list and signal the error
                {D12PanelMemoryError}
         Else (get ready to fill the panel)
             Set the hardware to use the current graphics writing mode
20             {GRmode01,GRmode2} (this also restricts the writeable
                planes to those for the current surface)
             If PLSMP indicates single pass (the hardware can handle the
                fill pattern in one pass) then
                If there are more bits per pixel in the fill pattern than
25                 planes to display the pattern in the current surface
                   then
                   Adjustment := number of planes - bit per pixel (this is
                       a negative number)
                Else
30                 Adjustment := 0
                If any index of the pattern is not 0 or the panel is in
                   Replace mode then
                   Shift each index left by number of planes behind the
                       surface + Adjustment (if there are more bits per
35                     pixel than planes, this causes the least significant
                       bits of these indices to be discarded. NOTE: this
                       might be a right shift if ABS(Adjustment) > number
                       of planes behind the surface)
                   If the lowest index (prior to shifting) was 0 and the
                       panel is in Overstrike mode then
                       Set the hardware to Overstrike mode
             Else (Multiple pass mode)
                Set the hardware for more than two indices by setting the
                   bank 1 index registers to minimum and maximum hardware
45                 index values. Thus, Reg0 := 0, Reg1 := 7 (because this
                   is a three plane system)
                Using a table, set the Jump and Return location variables used
                   in D12FillPattern to perform one of several algorithms to
50                 fill a scanline of a panel.
             If the graphics surface is 1 bit deep then
                If the panel is in Overstrike mode then
                   Set the hardware to Overstrike mode
             Else
55             - If the graphics surface is 3 bits deep then
                   If the number of bits-per-pixel is 2 then
                      Set the Jump and Return location variables for the case
                         of a 2 bit deep graphics surface.
                      If the graphics area writing mode is Replace then
                         Set the Plane-2 ALU mode to the function F=0
 5                          {This forces a zero in the high order bit which is
                            not set by the fill pattern. The zero should not
                            be forced if the graphic mode is XOR since 0 XORed
                            with any bit does not change that bit.}
```

```
       If there is a 0 index in the fill pattern and
           the graphics area writing mode is Replace and
           the panel mode is Overstrike then
         Change the Jump and Return locations variables so that a
             preliminary jump may occur to code which zeroes every
             pixel associated with a nonzero index in the fill
             pattern
         Set the hardware to Overstrike mode
       Else
         Set the hardware to Replace mode
     Obtain the next SidingPointer node in the SidingPointer list
     From the SidingPointer node extract the number of the first scan
         line to be filled and set the variable NextYbeg to it
     Initialize Yscan, the number of the scan line being processed in
         the viewport
     Initialize NumSLnode, the number of active ScanLine nodes, to 0
     Extract the flag from this first SidingPointer node indicating
         whether the lower left pixel is inside or outside the panel,
         and set the variable Inside accordingly
     Case (Panel Keying Mode) of
       1:              {keying to the viewport}
         Set the horizontal keying bias (ScanBias) to 0
         Set the FillPattern pointer to point to the "bottom" scanline
             in the FillPattern data.
       2:              {keying to the lower left panel pixel}
         Set ScanBias to the value of 4*bits-per-pixel and add 7F00H to
             indicate that the "first" pixel in the panel has not yet
             occurred (at which time the horizontal and vertical keying
             adjustments will be made)
         Set the FillPattern pointer to point to the "bottom" scanline
             in the FillPattern data.
       3:              {keying to the screen}
         Set the horizontal keying bias to the number of pixels to the
             left of the viewport
         Set the FillPattern pointer to point to the ("bottom" + [number
             of pixels below the viewport modulo the height of the fill
             pattern]) scanline in the FillPattern data.
     Set the hardware beam position to the lower left pixel of the
         viewport
     Invoke the hardware Polygon-Fill opcode
     Continue at D12Polygon1
   Else    { No panel fill to occur}
     Release the hardware      {D12ReleaseHW}
     Release the display       {D12ReleaseDisplay}
```

9.2.2.2.2.3 D12PolygonFill1 (D2POF1) –

FUNCTION:

This routine fills a panel by filling in the scanlines of the panel from bottom up.

CALLING SEQUENCE:

Call D12PolygonFill1

No Parameters
   Near call

DATA REFERENCES:

???

MODULES REFERENCED:

D12Evaluate
   D12AddNodes
   D12ScanLine
   D12ReleaseDisplay

D12ReleaseHW

DATA DEFINITIONS:

???

PROCEDURES:

```
    For LoopYscan = 0 to (height of viewport in scanlines)-1 do
       Initialize the current ScanLine pointer to point to the first
          ScanLine node
       Set the variable PLLP, the leftmost pixel of the last ScanLine
          node,      to -1 (so that the first ScanLine node's LP value
          will be > -1 and D12SortLastNode will not be called to sort
          this solitary node)
       For CurrentNode = 0 to NumSLnodes do
          Set the current ScanLine pointer to point to the next node
          Evaluate this node to determine the left-most pixel (LP) of the
             siding that passes thru this scanline, the right-most pixel
             (RP) of the siding and the crossing pixel on the next
             scanline (XP) (i.e. the first pixel on the next scanline
             visited by the siding) {D12Evaluate}
          If this node is not deleted then
             Add the node to the list of currently active ScanLine node
                which are sorted according to their LP values.
                {D12AddNodes}
             Scan the set of ScanLind nodes to produce the sections of the
                panel that pass thru this scanline. {D12ScanLine}
             If the Cancel key has been pressed then
                Goto 1
             Adjust the FillPattern pointer to point to the next higher
                scanline in the FillPattern data modulo the hight of the
                fill pattern
             Set the hardware to the next higher scanline
          Else {this node is deleted because the siding associated with
                it ended}
             Decrement NumSLnodes
             Decrement CurrentNode
1:  Terminate the hardware Polygon-Fill opcode
    If the panel is to be erased then
       Reset the stored value of the panel mode (PlOverStrike)
    Release the hardware system    {D12ReleaseHW}
    Release the display system     {D12ReleaseDisplay}
```

9.2.2.2.2.4 D12AddNodes (D2ADDN) -

FUNCTION:

This routine adds a ScanLine node whenever a new siding begins at the current scanline.

CALLING SEQUENCE:

Call D12AddNodes

No Parameters
Near call

DATA REFERENCES:

???

MODULES REFERENCED:

DATA DEFINITIONS:

???

PROCEDURES:

While the scanline number (Yscan) is equal to Y-value of the bottom
    of the next siding (NextYbeg) do
  If the beginning X-value of the next siding (Xbeg) is >= 0 then
    {Xbeg < 0 is used to indicate that a siding is a continuation
      of a previous siding and is to be ignored. However the tests
      for panel ending (PE) must be performed since this might be
      the last siding in a panel.}
    Initialize the ScanLine pointer to the first ScanLine node
        pointer (FirstSLnodePtr)
    For CurrentNode = NumSLnode to 0 by -1 do
      Advance the ScanLine pointer to point to the next ScanLine
        node {This For-Loop advances the ScanLine pointer to the
        last ScanLine node presently in use}
    Obtain the pointer to the next ScanLine node, adding to the
        linked list structure if necessary {D12GetMemNode}
    If there was a lack of memory for the SL node list then
      Throw away the auxiliary data structure and log an error
          {D12PanelMemoryError}
      Set the current scanline number (Yscan) to a large value to
          cause D12PolygonFill1 to exit.
      Set the number of SL nodes (NumSLnodes) to 0 to protect
          D12ScanLine from examining non-existent SL nodes
    Else
      Increment the number of currently active SL nodes
          (NumSLnodes)
      Set the beginning X-value of the SL node to that of the
          siding
      Set the siding-pointer in the SL node to point to the new
          siding
      For the new SL node, initialize the DDA-state parameters and
          calculate the first pixel (XP) for the first edge in the
          added siding. {D12SetSLnode}
      Set the left-most pixel (LP) and the right-most pixel (RP) of
          the SL node to XP.
          {XP is the first pixel visited by the siding on this
          scanline. The siding is exactly one pixel thick until it
          is evaluated by D12Evaluate to determine the thickness
          represented by LP and RP.}
      If the first pixel is at the left edge (XP = 0) then
        If the scanline is NOT the top scanline of the viewport
            then
          Invert the inside-outside sense of the first pixel to the
              left of the viewport on this scanline (invert the
              sense of the flag Inside).
              {In moving upwards one scanline, we cross over this
              new siding which is treated as starting from outside
              the viewport and entering at this scanline. Crossing
              this siding causes the inside-outside sense of the
              panel to be inverted. However, if this is the top
              scanline in the viewport, then this siding must be
              flat and thus there will be an extra null-siding
              appended to the end of it. In this case, the correct
              result occurs only if we do not invert the inside-
              outside sense.}
      Evaluate the SL node by "driving" the DDA-state parameters to
          emulate the line-drawing hardware until an edge of the
          siding enters the next scanline above or the siding ends.
          {D12Evaluate}
  If this new siding is the last siding in the panel (PE=1) then
    Set the Y-value of the beginning of the next siding (NextYbeg)
        to a large value to prevent any nodes from being added
    Goto 1
  Else
    Obtain the next SidingPointer node. {D12GetMemNode}
    Set SidingPointerPtr to point to this node
    Extract the Y-value of the beginning of this siding and set
        NextYbeg to it
1: Return

9.2.2.2.2.5 D12SetSLnode (D2SSLN) -

FUNCTION:

This routine initializes the DDA-parameters for the current edge-node of the current siding associated with the current Scan-Line noe.

CALLING SEQUENCE:

Call D12SetSLnode

No Parameters
   Near call

DATA REFERENCES:

???

MODULES REFERENCED:

DATA DEFINITIONS:

???

PROCEDURES:

```
Extract the flags and the pointer to the first edge node from the
    current ScanLine (SL) node (pointed to by SLnodePtr)
If the Edge node contains a Jump Opcode then
    Set DeltaX = DeltaY = 0 for this edge in order to ignore it
Else
    If (this is the last edge-node in the siding (L=1) and the list
         is traversed forwards (BACK=0)) OR
         (this is the first edge-node in the siding (L=0) and the list
         is traversed backwards (BACK=1)) then
         {The BACK flag is set if the direction of a flat bottom or flat
         top siding of a concatenated super-siding needs to be reversed.
         The F flag is set for the first edge node in a siding and the L
         flag is set for the last edge node. The BACK flag determines
         whether the F flag or the L flag is to be the end-of-edge-list
         indicator.}
         If the siding points downward (D=1) then
             Negate DeltaX
         If this siding is continued with another siding (CONT=1) then
             Repeat
                 Get next edge-node {traverse forwards}
             Until a Jump Opcode found {1,1,flags,new-wordptr,newblockptr}
             Set the new flags (D,SEP,CONT,BACK) and the new pointer to the
                 next edge-node (new-blockpointer:new-wordpointer)
         Else
             Indicate the end of a siding (BlockPointer=0)
    Else    {not the last edge traversed in the siding}
         If this siding points upwards (D=0) then
             Get next edge-node {traverse forwards}
         Else  {siding points downwards (D=1)}
             Negate DeltaX
             {The DeltaX values placed in edge-nodes are the ones passed to
             D12SaveEdge while the absolute value of the deltaY values are
             placed in the edge-nodes. A downwards siding is traversed in
             the opposite direction in which it was built so that the DeltaX
             values need to be negated.}
             Get previous edge-node {traverse backwards}
    In the current ScanLine-node set the pointer to the next edge-node.
         {set SL node fields BlockPointer,WordPointer where BlockPointer
         is set to 0 to indicate that there is no next edge-node}
    Set the D and SEP fields in the current SL node
    Calculate the starting DDA-parameters for the current edge-node.
```

9.2.2.2.2.6 D12Evaluate (D2EVAL) -

FUNCTION:

This routine "evaluates" a scan-line node to determine the left-most pixel of the siding passing through this scanline, the right-most pixel of the siding and the crossing pixel on the next scanline.

CALLING SEQUENCE:

Call D12Evaluate

No Parameters
Near call

DATA REFERENCES:

???

MODULES REFERENCED:

DATA DEFINITIONS:

???

PROCEDURES:

```
Extract the DDA-parameters for the current edge-node in the current
    ScanLine (SL) node
If the number-of-pixels remaining in the edge-node (Counter12) < 0
    then {End of siding}
    If the left-most pixel (XP) = 0 then
        {Siding exits on left hand side of viewport}
        If the current scanline (Yscan) is not the bottom scanline in the
            viewport then
            Invert the inside-outside sense of the panel {Invert Inside}
    Indicate the deletion of this node
    Set the XP,RP,LP parameters to a large number so that the node will
        be placed by D12SortLastNode at the end of the SL node list and
        will not be used
Else    {NOT End-of-siding}
    Indicate that this SL node is NOT deleted   {DeleteNode = 0}
    Initialize the left-most pixel (LP) and the right-most pixel (RP)
        of the siding to the crossing point (XP) of the siding with
        scanline.
ReEnter:
    If the number-of-pixels remaining in the edge node is > 0 then
        If the Y-axis is the major axis of the line then
            If the next position of the line is along the Y-axis then
                Calculate the DDA-error accumulator RA = RA+RY
            Else    {next position is along a Y-axis diagonal}
                Calculate the DDA-error accumulator RA = RA+RX
            Increment or decrement XP (using ZZ) according to whether the
                line slants to the right or to the left
            Decrement the number-of-pixels remaining in the edge
                (Counter12) {RP and XP are now correctly set to show a 1
                pixel extent of the siding on this scanline.}
        Else    {the X-axis the the major axis of the line}
            If the next position of the line is along the X-axis then
                Until the next position of the line is along an X-axis
                    diagonal or the number-of-pixels remaining = 0 do
                    Calculate the DDA-error accumulator RA = RA+RY
                    Increment or decrement XP (using ZZ) according to whether
                        the line goes to the right or to the left
                    Decrement the number-of-pixels remaining (Counter12)
                    If the number-of-pixels remaining = 0 then
                        If the line went to the right then
                            Reset RP to the maximum of RP and XP
                                {Showing the right-most extent of the siding on
                                this scanline}
```

```
          Else   {the line went to the left}
             Reset LP to the minimum of LP and XP
                {Showing the left-most extent of the siding on this
                 scanline}
       Else  {the next position is along an X-axis diagonal}
          If the line went to the right then
             Reset RP to the maximum of RP and XP
          Else
             Reset LP to the minimum of LP and XP
       Increment or decrement XP according to wheter the line goes
          to the right or to the left
       Decrement the number-of-pixels remainding in the edge
   If the number-of-pixels remainding = 0 then
      If no more edges are in the siding (BlockPointer=0) then
         Indicate the end of the siding (Counter12=-1)
      Else
   D12Evaluate2:
         Initialize the DDA-parameters for the next edge-node
            {D12SetSLnode}
         Go to 'ReEnter'
   Else
      If the left-most pixel (LP) is less than the rigt-most left-most
         pixel (PLLP) then
         Sort the current SL node in the prviously sorted SL node list
            {D12SortLastNode}
      Else
         Set the right-most left-most pixel to the left-most pixel
```

9.2.2.2.2.7 D12ScanLine (D2SCAN) -

FUNCTION:

This routine fills a polygon for a specific scan line.

CALLING SEQUENCE:

Call D12ScanLine

No Parameters
       Near call

DATA REFERENCES:

???

MODULES REFERENCED:

DATA DEFINITIONS:

???

PROCEDURES:

```
   Initialize the maximum right-most pixel (P1RPmax) to a negative value
      (so that it is less than any LP or RP value)
   Initialize the previous-right-most panel-scan pixel (ScanOldRight) to
      a large negative value  (to indicate no previous panel-scan and
      so that it is less than any calculated right-most panel-scan
      pixel (ScanRight))
   If we are inside the panel as we enter the viewport form the left on
      this scanline then    (Inside = True)
      Set Left-most panel-scan pixel (ScanLeft) to 0
      Go to 'LookRight'   (to find the right boundary)
   Decrement the number of nodes to examine (CurrentNode)
   If there are more SL nodes to examine then
      Obtain pointer to next SL node
      If boundary is to be covered then    {CoverBoundary True}
         Left-most panel-scan pixel (ScanLeft) = Leftmost pixel in the
```

```
           siding for this scanline (LP) {This is the leftmost pixel
              of the left boundary of a panel}
     Else
        Left-most panel-scan pixel = one more than the right-most pixel
           in the siding for this scanline (RP) or the maximum
           right-most panel-scanpixel (PlRPmax), whichever is greater
           {The sidings are sorted according to their LP values. The RP
           values for these sidings are not necessarily in an ascending
           order. In particular, a previous siding may have an RP value
           greater than that of the present siding. The first pixel
           inside the boundary must be to the right of all RP pixels on
           all sidings examined so far.}
     Set the maximum right-most panel-scan pixel (PlRPmax) to the
        maximum of PlRPmax and RP
     Set the left-most pixel (LP) and the right-most pixel (RP) of the
        SL node to XP. {Initialization for D12Evaluate (although
        perhaps not needed)}
  LookRight:
     Decrement the number of nodes to be examined  (CurrentNode)
     If there are nodes remainding then
        If the boundary is to be covered then      {CoverBoundary = True}
           Right-most panel-scan pixel (ScanRight) = right-most pixel for
              the siding (RP) or the maximum right-most panel-scan pixel
              (PlRPmax), whichever is greater
        Else
           Right-most panel-scan pixel (ScanRight) = one less than the
              left-most pixel in the siding (LP-1)
        Set the maximum right-most panel-scan pixel (PlRPmax) to the
           maximum of PlRPmax and RP
        Set the left-most pixel (LP) and the right-most pixel (RP) of the
           SL node to XP. {Initialization for D12Evaluate (although
           perhaps not needed)}
        If the previous panel-scan abuts the new panel-scan then
           (ScanOldRight+1 = ScanLeft)
           Append the new panel-scan to the previous panel scan
        Else
           If there is a previous panel-scan then   (ScanOldRight >= 0)
              Fill the previous panel-scan (pixels ScanOldLeft thru
                 ScanOldRight) on this scanline with the defined fill
                 {D12FillPattern}
              Set the previous panel-scan to the new panel-scan
                 ([ScanOldLeft,ScanOldright] = [ScanLeft,ScanRight])
     Else     {No more SL nodes}
        If there is a previous panel-scan then   (ScanOldRight >= 0)
           Fill the previous panel-scan with the defined fill
              {D12FillPattern}
           {ScanOldright is initialized to a large negative number to
           indicate no previous panel-scan. However ScanOldRight can be
           -1 if the boundary was not to be covered and the right
           boundary ended on pixel 0 (the left-most pixel in the
           viewport). For the first case we must not call D12FillPattern
           and for the second case we need not call D12FillPattern, so
           the test of ScanOldRight >= 0 suffices for both conditions.)
```

9.2.2.2.2.8 D12FillPattern (D2FPAT) -

FUNCTION:

This routine fills a contiguous sequence of pixels in one scan line with the fill pattern.

CALLING SEQUENCE:

Call D12FillPattern

No Parameters
Near call

DATA REFERENCES:

???

MODULES REFERENCED:

D12PatShift

DATA DEFINITIONS:

???

PROCEDURES:

Set Length-of-Run = Rightmost-pixel - Leftmost-pixel
           {The length required by the hardware is 1 less than the number of
           pixels in the run.}
       If Length-of-Run >= 0 then
           {It is possible for Length-of-Run to be -1 , i.e. Rightmost-pixel
           can equal Leftmost-pixel - 1}
       If the FillPattern number <= 0 then    {Solid Fill requested}
           Set the Xaxis output port to the X-coordinate of the Leftmost-pixel
           Set the Counter12 output port to Length-of-Run
           Set the ColFile output port to 04F8H to induce the output of pixel
               images using the index in Bank 1 Register 1. {i.e. draw the
               horizontal line}
       Else
           If this is the first time a pixel is to be outputted for the
               panel and we are keying the FillPattern to the first pixel
               then {ScanBias > 7F00H}
               Set the bits-per-pixel from the low order byte of ScanBias
               Set the FillPattern pointer to the bottom row of the pattern
               Set ScanBias to the negative of the X-coordinate of the
                   leftmost pixel {Since ScanBias is added to the X-coordinate
                   of every row of pixels outputted, this keys the FillPattern
                   to the first pixel of the panel}
           Set Biased-X-Value = X-coordinate of Leftmost-pixel - ScanBias
               {Biased-X-Value specifies the Leftmost-pixel of the
               FillPattern to be used for the Leftmost-pixel of this run of
               pixels}
           In general, the display of pixels is accomplished by placing data
               from the FillPattern onto the 32 bit shift-register and
               shifting it Biased-X-Value places to the left before using
               the register in an image writing mode of the hardware.
           Using the Jump and Return variables ScanJump and ScanPush (along
               with ScanJump1 in cases involving a pre-zero operation)
               execute the appropriate code in accordance with the following
               factors:
               1. Single-pass mode (1 or 2 different indices in the
                   FillPattern) or Multiple-pass mode (more than 2 different
                   indices in the FillPattern)
                   (1a) -  Single-pass mode:
                       1 or 2 indices in the FillPattern can be placed in the
                       run of pixels in one pass since Bank 1 Register 1
                       contains one of the indices and Bank 1 Register 0
                       contains the other if it exists. The Set mode or XOR
                       mode is set in the ALU modes. This is done by
                       D12PolygonFill. For the Single-pass mode, the
                       FillPattern contains a 1 for each occurrence of the
                       larger index and a 0 for each occurrence of the smaller
                       index in the FillPattern definition.
                   (1b) - Multiple-pass mode:
                       When more than 2 different indices are in the
                       FillPattern, then for r bits-per-pixel in the
                       FillPattern, we perform r runs. The first run outputs
                       bit position m of the pattern, the second run outputs
                       bit position r-1 of the pattern, etc. To output only one
                       bit position of the pattern we disable all planes except
                       the plane corresponding to the desired bit position.
                       Bank 1 Register 1 contains all 1's and Bank 1 Register 0
                       contains all 0's and the outputting is done in Dual mode. (Single mode can not be used since it does not
output the 0 from Bank 1 Reg. 0 when a 0 occurs in the
FillPattern data). For the Multiple- pass case, the
FillPattern is arranged "horizontally" by bit position
first and by scanline second to accomplish this.
2. Number of planes in the surface.
  (2a) - Single-pass mode:
    The planes for the surface are enabled in
    D12Polygonfill.
  (2b) - Multiple-pass mode:
    There are four cases:
  (2a1) - One plane surface.
    If there is a 1-plane surface, then only the
    high-order bit of each of the multiple indices in
    the FillPattern is shown. Thus only two different
    indices (1 or 0) are displayed. This case is simply
    handled as a Single-pass mode by using the same
    logic as in case (2a) above.
  (2a2) - Two-plane surface using planes 0 and 1.
    The following flow of control occurs with the
    parameters:
        Jump-Variable    ScanJump := D12Plane01SurfaceXX
        Return-Variable ScanPush := D12Ret1XX.
    Jump to
    D12Plane01SurfaceXX:
      Enable plane 1 , Disable plane 0
      Drop through to
    D12GetScanLineXX:
      Draw the (plane 1) horizontal line
      Return to
    D12Ret1XX:
      Enable plane 0 , Disable plane 1
      Call D12GetScanLineXX
    D12GetScanLineXX:
      Draw the (plane 0) horizontal line
      Return to
    D12ExitPopBPXX:
      Exit D12FillPattern
  (2a3) - Two-plane surface using planes 1 and 2.
    The following flow of control occurs with the
    parameters:
        Jump-Variable    ScanJump := D12ThreeBitSurfaceXX
        Return-Variable ScanPush := D12ExitPopBPXX.
    Jump to
    D12ThreeBitSurfaceXX:
      Enable plane 2 , Disable plane 1 , Disable plane 0
      Call D12GetScanLineXX
    D12GetScanLineXX:
      Draw the (plane 2) horizontal line
      Return to
    {Unlabeled statement}
      Disable plane 2
      Drop through to
    D12Plane01SurfaceXX:
      Enable plane 1 , Disable plane 0
      Drop through to
    D12GetScanLineXX:
      Draw the (plane 1) horizontal line
      Return to
    D12ExitPopBPXX:
      Exit D12FillPattern
  (2a4) - Three-plane surface.
    The following flow of control occurs with the
    parameters:
        Jump-Variable    ScanJump := D12ThreeBitSurfaceXX
        Return-Variable ScanPush := D12Ret1XX.
    Jump to
    D12ThreeBitSurfaceXX:
      Enable plane 2 , Disable plane 1 , Disable plane 0
      Call D12GetScanLineXX

```
         D12GetScanLineXX:
           Draw the (plane 2) horizontal line
           Return to
         {Unlabeled statement}
           Disable plane 2
           Drop through to
         D12Plane01SurfaceXX:
           Enable plane 1 , Disable plane 0
           Drop through to
         D12GetScanLineXX:
           Draw the (plane 1) horizontal line
           Return to
         D12Ret1XX:
           Enable plane 0 , Disable plane 1
           Call D12GetScanLineXX
         D12GetScanLineXX:
           Draw the (plane 0) horizontal line
           Return to
         D12ExitPopBPXX:
           Exit D12FillPattern
   3. Bits-per-pixel of the FillPattern.
      There are three cases.
      (3a) - Bits-per-pixel is equal to number of planes in
            surface: There is no adjustment to the logic of case 2.
      (3b) - Bits-per-pixel is greater than the number of planes:
          (3b1) - Single-pass mode:
                  The 1 or 2 indices of the FillPattern are shifted
                  to the right so that the high order bit of each
                  index corresponds to the high order plane of the
                  surface. This is done in D12PolygonFill.
          (3b2) - Multiple-pass mode:
                  No adjustment is made since the first pass (which
                  outputs the highest order bit of the fill pattern)
                  occurs on the highest order bit of the surface,
                  the second pass involves the second highest order
                  bit of the pixel with the second the second highest
                  order bit of the surface, etc.
      (3c) - Bits-per-pixel is less than the number of planes:
          (3c1) - Single-pass mode:
                  No adjustment is made since all the high order bits
                  of the 1 or 2 indices of the FillPattern are 0.
          (3c2) - Multiple-pass mode:
                  The Jump-Variable and the Return-Variable are
                  changed to correspond to the lower order bits of
                  the surface. (Actually there is only one case,
                  namely a 3-bit surface with 2 bits-per-pixel,
                  which is transformed into case 2a2.) Furthermore,
                  we have two sub-cases:
              (3c2a) - The panel is drawn in SET mode:
                       The high order planes of the surface that are
                       not associated with any bit of the FillPattern
                       are enabled and the ALU modes for these planes
                       are set to the function F = 0 to force a 0 in
                       the high order bits during the multiple passes.
                       (Actually the only case involves setting
                       Plane-2 ALU to F = 0 which is done in
                       D12PolygonFill.
              (3c2b) - The panel is drawn in XOR mode:
                       The high order planes of the surface that are
                       not associated with any bit of the FillPattern
                       are disabled since 0 XORed with 0 or 1 does not
                       change that bit. (Actually the only case
                       involves disabling Plane-2 in D12PolygonFill.)
   4. The mode of the segment.
      There are two cases.
      (4a) - Segment drawn in SET mode.
             The ALUs of all planes are set to SET mode.
      (4b) - Segment drawn in XOR mode.
             The ALUs of all planes are set to XOR mode.
   5. The mode of the panel.
```

There are two cases.
(5a) - Panel drawn in Replace Mode.
All indices in the fill pattern are placed in the bit planes.
(5b) - Panel drawn in Overstrike Mode.
All non-zero indices in the fill pattern are place in the bit planes.
6. Existence of a zero index in the fill pattern.
There are two cases.
(6a) - There is no zero index in the fill pattern.
(6a1) - Single-pass mode:
The hardware is set to Dual mode regardless of the segment mode or the panel mode.
(6a2) - Multiple-pass mode:
There is no adjustment to the logic.
(6b) - There is a zero index in the fill pattern.
(6b1) - Single-pass mode:
(6b1a) - Panel mode is Replace:
The hardware is set to Dual mode.
(6b1b) - Panel mode is Overstrike.
(6b1b1) - There is one index in the fill pattern:

Since only nonzero indices are to be outputted and there is only one index which is zero, there is nothing to output and thus no panel fill. D12PolygonFill recognizes this case and exits the panel filling code when it occurs.
(6b1b2) - There are two indices in the fill pattern:
For this case of a nonzero and a zero index, the ones in the fill pattern are associated with the larger index (which must be nonzero). The zeroes in the fill pattern are associated with the smaller index (which is zero). The hardware is set to Dual mode in which case each occurence of a 1 in the fill pattern will place the nonzero index in the bit planes and each occurence of 0 will not affect the bit planes. This is the result desired.
(6b2) - Multiple-pass mode:
(6b2a) - Panel in Replace mode:
There is no adjustment to the logic.
(6b2b) - Panel in Overstrike mode:
(6b2b1) - Segment in XOR mode.
When the panel is in Overstrike mode, the zero indices have no effect. However this is also true for Replace mode (when the segment is in XOR mode) because zero XORed with any index does not change it. So this case can be treated exactly as the case of a Panel in Replace mode (6b2a), namely there is no adjustment to the logic.
(6b2b2) - Segment in SET mode.
In order for the zero indices to have no effect, the multiple passes must be done with the hardware in single mode. However, then the zero bits of the nonzero indices will not be put into the bit planes as required. In order to solve this problem, all pixels in the surface corresponding to nonzero indices are first set to zero before the regular multiple-pass algorithm is used. This Pre-Zero scan is done in single mode with the ALU modes set to F =0 with the 32-bit rotating register consisting of a 1 for each corresponding
nonzero index in the fill pattern and a 0
for each zero index. The pattern for this
mask is generated by ORing together all of
the bit-position row patterns of the fill
pattern (for a single scan line). The
Pre-zero operation is added to the front
of the multiple-pass algorithm by setting
the variable ScanJump1 to ScanJump and
ScanJump to the location of the label
'D12PreZeroXX'. This is done in
D12PolygonFill. After the Pre-zero
operation is accomplished at D12PreZeroXX,
then the original algorithm is executed by
jumping to the location specified by
ScanJump1. The Pre-zero algorithm:

D12PreZeroXX:
  Set all ALU modes to F = 0  {Hardware is in
      Single mode}
  Set the 32-bit register quantity NonZeroRow to
      the first 32-bit row of the fill pattern.
      (corresponding to the highest bit-position
      of the fill pattern.)
  For I = 2 to (bits-per-pixel of fill pattern)
      do
    NonZeroRow = OR(NonZeroRow,Row[I] of fill
        pattern)
  Call D12CallPatShiftXX
      {to prezero this scanline with the nonzero
      indices indicated by 1s in the 32-bit
      NonZeroRow.}
  Execute the algorithm indicated by the
      Jump-Variable ScanJump1 and the
      Return-Variable ScanPush as indicated in
      (2) above.

9.2.2.2.2.9  D12PatShift (D2PTSH) -

FUNCTION:

This routine rotates a 32-bit quantity any number of places to the left.

CALLING SEQUENCE:

Call D12PatShift

Pattern: <32-bit integer>      The 32 bit quantity to be rotated.
    RotateNumber: <integer>        The number of places to the left
                                   that the pattern is to be rotated Near call

DATA REFERENCES:

???

MODULES REFERENCED:

DATA DEFINITIONS:

???

PROCEDURES:

Rotate Pattern RotateNumber.bits[0:4] places to the left.
    {Since Pattern is a 32-bit quantity, only the quantity
    MOD(RotateNumber,32) has an effect.

9.2.2.2.3 PANEL PATTERN SUBSYSTEM -

FUNCTION:

This system contains the data for the default fill pattern definitions and handles the transactions for creating user defined fill patterns. It also selects the fill patterns to be used in susequent panel fill.

DATA AND CONTROL FLOW:

???

DATA REFERENCES:

???

MODULES REFERENCED:

???

DATA DEFINITIONS:

???

PROCEDURES:

| | | |
|---|---|---|
| DspBeginFillPattern by of | D2BFPT | Begins a fill pattern definition specifying the fill pattern number and the width, height and number bits per pixel in the pattern |
| D12FillPut DspRasterWrite | D2FIPU | Places the pixels from or DspRunlengthWrite into the open fill pattern definition |
| DspEndFillPattern definition | D2EFPT | Terminates a fill pattern |
| DspSetFillPattern | D2PATT | Selects the pattern definition to fill the interior of panels |
| D12SearchFillNumber | D2SFIN | Given a fill pattern number, this routine searches for the corresponding fill pattern definition |
| DspDefaultPatternData fill | D2DFPT | Contains all of the 16 default pattern definitions in a ccrpacted form. This is expanded into the standard fill pattern definitions by DspFeset. |

9.2.2.2.3.1 D12BeginFillPattern (D2BFPT) -

FUNCTION:

This routine begins a fill pattern definition by defining the fill pattern number, width, height and number of bits per pixel in the pattern.

the fill pattern.

CALLING SEQUENCE:

Call DspBeginFillPattern

```
              PatternNumber: <integer>          The fill pattern number.
              M: <integer>                      The width of the fill pattern.
              N: <integer>                      The height of the fill pattern.
   20         BitsPerPixel: <integer>           The number of bits per pixel.
              Far call

DATA REFERENCES:

25   ???

MODULES REFERENCED:

D12SearchFillNumber
   30   MonErrorLogR2
        MonErrorLogR3
        MonFreeMemR
        MonGetMemR

35 DATA DEFINITIONS:

???

PROCEDURES:

If in the middle of another fill pattern definition then
              {PNBlockPointer <> 0}
    5       MonErrorLogR2(ax:'MD03'-equivalent)
          Else
            If BitsPerPixel is not 1,2,3 or 6 then
              MonErrorLogR2(ax:'MD41'-equivalent)
            Else
   10         Set TrueBPP to (1,2,3,3) for BitsPerPixel = (1,2,3,6)
                  {TrueBPP is the "true" bits per pixel}
              PixelsPerCharacter = PPCMaskTab[BitsPerPixel].LowByte
              Mask = PPCMaskTab[BitsPerPixel].HighByte
              PnBPP.LowByte = TrueBPP
   15         PnBPP.HighByte = PixelsPerCharacter
              PnBPP.ThirdByte = Mask
              PnM = M
              PnRemainderInRow = M
              If M is not in the range [1,32] then
   20           MonErrorLogR2(ax:'MD21'-equivalent)
              Else
                Calculate ShiftCount to be the smallest integer such that
                    M <= 2**ShiftCount      {ShiftCount = 1,2,3,4 or 5}
                    {The fill pattern with width M will be treated as having
   25               the (possibly) larger width of 2**ShiftCount with the extra
                    undefined pixels being set to 0.}
                PnDuplType = PnDuplType-Tab[ShiftCount]
                    {PnDuplType contains the location of a label to jump to
                    in order to perform the required duplication of the given
   30               pattern to fill 32 positions.}
                If N is not in the range [1,480] then
                  MonErrorLogR2(ax:'MD31'-equivalent)
                Else
                  PnPatternPara is set to the number of paragraphs needed to
   35                 store the fill pattern if it involves a multiple-pass
                      algorithm, (i.e. if it has more than 2 different
                      indices). This number is: Ceiling((BitsPerPixel*N)/4)
                  Pn2IndicesPatternPara is set to the number of paragraphs
                      needed to store the fill pattern if it involves a
   40                 single-pass algorithm, (i.e. if it has 1 or 2 different
                      indices). This number is:     Ceiling(N/4)
                  If PatternNumber <= 0 then
                    MonErrorLogR2(ax:'MD11'-equivalent)
                  Else
   45               D12SearchFillNumber(ax:PatternNumber) -> PatternNumberPtr ,
                        Found , MemoryError
                    If NOT MemoryError then
                        {If this pattern number has not been defined before,
```

```
                    then D12SearchFillNumber must add an entry to its
                    PatternNumber List. It may not be able to obtain memory
                    for this purpose and thus MemoryError True.}
                If Found then
                    {If this pattern number has been previously defined
                    then PatternNumberPtr points to its old definition
                    and Found is True. Otherwise PatternNumberPtr points
                    to the new definition and Found is False.}
                If PatternNumber = PlPatternNumber then
                    PlNbytes = -PlPatternNumber
                    PlPatternNumber = -8
                        {If we are redefining the current pattern number
                        then since the old definition is thrown away we
                        set PlPatternNumber to a no-fill value so that
                        no panel fill is attempted until this definition
                        is complete. We flag this temporary situation by
                        setting PlNbytes to -PlPatternNumber, a negative
                        (illegal) value. If DspSetFillPattern is called,
                        it will calculate a positive value for PlNbytes.
                        Thus when the pattern definition is completed
with
                        a call to D12EndFillPattern it checks to see if
                        PlNbytes is negative. If it is then this
temporary
                        no-fill situation is changed by a call to
                        D12SetFillPattern with pattern number -PlNbytes
                        to restore the parameters used to indicate the
                        current pattern number.}
                Calculate the number of paragraphs that the old pattern
                    used:
                    ( If old-SMP true then    {multiple-pass pattern}
                        old-number-of-paragraphs =
                            Ceiling((old-bit-per-pixel * old-N)/4)
                      Else
                        If old-Ind1 <> old-Ind0 then   {2 different
                            indices}
                            old-number-of-paragraphs = Ceiling(old-N/4)
                        Else    {only 1 index}
                            old-number-of-paragraphs = 0  {no memory used})
                MonFreeMemR(old-number-of-paragraphs) -> Error
                If Error then
                    MonErrorLogR3(ax:'MD03'-equivalent)
                        {Internal error}
                If N <> 0 then    {a pattern is to be defined
                    {N = 0 is used to delete an existing pattern}
                    MonGetMemR(ax:PnPatternPara) -> MemoryPtr , Error
                        {We first get the memory required by a multiple
                        pass fill pattern.}
                    If Error then
                        MonErrorLogR2(ax:'MD12'-equivalent)
                    Else
                        Store in the 8 byte block pointed to by
                            PatternNumberPtr the following quantities:
                            PatternNumber,MemoryPtr,M,N,TrueBPP
                        Zero the PnPatternPara paragraphs of memory pointed
                            to by MemoryPtr
                        Initialize the variables:
                            MoreThanTwo = 0
                            PnNum1 = FFFFH
```

9.2.2.2.3.2  D12FillPut (D2FIPU) -

FUNCTION:

This routine puts the pixels from a given character into a fill pattern.

CALLING SEQUENCE:

```
10    Call D12FillPut(bh:PixelsPerCharacter,bl:TrueBPP,dl:Char,
          es:di:FillRowPtr)-> dh:RowEndFillEnd PixelsPerCharacter: <byte>      Number of pixels per character.
         TrueBPP: <byte>                 True bits per pixel.
15       Char: <byte>                    Character containing the pixels
                                         left justified.
         FillRowPtr: <pointer>           Pointer to the current row in the
                                         fill pattern being filled.
         RowEndFillEnd: <byte>           1:   End of Row
20                                       FFH: End of Fill
                                         0:   Neither Near call

25    DATA REFERENCES:

???

MODULES REFERENCED:

30       DspEndFillPattern

DATA DEFINITIONS:

35       ???

PROCEDURES:

EndRowEndFill = 0    {Initialize to neither end of row or end or
             fill}
5        For I = 1 to PixelsPerCharacter do
           For J = TrueBPP to 1 do
             Rotate bit position J of the leftmost pixel of Char into the
                 (TrueBPP+1-J)th 32-bit (rotated) row of the fill pattern at
10               the scanline pointed to by FillRowPtr.
                 {The leftmost pixel will also be rotated into the low-order
                 bits of Char.}
           Pixel = AND(Char,PnBPP.ThirdByte)
               {PnBPP.ThirdByte contains a mask of TrueBPP low order 1s so that
15             Pixel is the pixel whose bits were placed in the fill pattern.}
           Case of
             Both of the two elements in the byte array PnNum1 are empty:
                 {i.e. PnNum1[1] = PnNum1[2] = FFH as set by
                 DspBeginFillPattern}
20               PnNum1[1] = Pixel
             (Only the second element in PnNum1 is empty) and (Pixel <>
                 PnNum1[1]):
                 PnNum[2] = Pixel
             (No element in PnNum1 is empty) and (Pixel <> PnNum1[1]) and
                 (Pixel <> PnNum1[2]):
25               MoreThanTwo.bit[15] = 1
                     {This indicates a multiple-pass fill pattern. MoreThanTwo
                     is initialized to 0 in DspBeginFillPattern}
           If Pixel = 0 then
             MoreThanTwo.bit[14] = 1
30               {This bit (named ZIN) is set to 1 to indicate a zero index in
                 the fill pattern.}
           Decrement PnRemainderInRow
           If PnRemainderInRow = 0 then
               {We have filled in the width of the fill pattern for one
35             scanline}
             PnRemainderInRow = PnM
                 {Reset PnRemainderInRow for the next scanline}
             EndRowEndFill = 1       {Indicate End of Row}
             For J = 1 to TrueBPP do
40             Jump to the label specified in the variable PnDuplType
                   which handles the following 6 cases
                   Case of
                     M = 1: Duplicate the 1-bit pattern 32 times
```

```
            M =  2: Duplicate the  2-bit pattern 16 times
45          M =  4: Duplicate the  4-bit pattern  8 times
            M =  8: Duplicate the  8-bit pattern  4 times
            M = 16: Duplicate the 16-bit pattern  2 times
            M = 32: Do Nothing
        Decrement PnNumRowsLeft
50      If PnNumRowsLeft <= 0 then    {end of fill pattern}
            DspEndFillPattern
            EndRowEndFill = FFH    {to indicate end of fill}
            Go To Exit
        End-For
55   Exit:
     End
```

9.2.2.2.3.3 DspEndFillPattern (D2EFPT) –

FUNCTION:

5      This routine terminates a fill pattern definition.

CALLING SEQUENCE:

Call DspEndFillPattern
10
       No Parameters
       Far call

DATA REFERENCES:
15
   ???

MODULES REFERENCED:

20 D12FillPut
   DspSetFillPattern
   MonFreeMemR

DATA DEFINITIONS:
25
   ???

PROCEDURES:

```
     If PnNodePtrH <> 0 then    {a fill pattern definition is in progress}
        While PnNumRowsLeft > 0 do    {while pattern is not filled}
5          D12FillPut(bh:PnBPP.HighByte,bl:PnBPP.LowByte,dl:0,
               es:di:PnWordPointer)
               {place a zero pixel in the fill pattern}
        End-While
        If MoreThanTwo.bit[15] = 0 then
10         {only 1 or 2 indices in pattern so that the pattern can be
            compressed from a multiple-pass pattern to a single-pass
            pattern. At least one index must be defined since even if no
            pixels are purposely placed in the pattern, this routine will
            fill it with the index 0.}
15         TrueBPP = PnBPP.LowByte
           If PnNum1[2] is empty then
              PnNum1[2] = 0
           Ind1 = Maximum(PnNum1[1],PnNum1[2])
           Ind0 = Minimum(PnNum1[1],PnNum1[2])
20         Place the Ind1 and Ind0 values in the appropriate fields of the
              Pattern definition header pointed to by
              PnBlockPointer:PnWordPointer
           If Ind1 <> Ind0 then    {two indices}
              {We create a single-pass pattern from a multiple-pass pattern
25             by placing a 1 in the single-pass pattern for every
               occurrence of the pixel value Ind1 in the multiple-pass
               pattern and placing a 0 for every occurrence of the pixel
               value Ind0. However, since Ind1 > Ind0, then there are some
```

```
                bit positions where Ind1 differs from Ind0. Let m be the
                highest bit position where Ind1.bit[m] <> Ind0.bit[m]. Then
                since Ind1 > Ind0, we have Ind1.bit[m] = 1 and Ind1.bit[m]
                = 0. We can then use that row of the multiple-pass pattern
                for the single-pass pattern. We can also perform the
                compression in place.) Searching from TrueBPP to 1, find
                the first bit position m in which Ind1 and Ind0 differ
            Compress the N*TrueBPP row pattern to a N row pattern in place
                by moving the m-th row of each scanline to the next available
                space in the compressed single-pass pattern.
        Else        (only one index so we can free the fill pattern memory)
            Pn2IndicesPatternPara = 0
        FreeParagraphs = PnPatternPara - Pn2IndicesPatternPara
        If FreeParagraphs > 0 then
            MonFreeMemR(FreeParagraphs)
                (MonFreeMemR will flag an error for 0 paragraphs)
    Else           (multiple-pass pattern)
        In the Pattern definition header pointed to by
            PnBlockPointer:PnWordPointer set the SMP and ZIN fields to
            MoreThanTwo.bits[14:15] to indicate a multiple-pass pattern
    PnBlockPointer = 0
            (to indicate no fill pattern definition in progress)
    If PlNbytes < 0 then
        DspSetFillPattern(-PlNbytes)
            (PlNbytes < 0 is a signal that the current fill pattern was
            redefined so that a no-fill pattern number of -8 was
            temporarily invoked until the fill pattern was completely
            defined or another pattern number was selected. If another
            fill pattern had been selected then PlNbytes would be >= 0.
            Therefore we reset the variables used by the panel fill by
            re-selecting the current pattern number.)
End
```

9.2.2.2.3.4 DspSetFillPattern (D2PATT) -

FUNCTION:

This routine selects the pattern used to fill the interior of panels.

CALLING SEQUENCE:

```
Call DspSetFillPattern

PatternNumber: <integer>        The number of the fill pattern to
                                    be used in panel filling.
    Far call
```

DATA REFERENCES:

???

MODULES REFERENCED:

D12SearchNumber
MonErrorLogR2

DATA DEFINITIONS:

???

PROCEDURES:

```
    If PatternNumber < -7 then     (no-fill)
        PlPatternNumber = PatternNumber
    Else            (a pattern to be used for filling panels)
        If PatternNumber <= 0 then    (solid fill)
            PlPatternNumber = PatternNumber
            SMP = 0   (single-pass pattern)
            ZIN = 1   (this is not used by the filling algorithm in this case)
```

```
        BPP = 3    {assume 3 bits per pixel}
        Ind1 = -PatternNumber
        Ind0 = Ind1   {set both indices to the pixel fill value}
     Else      {general purpose fill}
        D12SearchNumber(PatternNumber)-> Found , BlockPointer
        If NOT found then    {If the pattern definition does not exist}
           If TravDslBlk = 0 then
              MonErrorLogR2(ax:'MP10'-equivalent)
                 {If we are traversing a segment, then we do not output
                  an error message}
        Else      {pattern definition exists}
           PlPatternNumber = PatternNumber
           FillPtrH = BlockPointer
           Obtain SMP,ZIN,BPP,Ind1,Ind0,M,N from the pattern definition
              header
     PlSMP = (SMP,ZIN,BPP,Ind1,Ind0)
     If SMP = 0 then    {single-pass pattern}
        NumberPasses = 1
        Pl2Indices.HighByte = Ind1
        Pl2Indices.LowByte = Ind0
        If Ind1 = Ind0 then   {only one index in pattern}
           N = 1
              {no memory is saved for the pattern so we set the height of
               the pattern to 1}
        Set the jump variables ScanPush and ScanJump for a single-pass
           pattern
     Else       {multiple-pass pattern}
        NumberPasses = BPP
     PlBitsPerPixel4 = 4 * NumberPasses
     PlNbytes = 4 * NumberPasses * (N-1)
        {This is (the number of words in each scanline) - 4}
  End
```

9.2.2.2.3.5 D12SearchFillNumber (D2SFIN) -

FUNCTION:

This routine searches for the fill pattern number requested.

CALLING SEQUENCE:

Call D12SearchFillPattern

PatternNumber: <integer>        The number of the fill pattern to
                                                be searched for.

Near call

DATA REFERENCES:

???

MODULES REFERENCED:

D12GetMemNode

DATA DEFINITIONS:

???

PROCEDURES:

```
  PnNodePtr = FirstPnNodePtr
     {set pointer to the node before the first pattern-definition
      header node}
  Repeat
     D12GetMemNode(PnNodePtr,PnBlockLen-4,PnBlockLen,PnNodeLen)->
        PnNodePtr , MemoryError
        {Get the next pattern-definition header node}
     If MemoryError then
        signal the error and exit
```

```
    Retrieve PnBlockPointer from the pattern-definition header node
        pointed to by PnNodePtr
    Until (PnBlockPointer = 0) or (Pattern-Number-in-header =
15  PatternNumber)
        {Look until an empty node is found or the node with the desired
        pattern number is found}
    End
```

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

I claim as my invention:

1. In a graphics display terminal having a CRT capable of displaying at least one panel image thereon in response to instructions from a main memory source, said terminal also being capable of performing a zoom operation and a panel-fill operation for filling the displayed panel with a predetermined fill pattern, an improvement comprising:

input means for introducing information into said graphics display terminal related to said zoom operation;

first means for processing said instructions from said main memory source and said information introduced via said input means including: a means for designating a portion of the display on the CRT that is to be subjected to the zoom operation in response to said information, a means for determining whether a particular pixel within the designated display portion is within said at least one panel, a means for implementing the zoom operation on the designated portion to produce a representation of an enlarged designated portion, and a means for implementing a panel-fill operation for a filling of only said panel or any part thereof in the enlarged designated portion with the same corresponding fill pattern in response to the location of the particular pixel to produce a representation of a filled enlarged designated portion;

second means responsive to output from the first means for producing a pixel representation of said filled enlarged designated portion;

converting means responsive to said pixel representation produced by the second means for converting said pixel representation into video signals representative of said representation of the filled enlarged designated portion; and display means responsive to the video signals.

2. A graphics display terminal in accordance with claim 1 wherein the first means includes means responsive to the representation of the filled enlarged designated portion for producing output signals; and wherein the second means comprises, vector generator means responsive to said output signals for generating binary information associated with each pixel of said filled enlarged designated portion, said binary information being indicative of a display or a nondisplay at each pixel of said filled enlarged designated portion; and memory means for storing said binary information therein associated with each pixel of said filled enlarged designated portion.

3. A graphics display terminal in accordance with claim 2 wherein said converting means comprises:

determining means responsive to said binary information stored in said memory means for determining a brightness index associated with each said binary information for each pixel of said filled enlarged designated portion, said brightness index being determinative of the brightness of the displayed image at each corresponding pixel point; and converter means responsive to the brightness indices associated with each said binary information for converting said brightness indices into said video signals representative of said filled enlarged designated portion.

4. A graphics display means capable of mapping the outline of a panel image having a fill pattern disposed therein from one location to another thereby producing a redrawn panel outline, said terminal capable of performing a panel-fill operation on said redrawn panel outline thereby completely filling the inside of said outline with said fill pattern and producing a filled redrawn panel image, said terminal being responsive to instructions from a main source for producing said panel image, comprising:

input means for introducing information into said graphics display means related to the mapping of the outline of said panel image;

first means for processing said instructions from said main source and said information introduced via said input means including: a means for designating a panel image that is to be remapped in response to said information, a means for determining whether a particular pixel is within the designated panel image, a means for implementing the mapping of the designated panel image, and for a means implementing the filling of the mapped panel with said fill pattern in response to the location of the particular pixel to produce a representation of a filled redrawn panel image;

second means reponsive to the representation of the filled redrawn panel image for producing a pixel representation of said filled mapped panel image;

converting means responsive to said pixel representation produced by the second means for converting said pixel representation into video signals representative of said filled mapped panel image; and display means responsive to the video signals for displaying said filled mapped panel image.

5. A graphics display means of claim 4 wherein said first means includes means for determining which areas adjacent to said outline are inside the panel outline and filling the area inside the panel outline with said fill-pattern.

* * * * *

UNITED STATES PATENT AND TRADEMARK OFFICE
CERTIFICATE OF CORRECTION

PATENT NO. : 4,528,642

DATED : July 9, 1985

INVENTOR(S) : William G. Waller

It is certified that error appears in the above-identified patent and that said Letters Patent is hereby corrected as shown below:

Column 4, line 17, "2" should read -- 12 --.

Signed and Sealed this

Twelfth Day of November 1985

[SEAL]

Attest:

Attesting Officer

DONALD J. QUIGG

Commissioner of Patents and Trademarks